United States Patent

Kawakami

(10) Patent No.: US 7,626,768 B2
(45) Date of Patent: Dec. 1, 2009

(54) ZOOM LENS AND CAMERA WITH ZOOM LENS

(75) Inventor: Etsuro Kawakami, Hamura (JP)

(73) Assignee: Casio Computer Co., Ltd., Tokyo (JP)

(*) Notice: Subject to any disclaimer, the term of this patent is extended or adjusted under 35 U.S.C. 154(b) by 313 days.

(21) Appl. No.: 11/701,899

(22) Filed: Feb. 2, 2007

(65) Prior Publication Data

US 2007/0188885 A1    Aug. 16, 2007

(30) Foreign Application Priority Data

Feb. 13, 2006    (JP)    .............................. 2006-035002
Feb. 16, 2006    (JP)    .............................. 2006-039081

(51) Int. Cl.
     *G02B 15/14*    (2006.01)
(52) U.S. Cl. ....................................................... 359/689
(58) Field of Classification Search ................. 359/689, 359/690
See application file for complete search history.

(56) References Cited

U.S. PATENT DOCUMENTS

2005/0157404 A1*   7/2005   Kim et al. .................... 359/689

FOREIGN PATENT DOCUMENTS

| JP | 2002-228922 A | 8/2002 |
| JP | 2004-4765 A | 1/2004 |
| JP | 2004-56362 A | 2/2004 |

* cited by examiner

*Primary Examiner*—William C Choi
(74) *Attorney, Agent, or Firm*—Frishauf, Holtz, Goodman & Chick, P.C.

(57) ABSTRACT

A zoom lens of variable power ratio of the order of 3 in which the whole of the zoom lens is made up of three lens elements groups and the power configuration of each of the groups has an arrangement of negative, positive, and negative. The zoom lens includes, sequentially from an object side thereof, a first lens elements group which has a negative refraction power as a whole, a second lens elements group which has a positive refraction power as a whole, and a third lens element group, which has a negative refraction power as a whole. A variable power is realized by shifting the positions of the first and second lens elements group in the direction of an optical axis thereof.

8 Claims, 48 Drawing Sheets

(EMBODIMENT 1)

FIG. 2
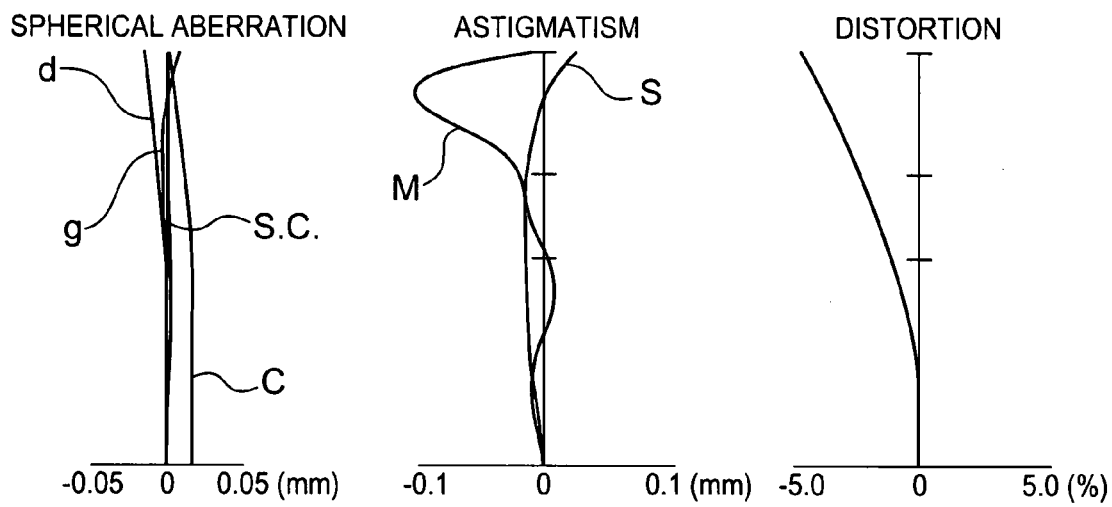
(EMBODIMENT 1: WIDE-ANGLE END)
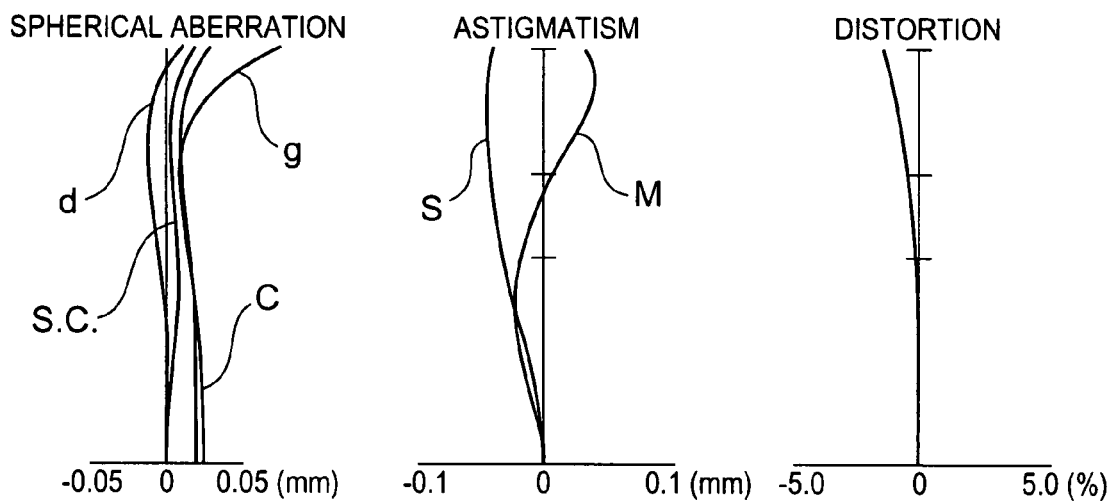
(EMBODIMENT 1: INTERMEDIATE AREA)
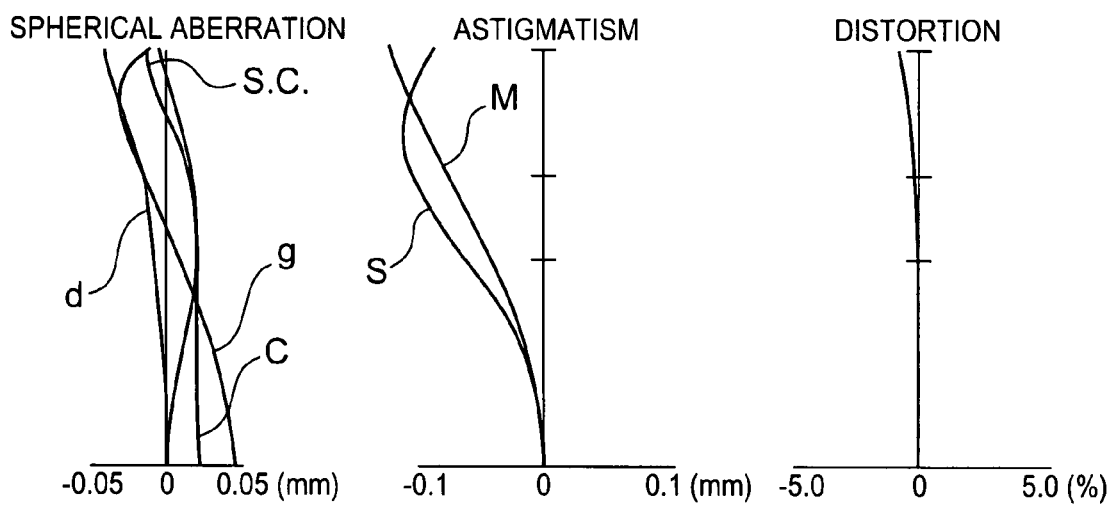
(EMBODIMENT 1: TELEPHOTO END)

(EMBODIMENT 2)

FIG. 4
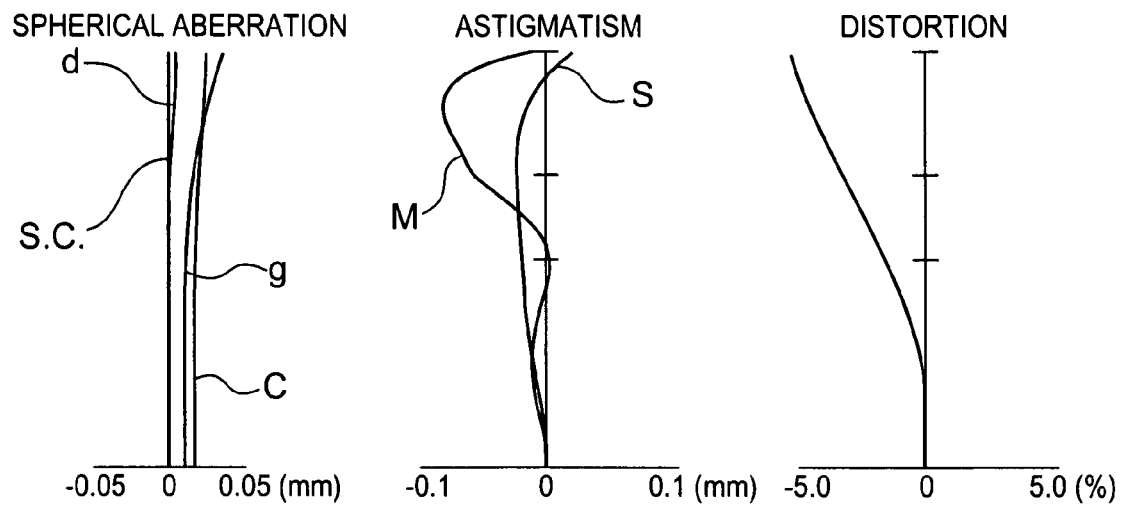
(EMBODIMENT 2: WIDE-ANGLE END)
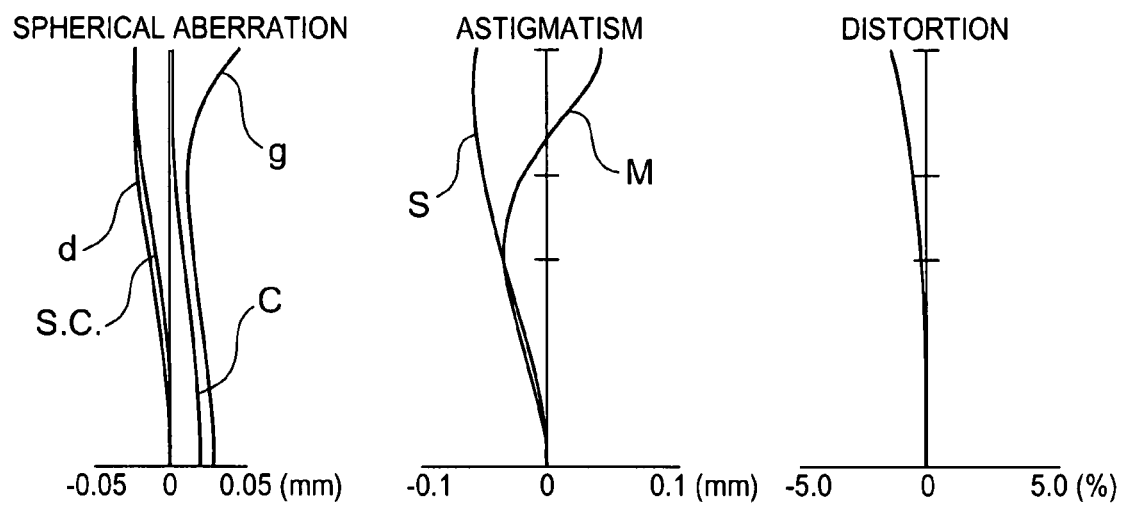
(EMBODIMENT 2: INTERMEDIATE AREA)
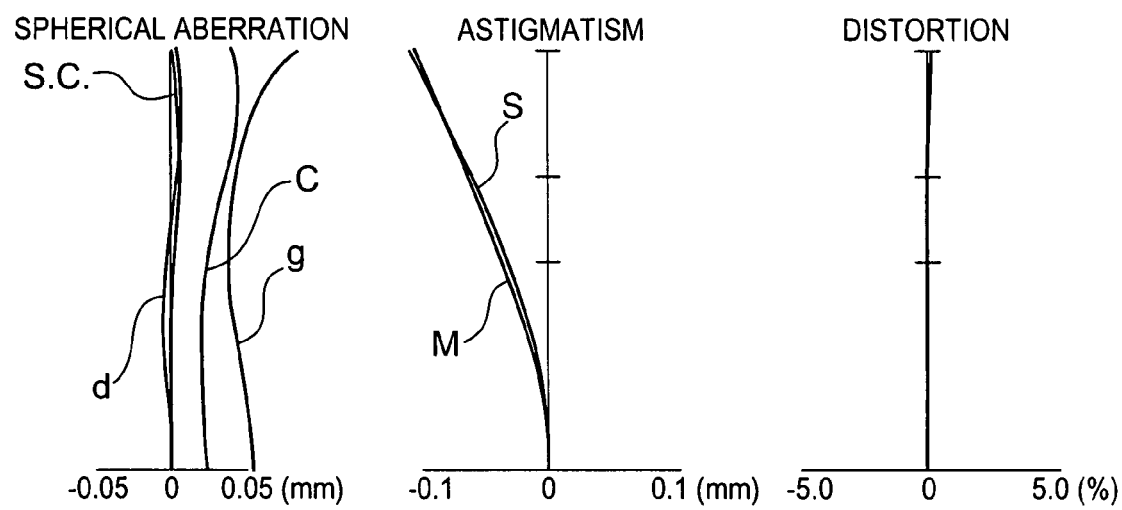
(EMBODIMENT 2: TELEPHOTO END)

(EMBODIMENT 3)

FIG. 6
(EMBODIMENT 3: WIDE-ANGLE END)
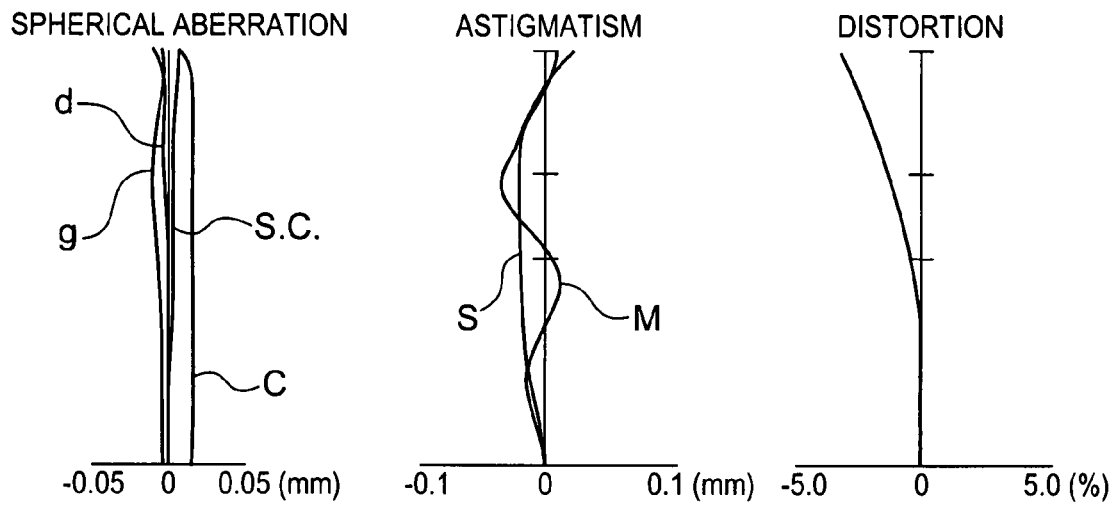
(EMBODIMENT 3: INTERMEDIATE AREA)
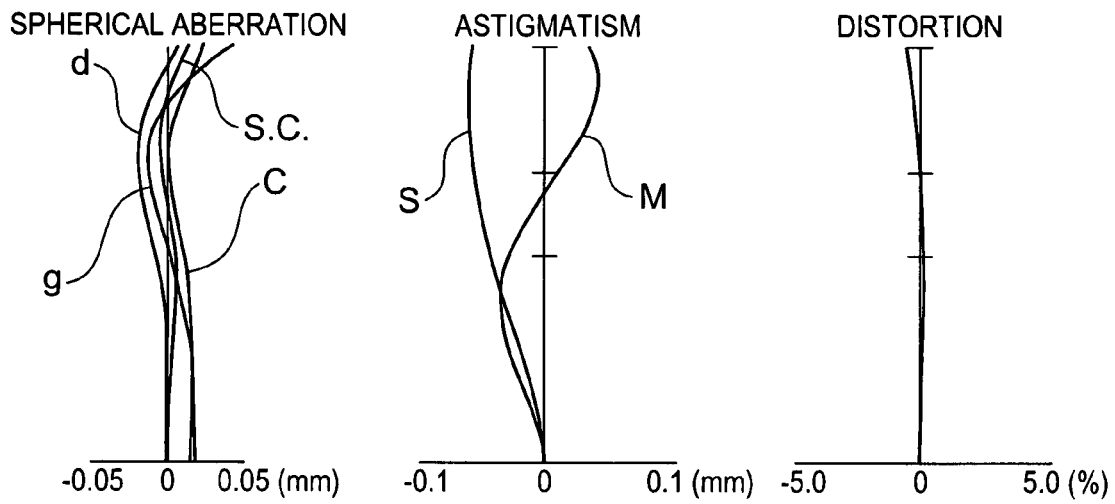
(EMBODIMENT 3: TELEPHOTO END)
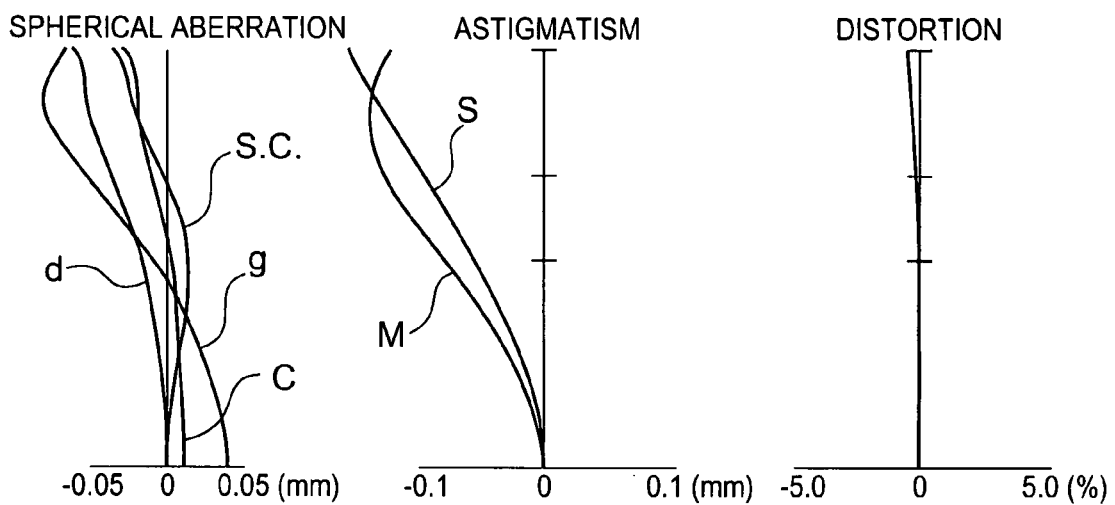

FIG. 8
(EMBODIMENT 4: WIDE-ANGLE END)
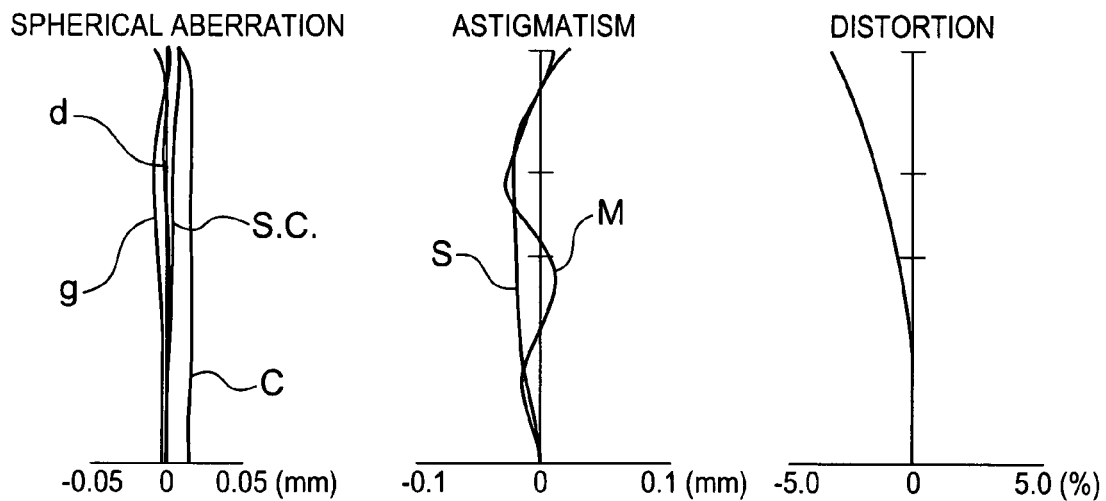
(EMBODIMENT 4: INTERMEDIATE AREA)
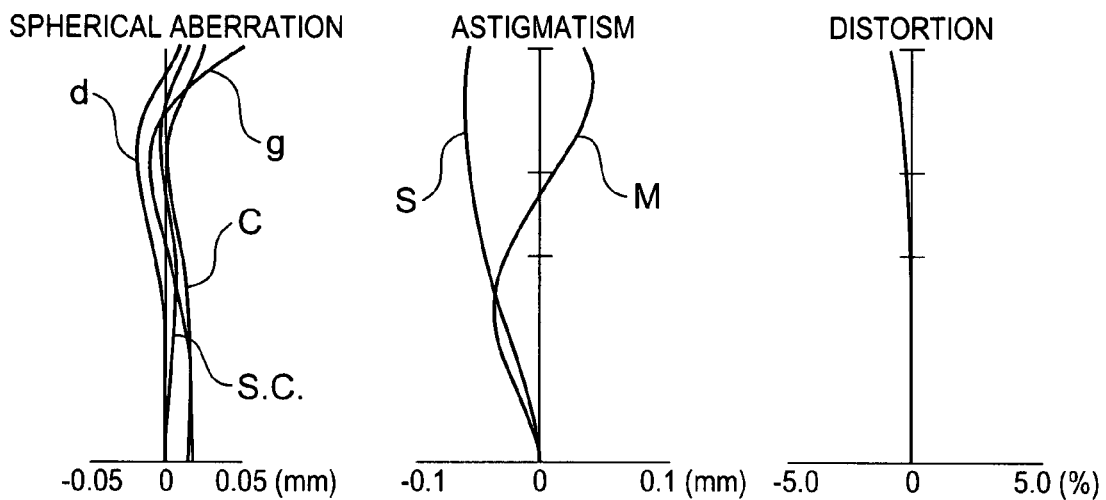
(EMBODIMENT 4: TELEPHOTO END)
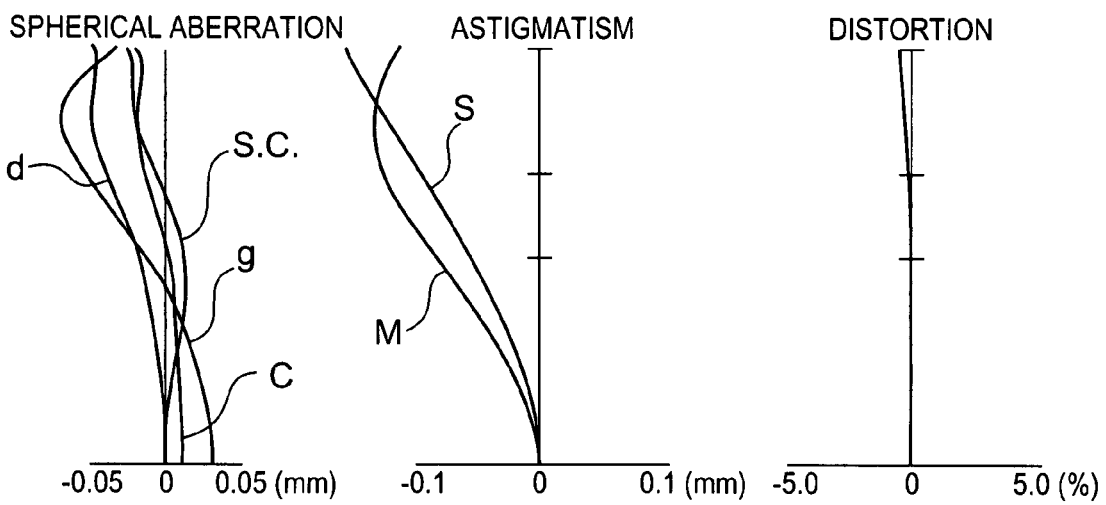

(EMBODIMENT 5)

FIG. 10
(EMBODIMENT 5: WIDE-ANGLE END)
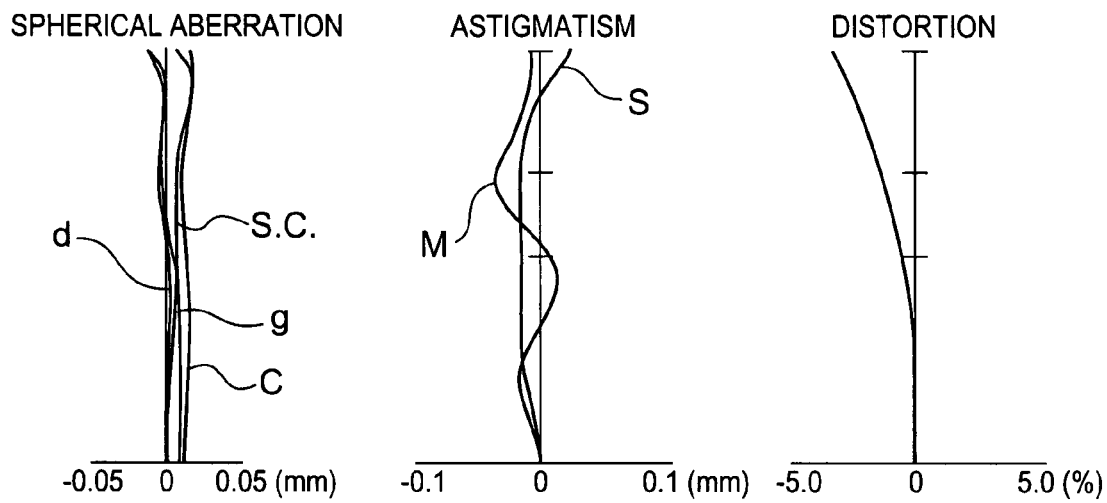
(EMBODIMENT 5: INTERMEDIATE AREA)
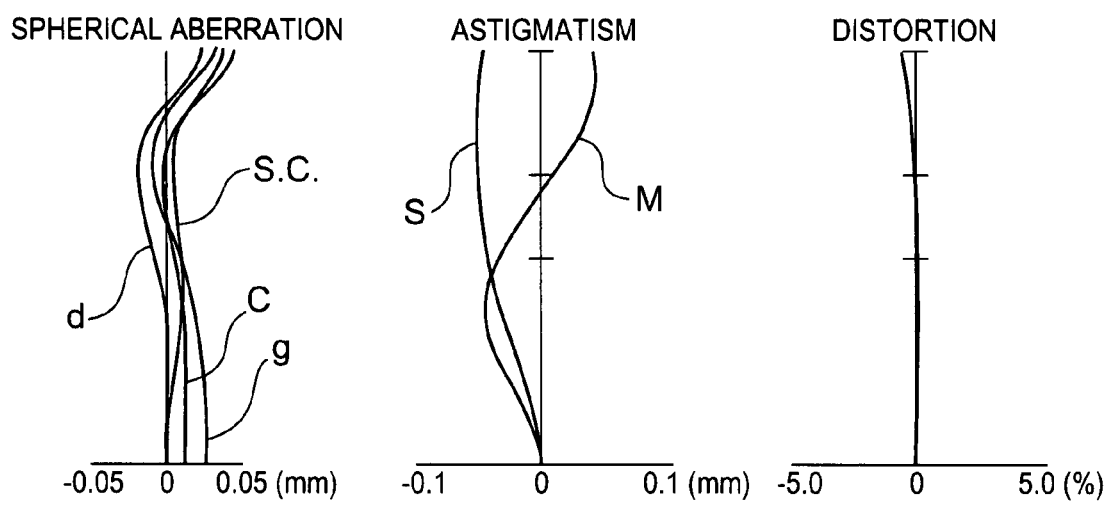
(EMBODIMENT 5: TELEPHOTO END)
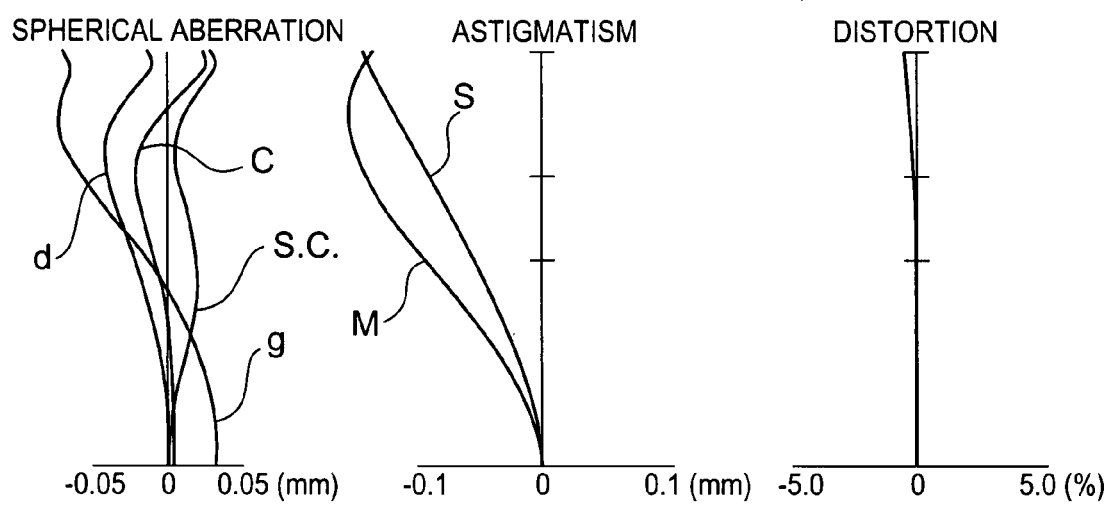

FIG. 12
(EMBODIMENT 6: WIDE-ANGLE END)
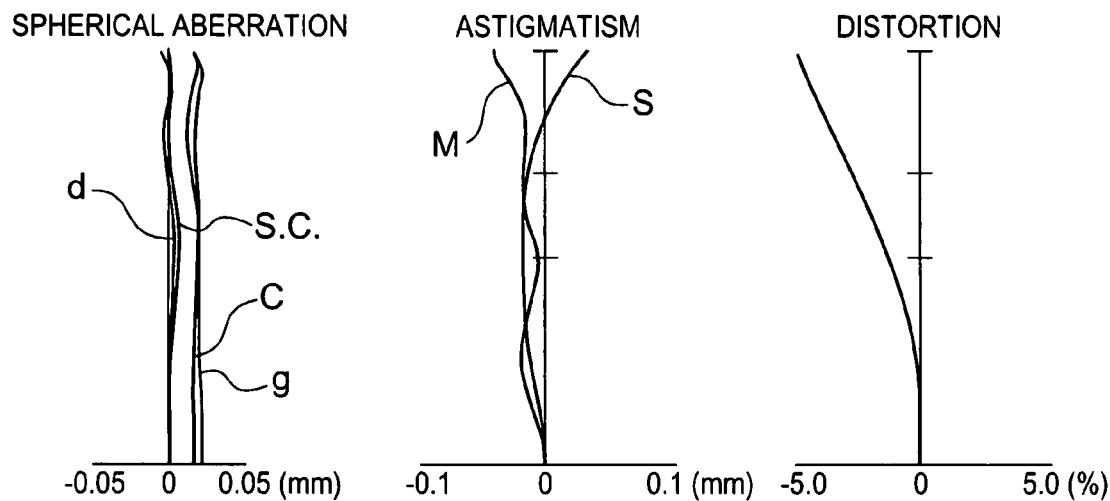
(EMBODIMENT 6: INTERMEDIATE AREA)
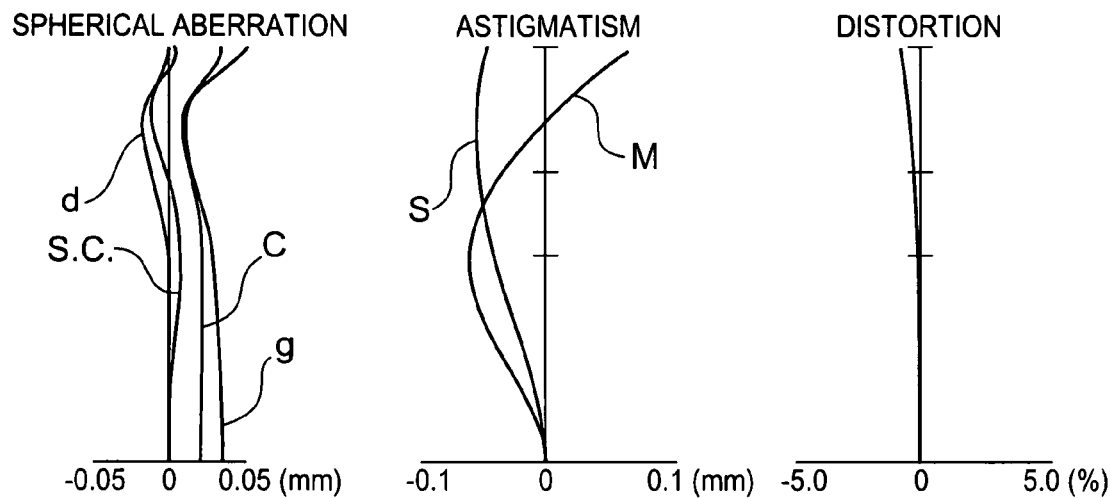
(EMBODIMENT 6: TELEPHOTO END)
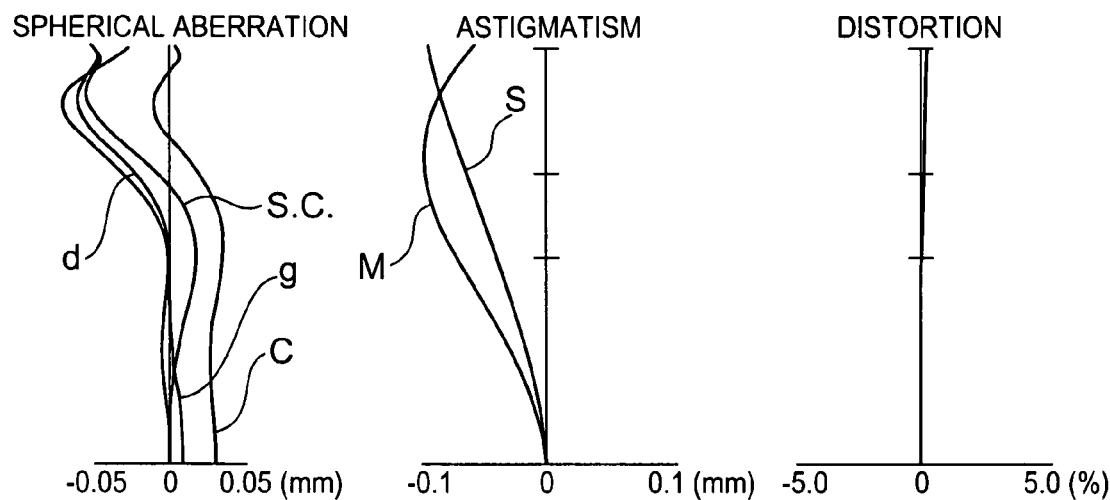

FIG. 14
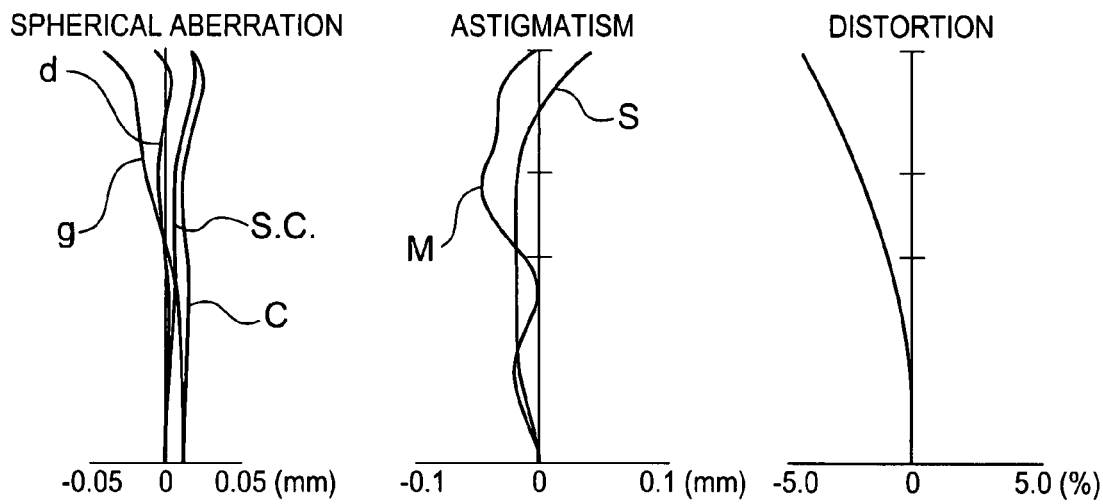
(EMBODIMENT 7: WIDE-ANGLE END)
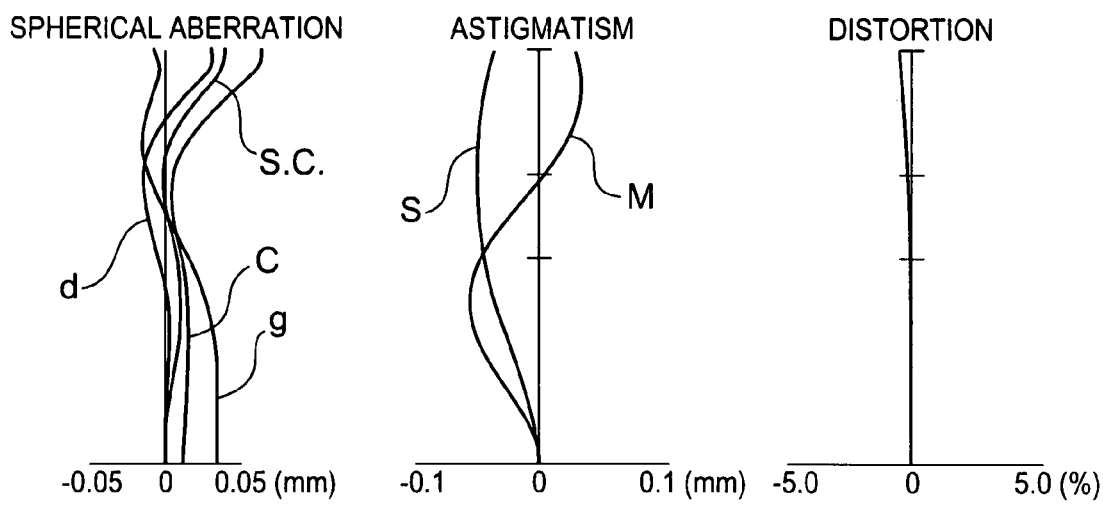
(EMBODIMENT 7: INTERMEDIATE AREA)
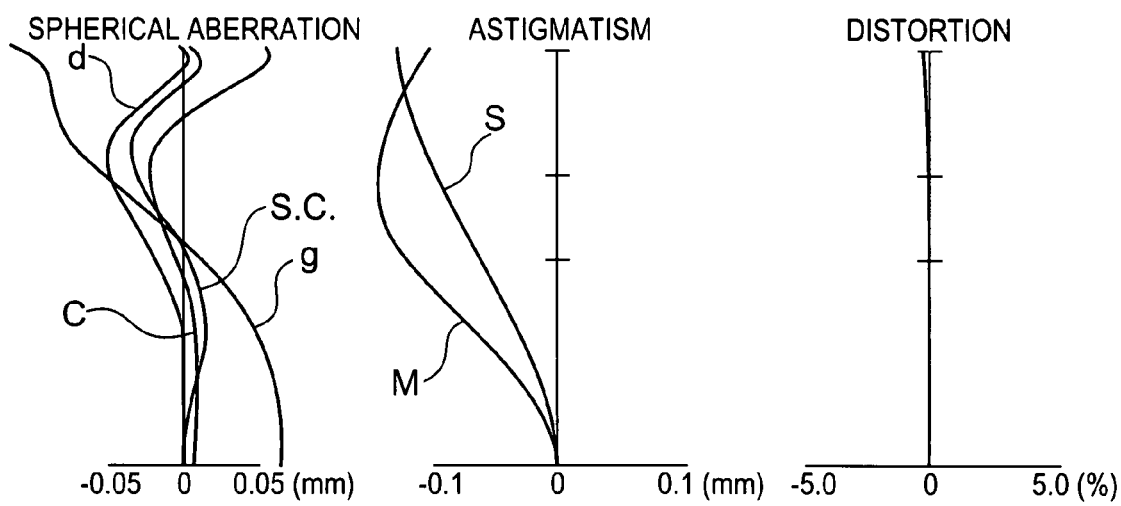
(EMBODIMENT 7: TELEPHOTO END)

(EMBODIMENT 8)

FIG. 16
(EMBODIMENT 8: WIDE-ANGLE END)
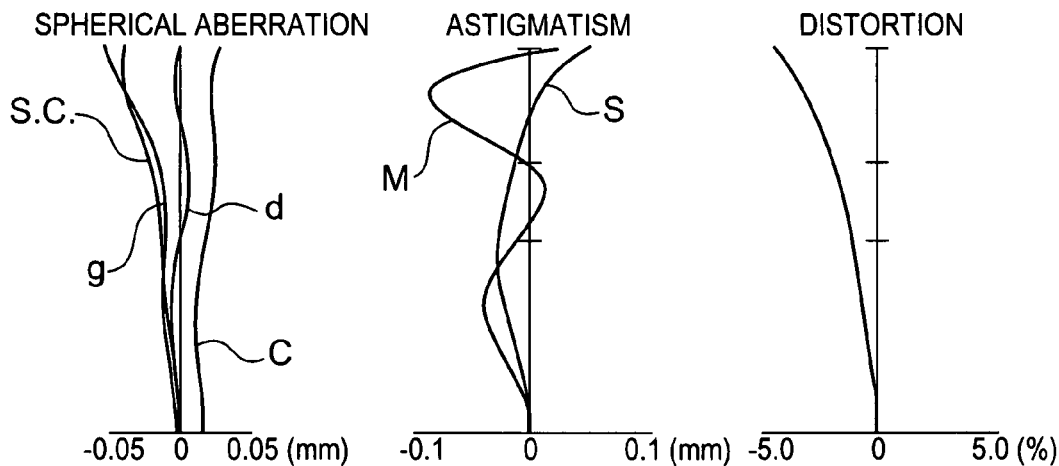
(EMBODIMENT 8: INTERMEDIATE AREA)
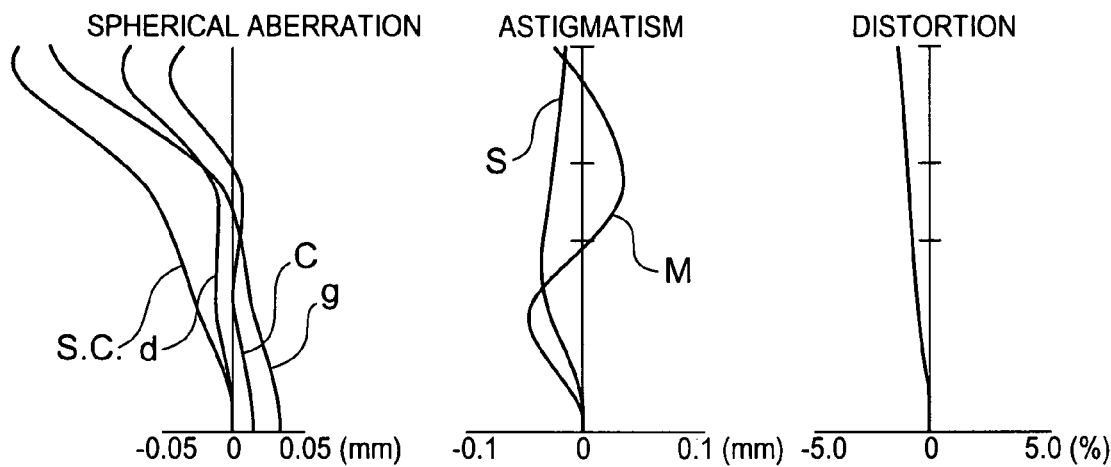
(EMBODIMENT 8: TELEPHOTO END)
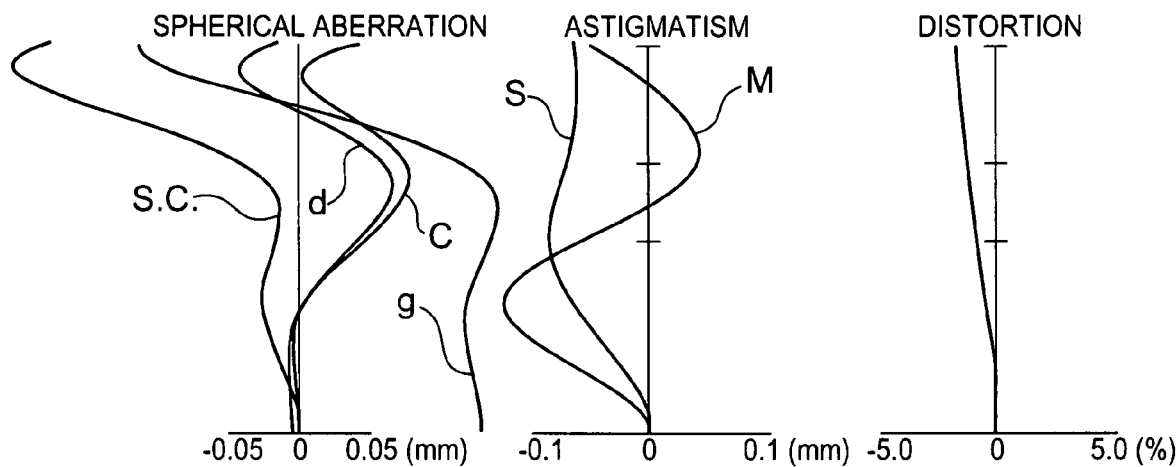

FIG. 20
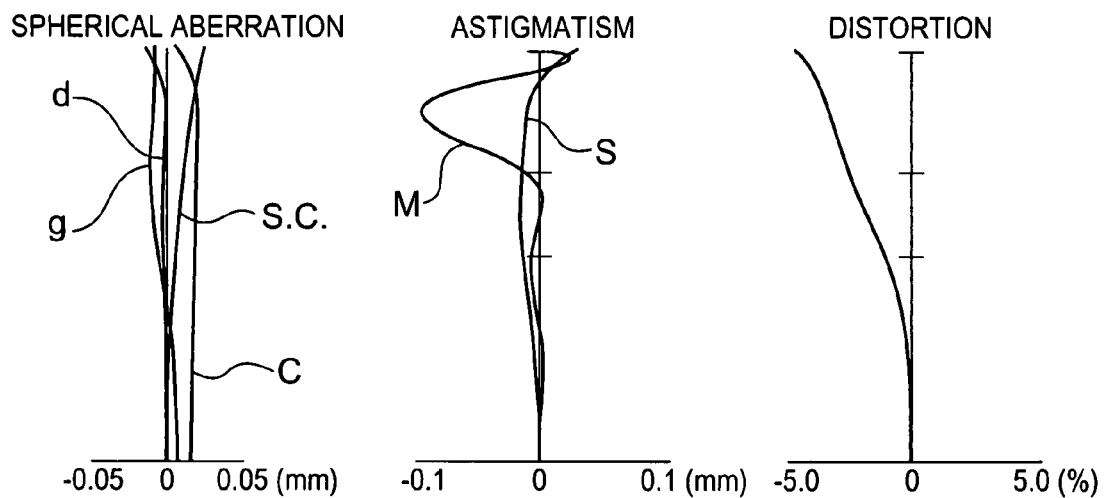
(EMBODIMENT 10: WIDE-ANGLE END)
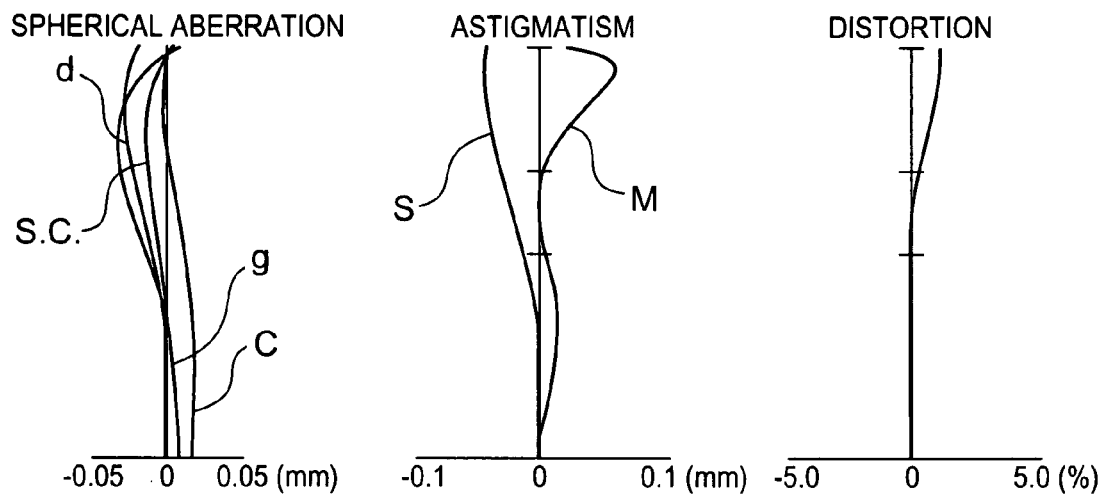
(EMBODIMENT 10: INTERMEDIATE AREA)
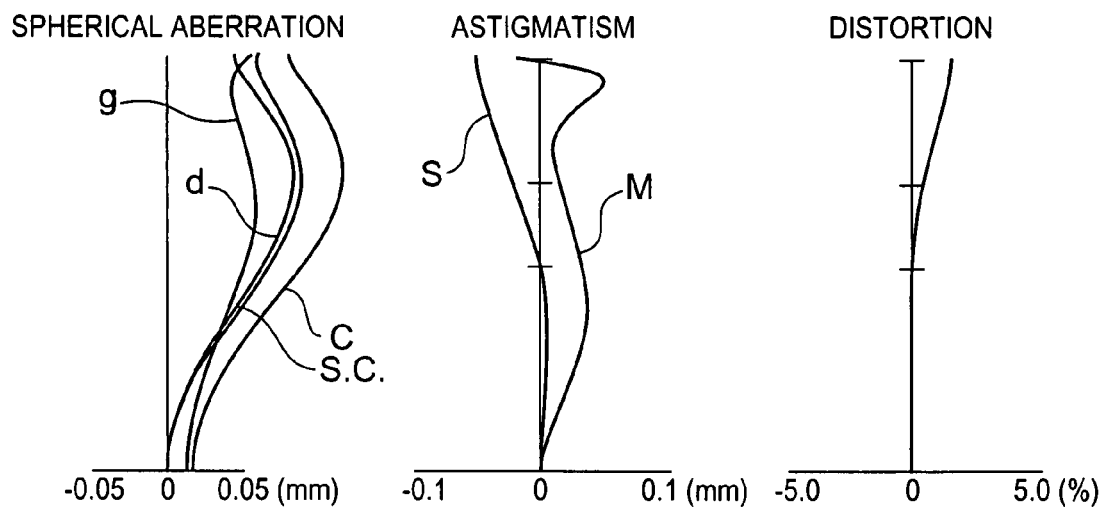
(EMBODIMENT 10: TELEPHOTO END)

(EMBODIMENT 11)

FIG. 22
(EMBODIMENT 11: WIDE-ANGLE END)
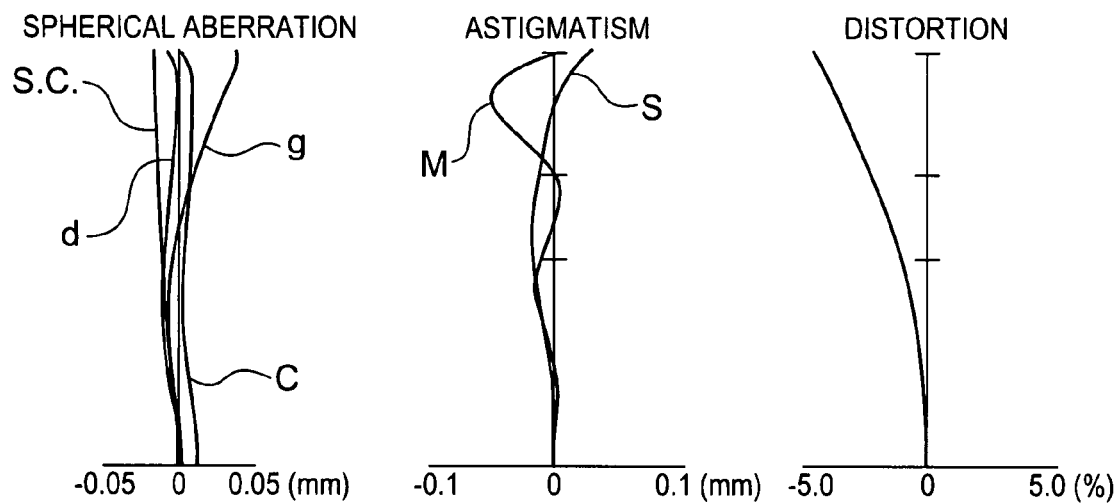
(EMBODIMENT 11: INTERMEDIATE AREA)
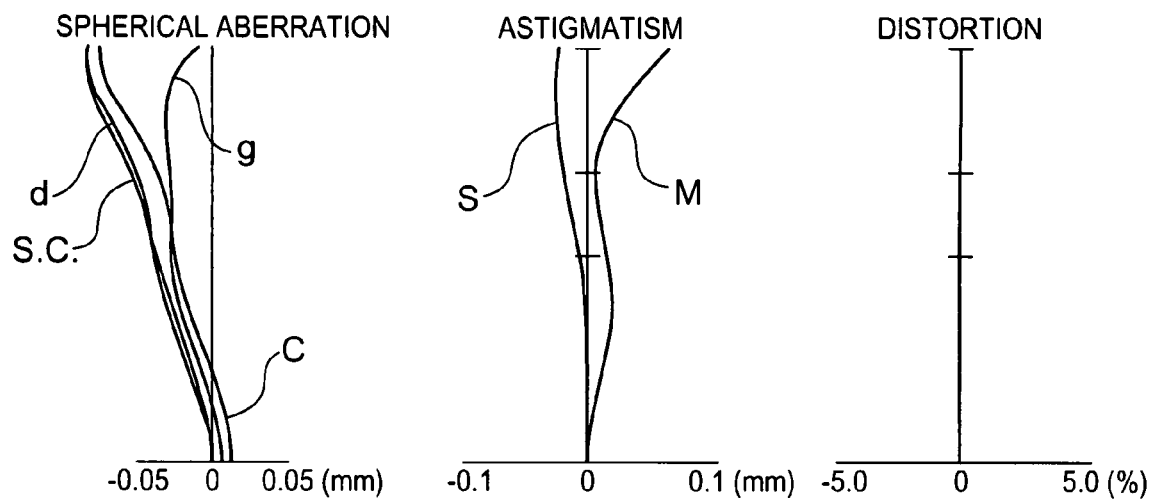
(EMBODIMENT 11: TELEPHOTO END)
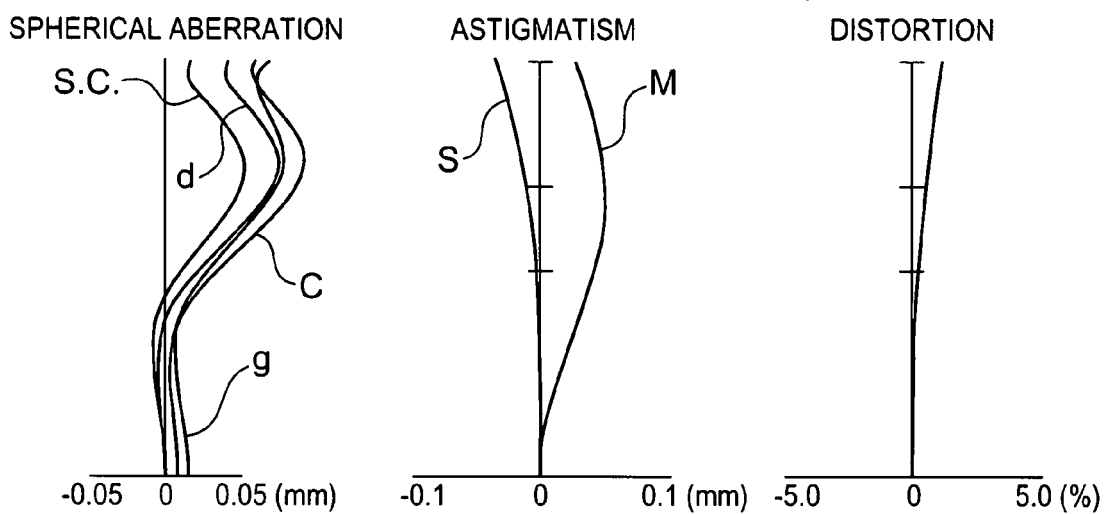

(EMBODIMENT 12)

FIG. 24
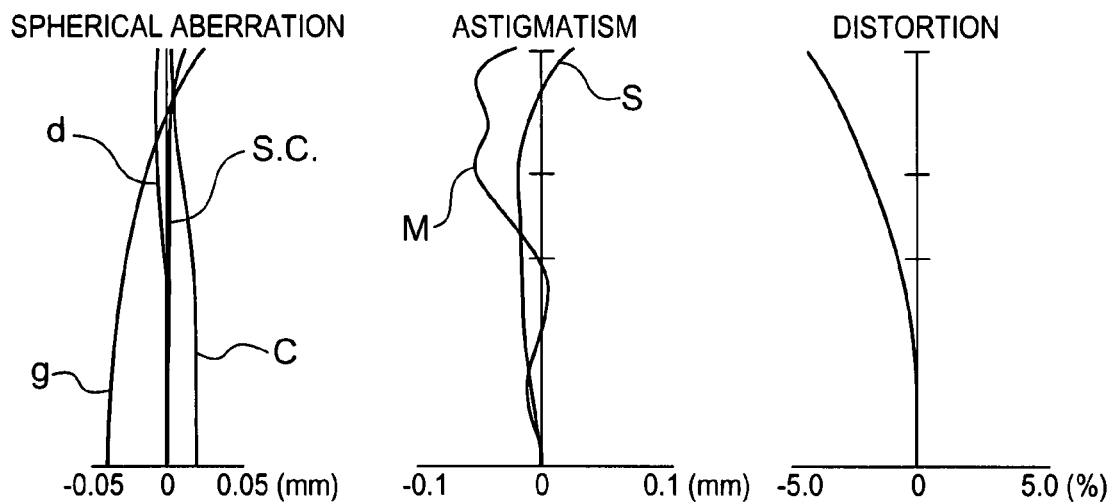
(EMBODIMENT 12: WIDE-ANGLE END)
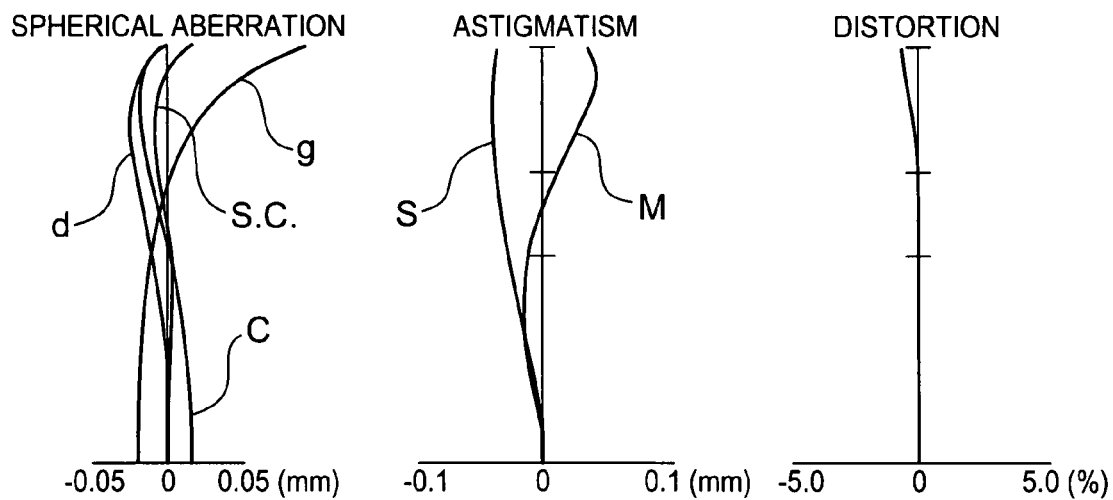
(EMBODIMENT 12: INTERMEDIATE AREA)
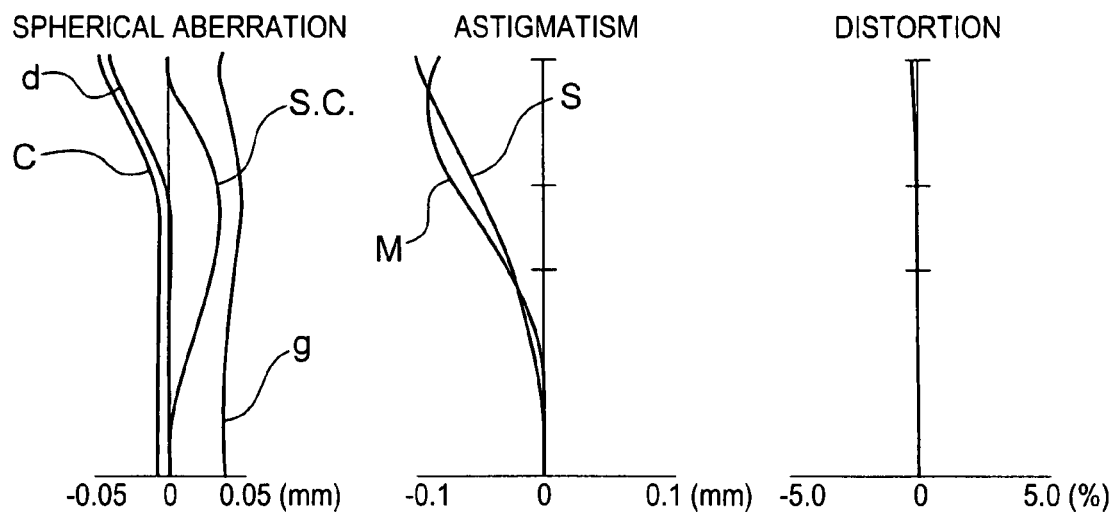
(EMBODIMENT 12: TELEPHOTO END)

(EMBODIMENT 13)

FIG. 26
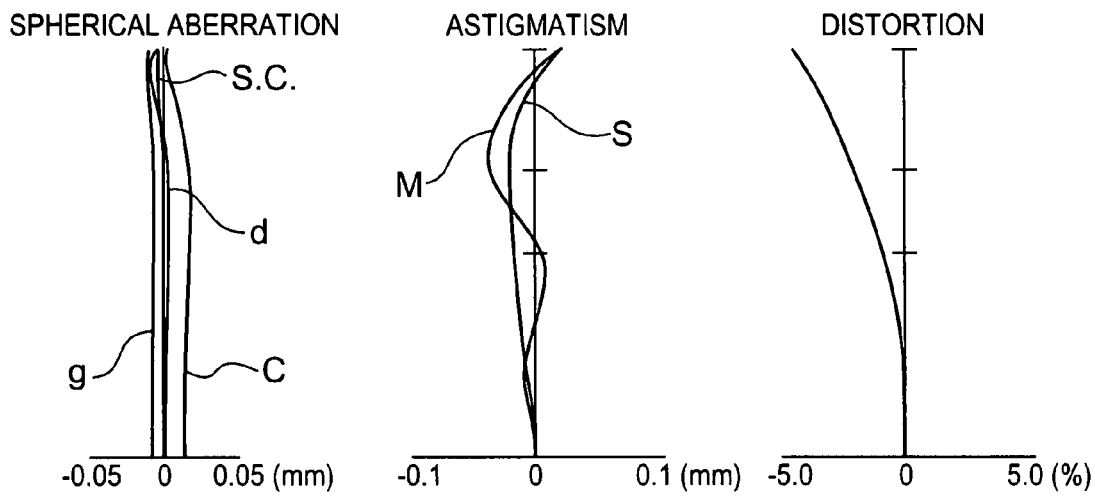
(EMBODIMENT 13: WIDE-ANGLE END)
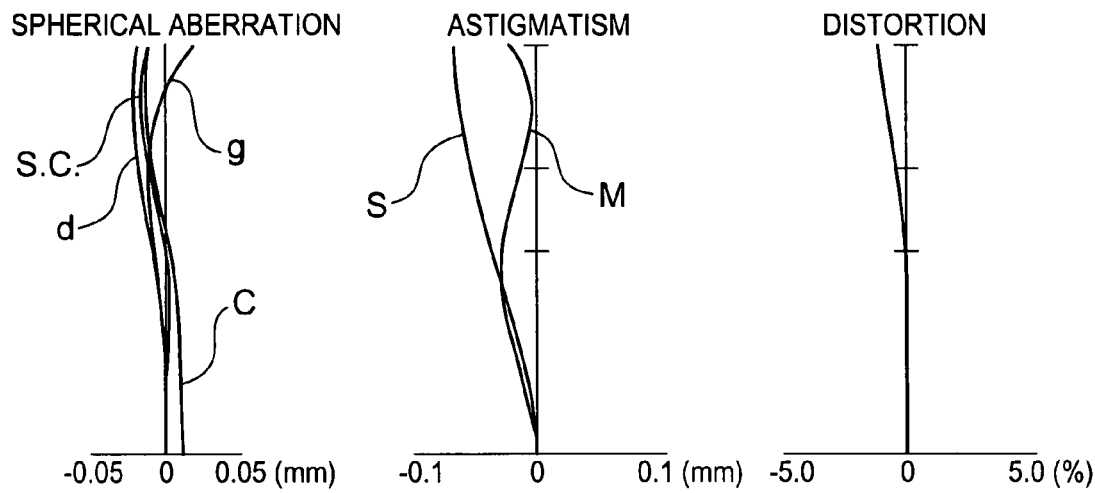
(EMBODIMENT 13: INTERMEDIATE AREA)
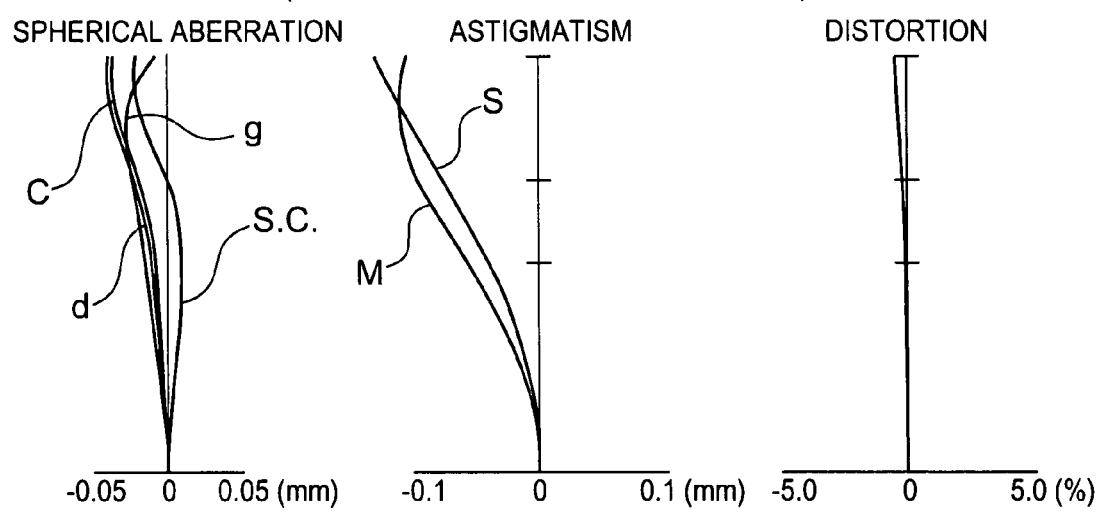
(EMBODIMENT 13: TELEPHOTO END)

FIG. 28
(EMBODIMENT 14: WIDE-ANGLE END)
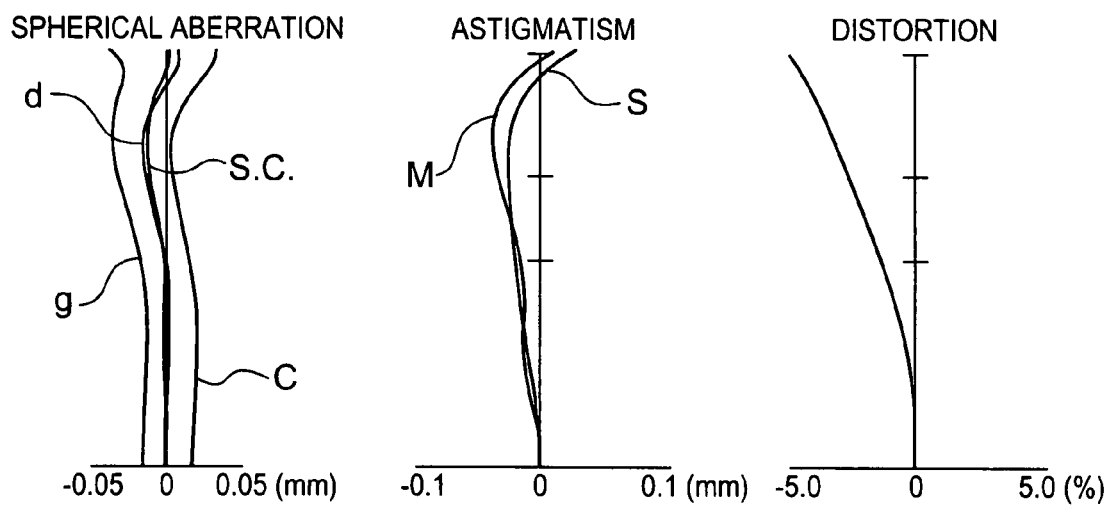
(EMBODIMENT 14: INTERMEDIATE AREA)
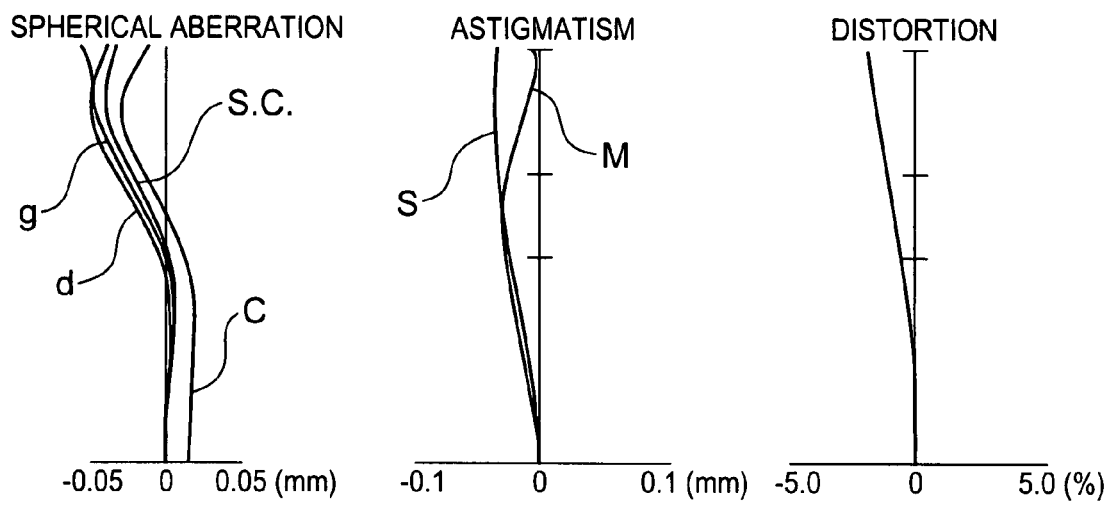
(EMBODIMENT 14: TELEPHOTO END)
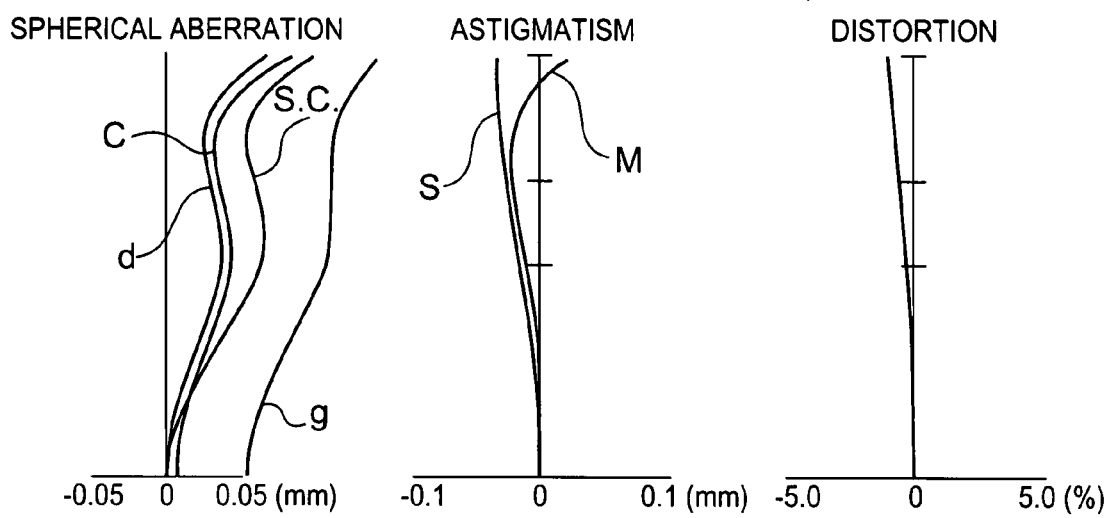

FIG. 30
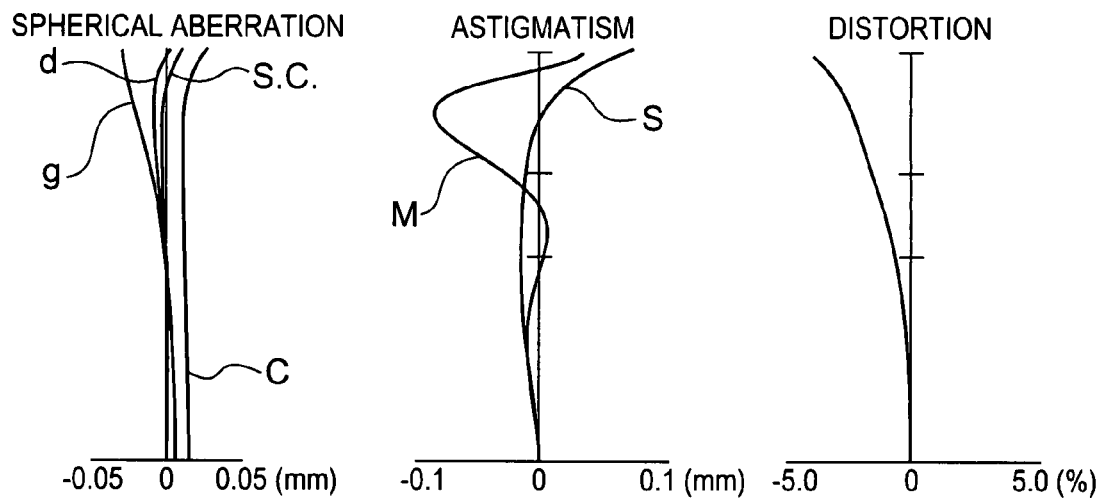
(EMBODIMENT 15: WIDE-ANGLE END)
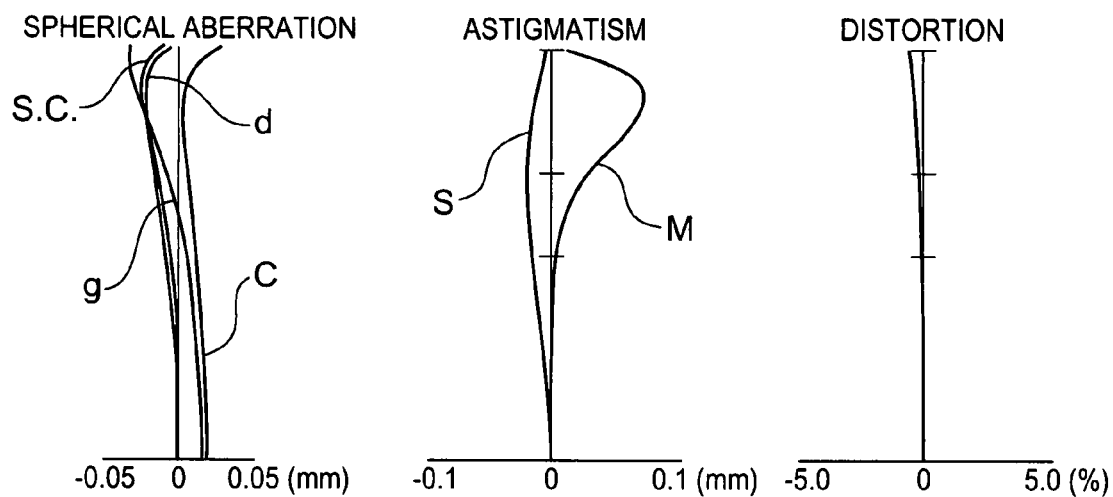
(EMBODIMENT 15: INTERMEDIATE AREA)
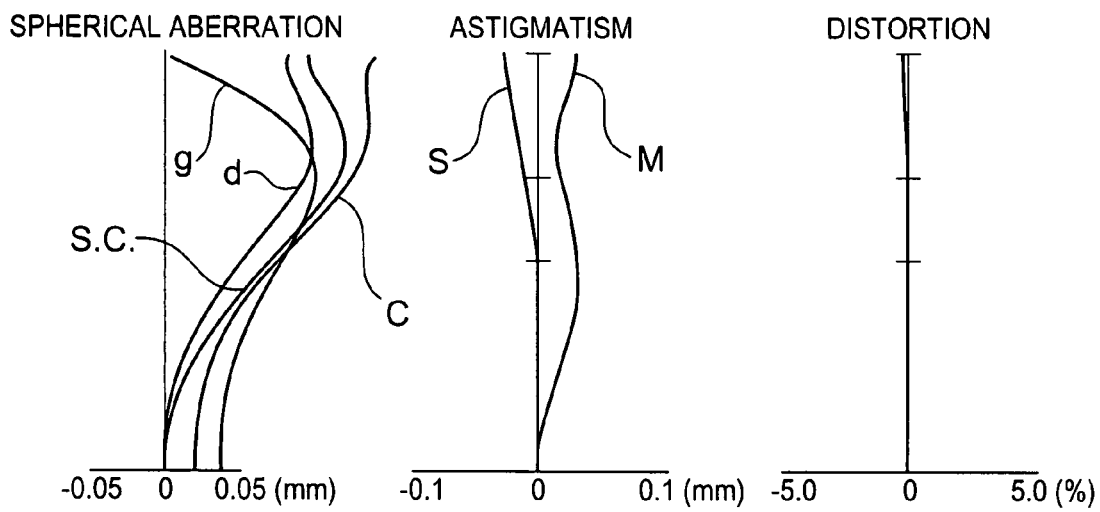
(EMBODIMENT 15: TELEPHOTO END)

FIG. 32
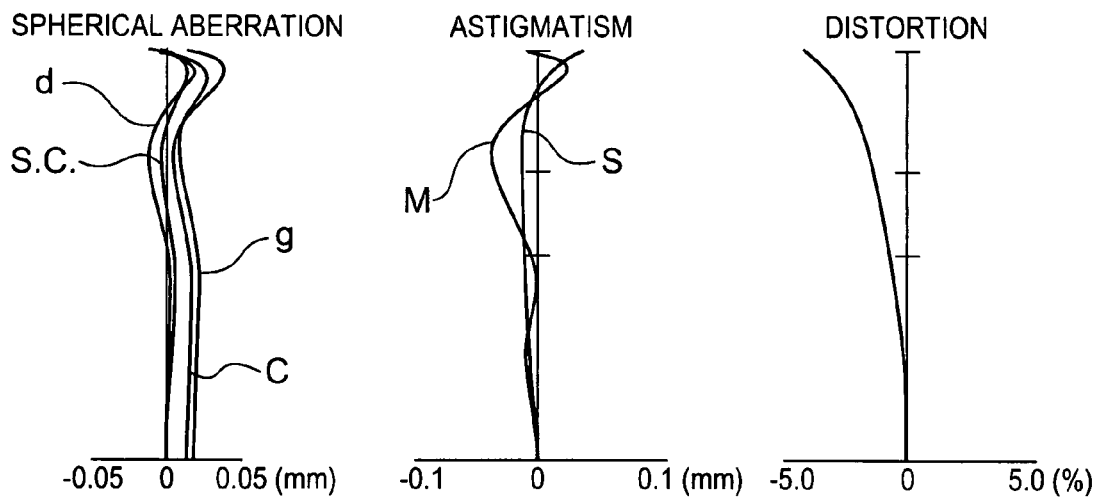
(EMBODIMENT 16: WIDE-ANGLE END)
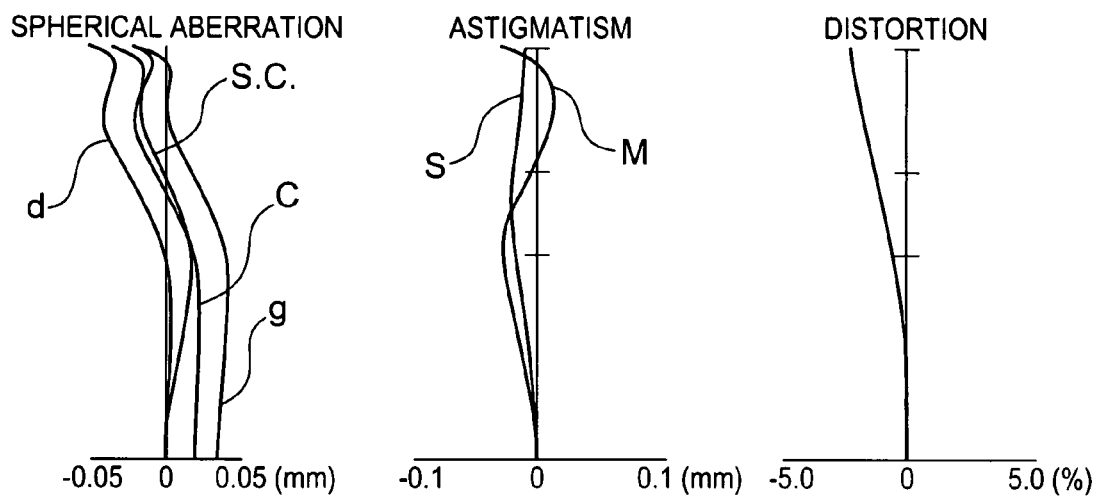
(EMBODIMENT 16: INTERMEDIATE AREA)
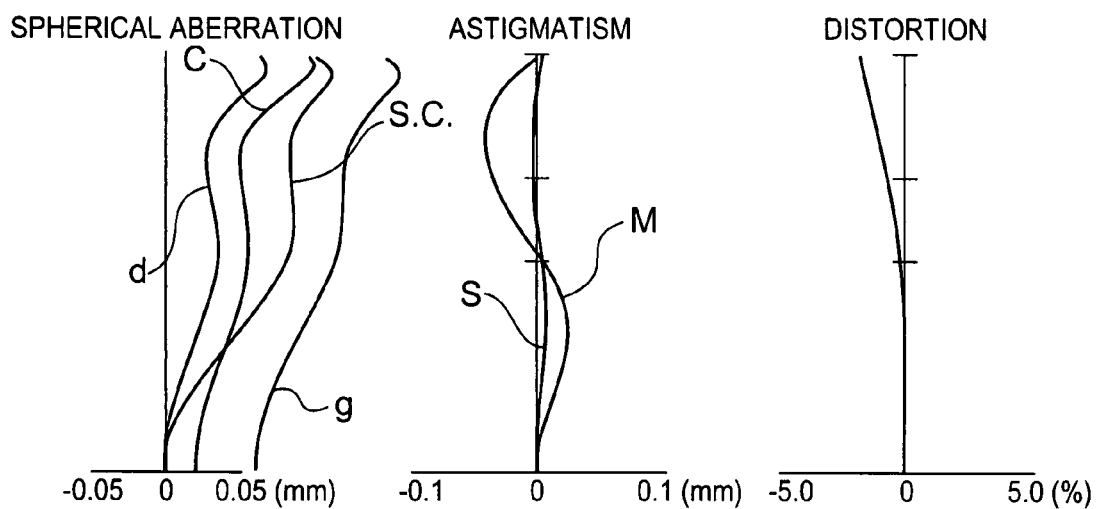
(EMBODIMENT 16: TELEPHOTO END)

(EMBODIMENT 17)

FIG. 34
(EMBODIMENT 17: WIDE-ANGLE END)
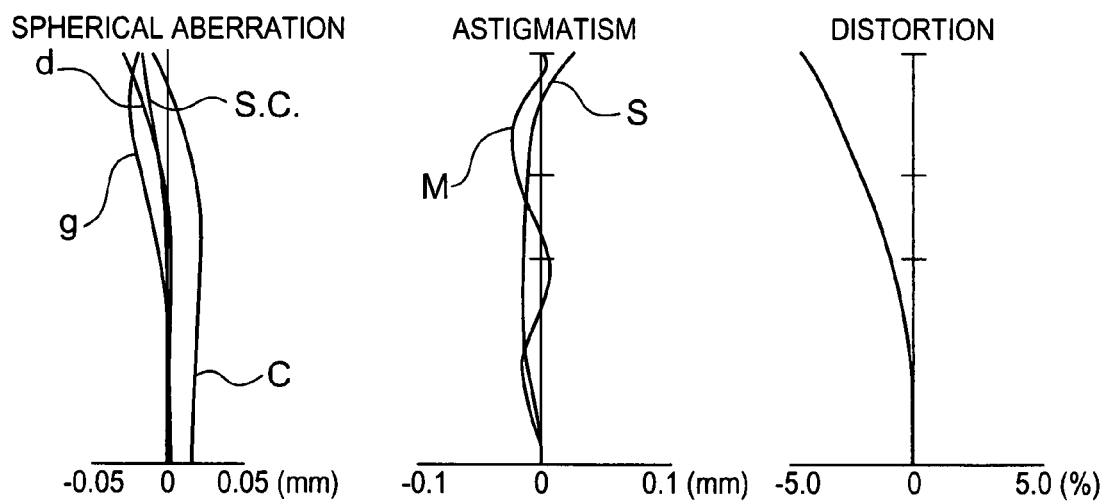
(EMBODIMENT 17: INTERMEDIATE AREA)
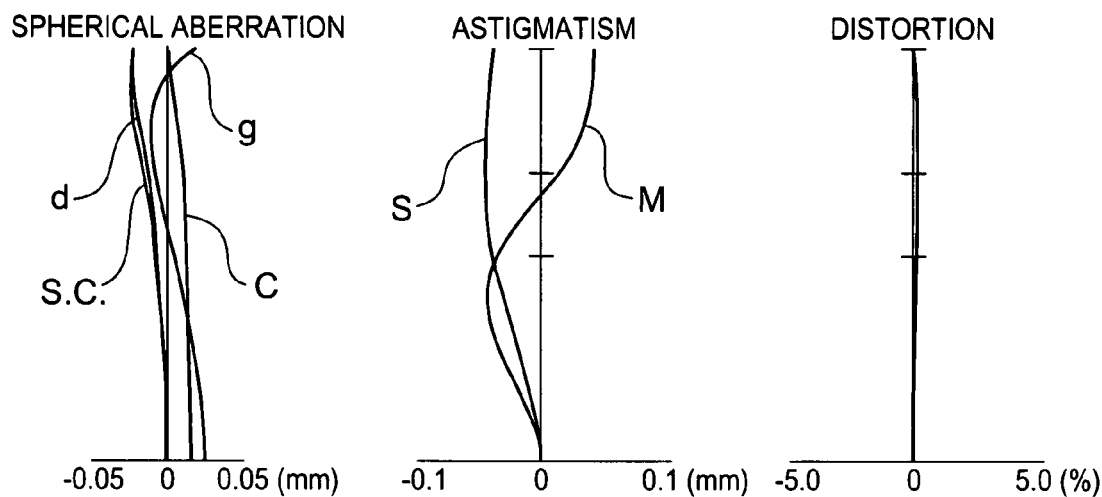
(EMBODIMENT 17: TELEPHOTO END)
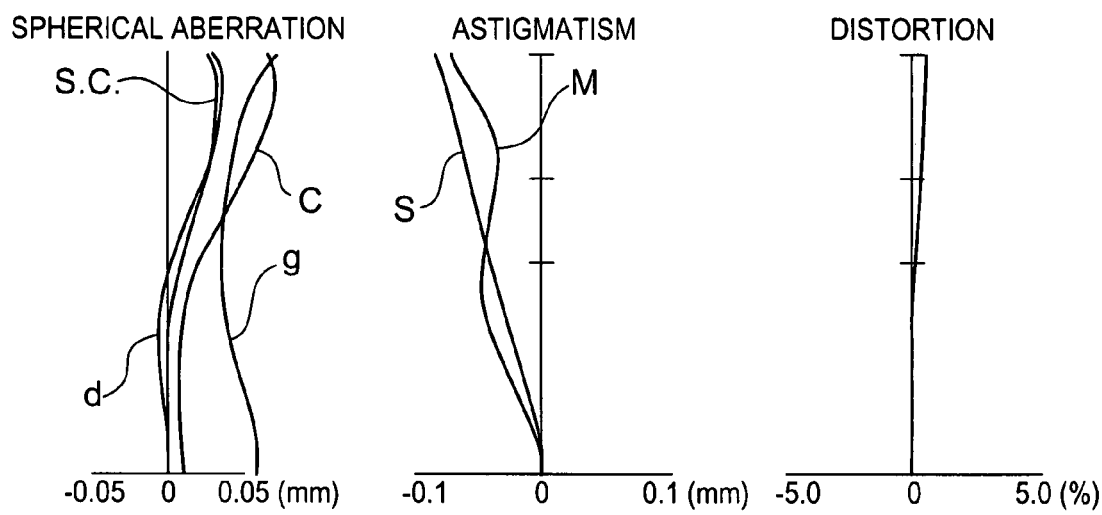

(EMBODIMENT 18)

FIG. 36
(EMBODIMENT 18: WIDE-ANGLE END)
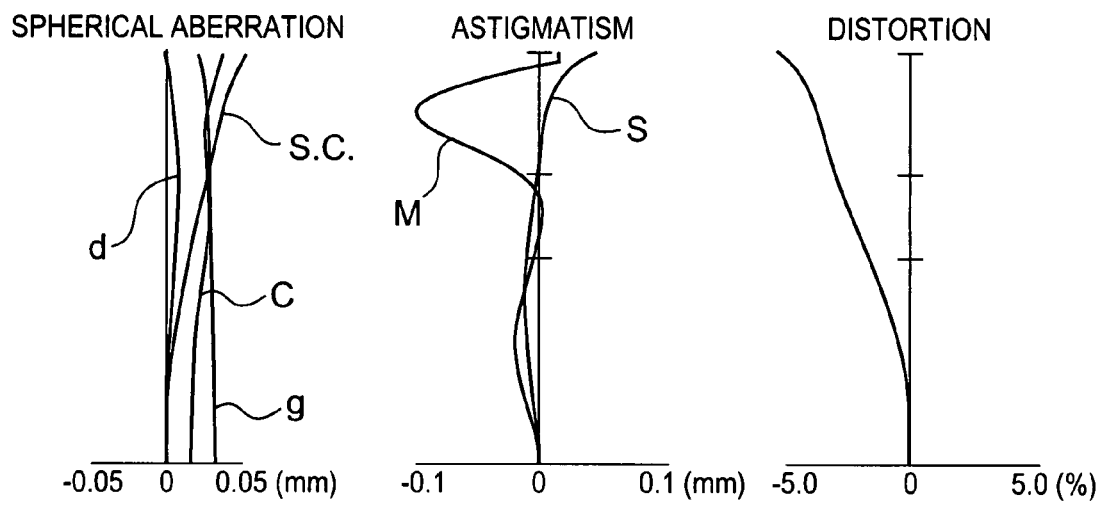
(EMBODIMENT 18: INTERMEDIATE AREA)
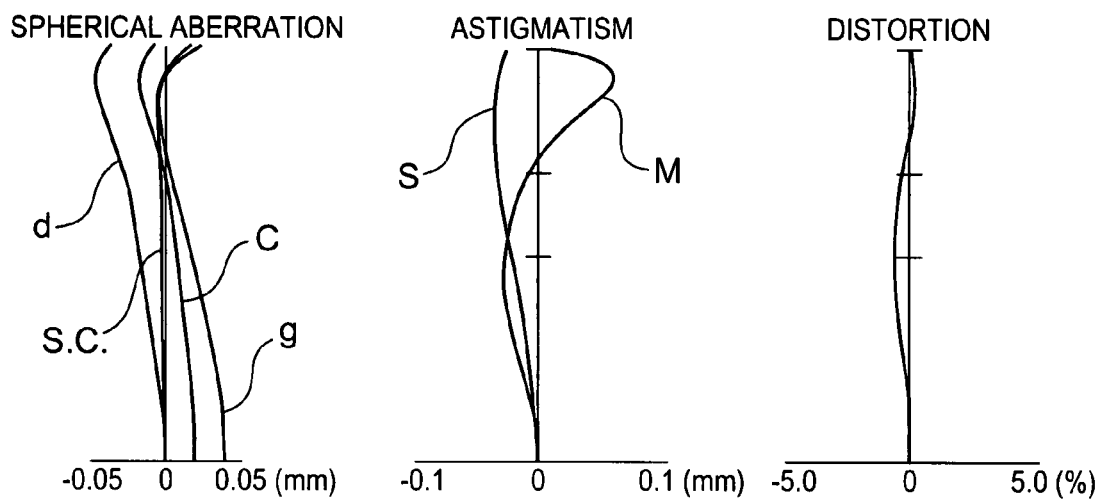
(EMBODIMENT 18: TELEPHOTO END)
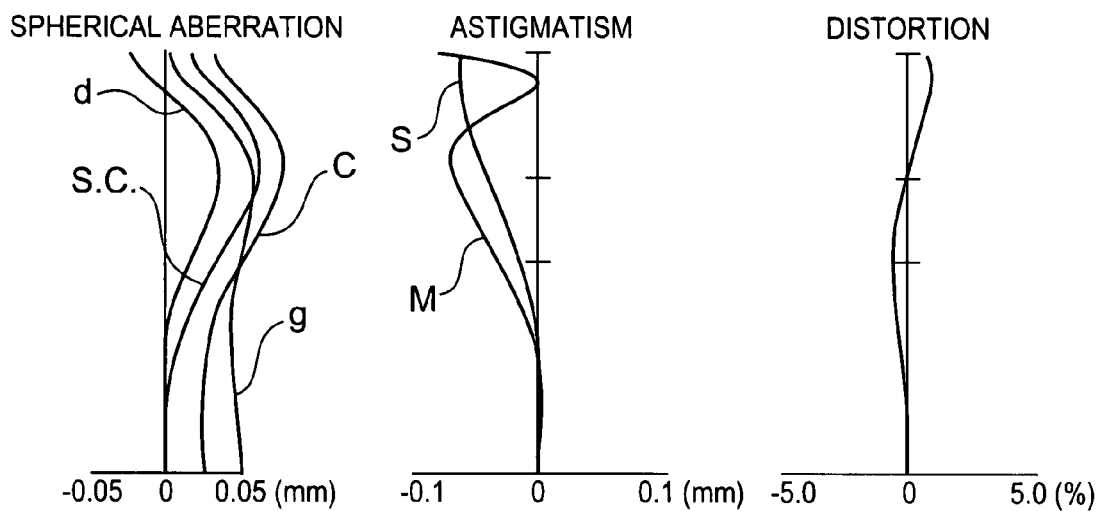

FIG. 38
(EMBODIMENT 19: WIDE-ANGLE END)
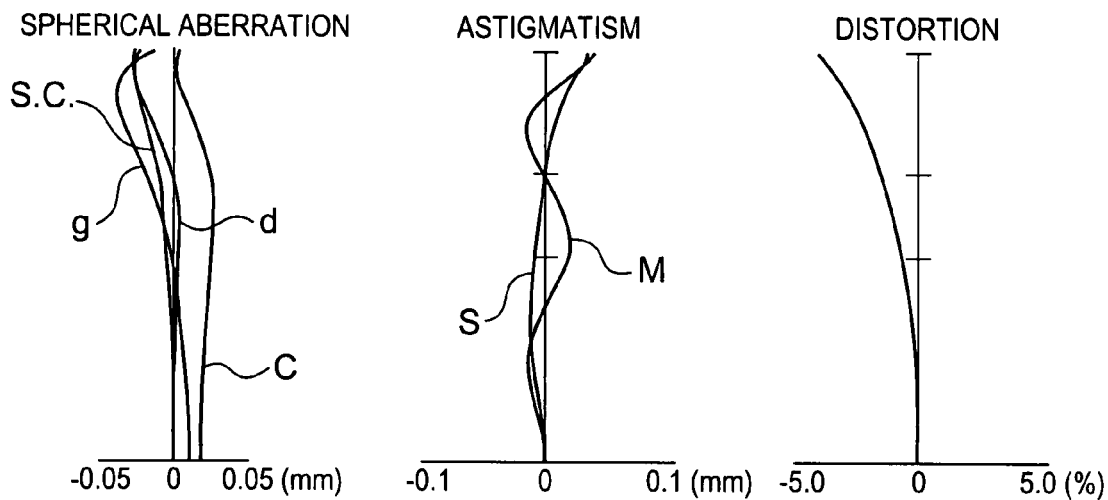
(EMBODIMENT 19: INTERMEDIATE AREA)
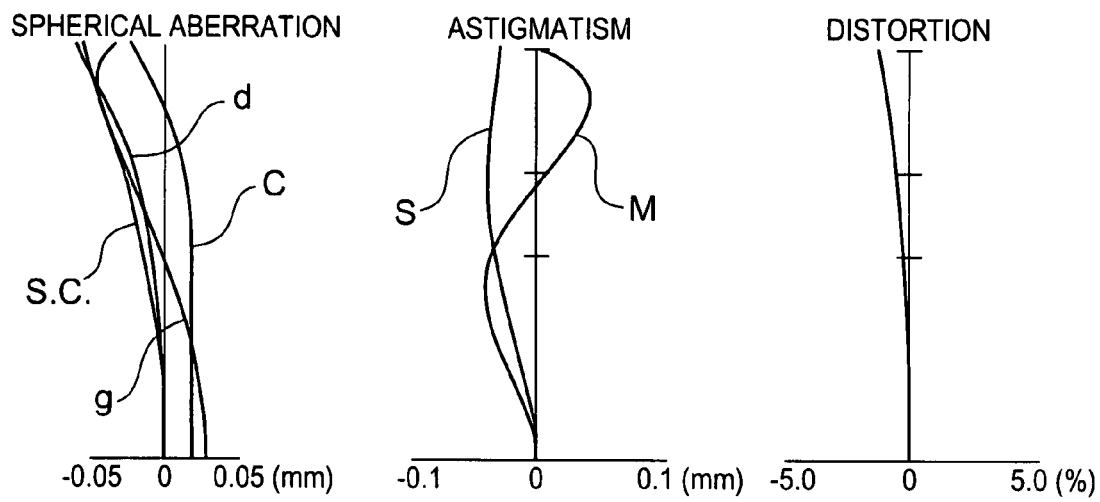
(EMBODIMENT 19: TELEPHOTO END)
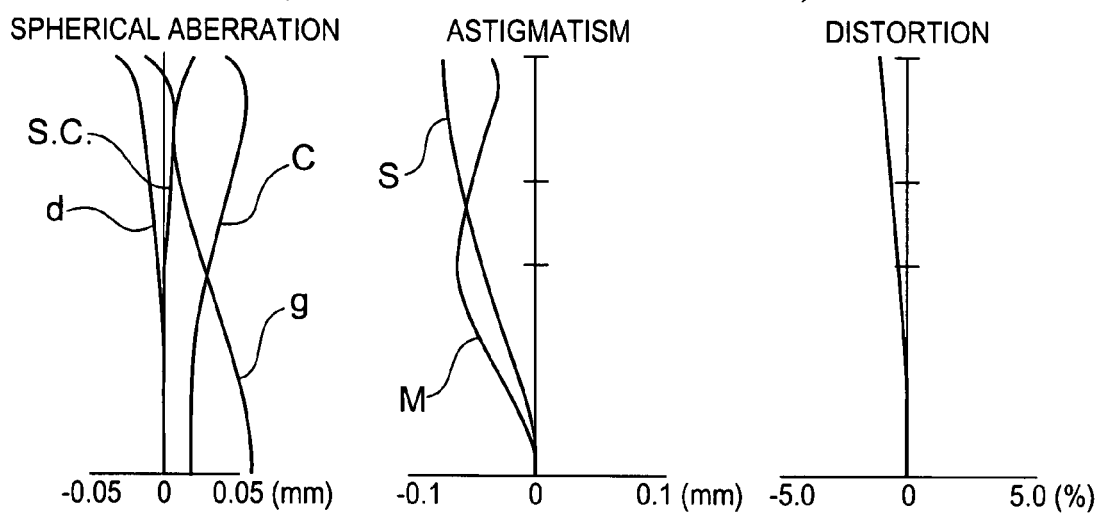

FIG. 40
(EMBODIMENT 20: WIDE-ANGLE END)
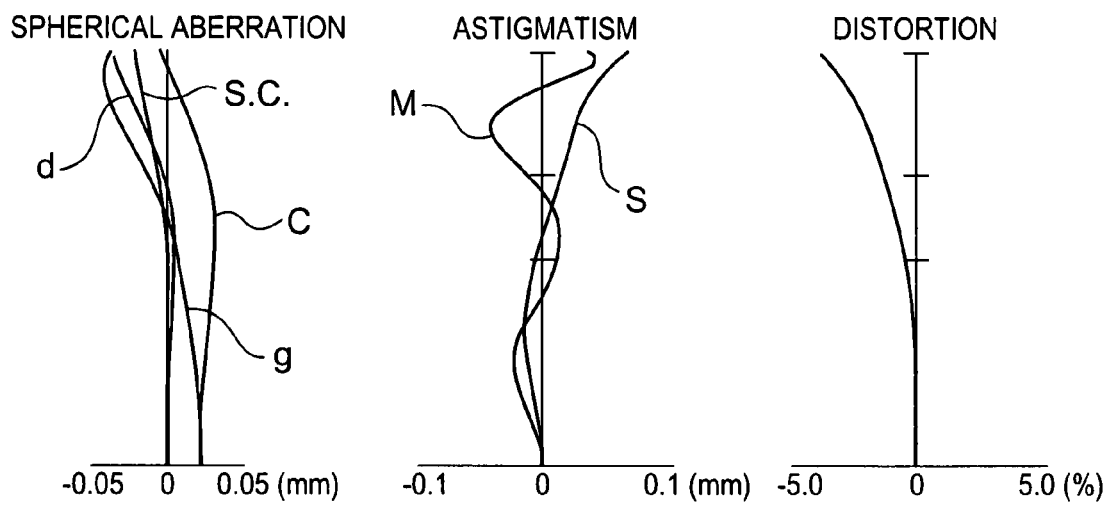
(EMBODIMENT 20: INTERMEDIATE AREA)
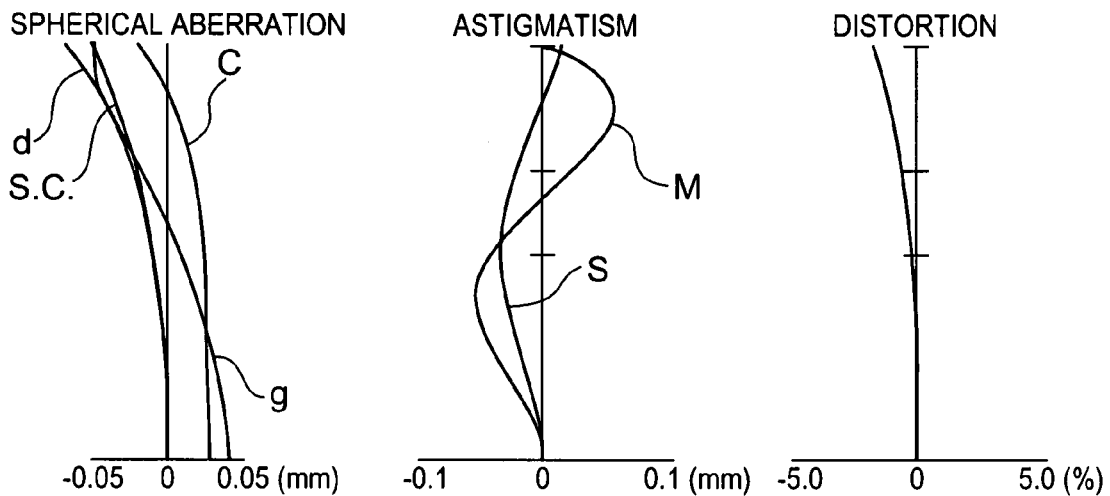
(EMBODIMENT 20: TELEPHOTO END)
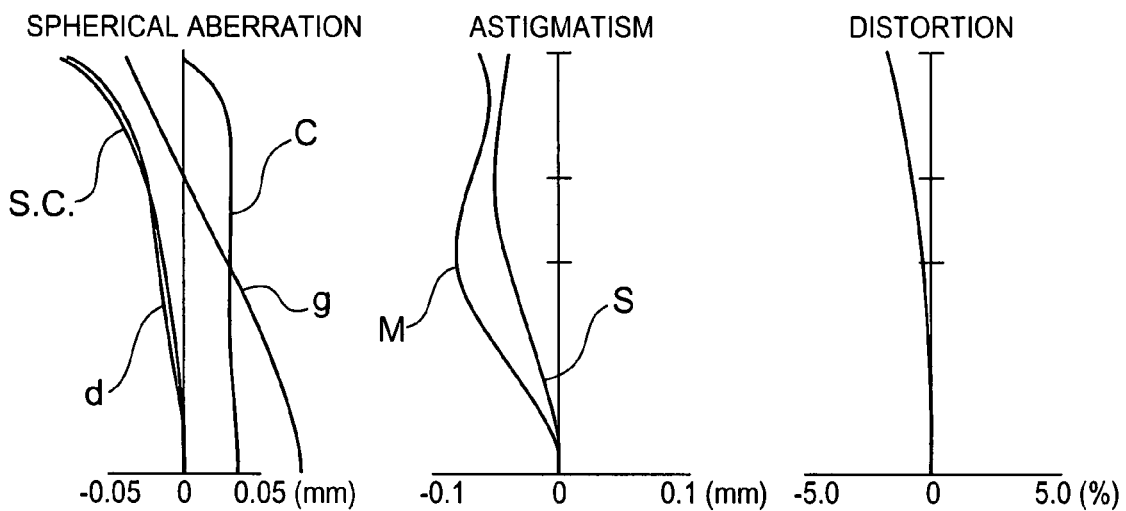

FIG. 42
(EMBODIMENT 21: WIDE-ANGLE END)
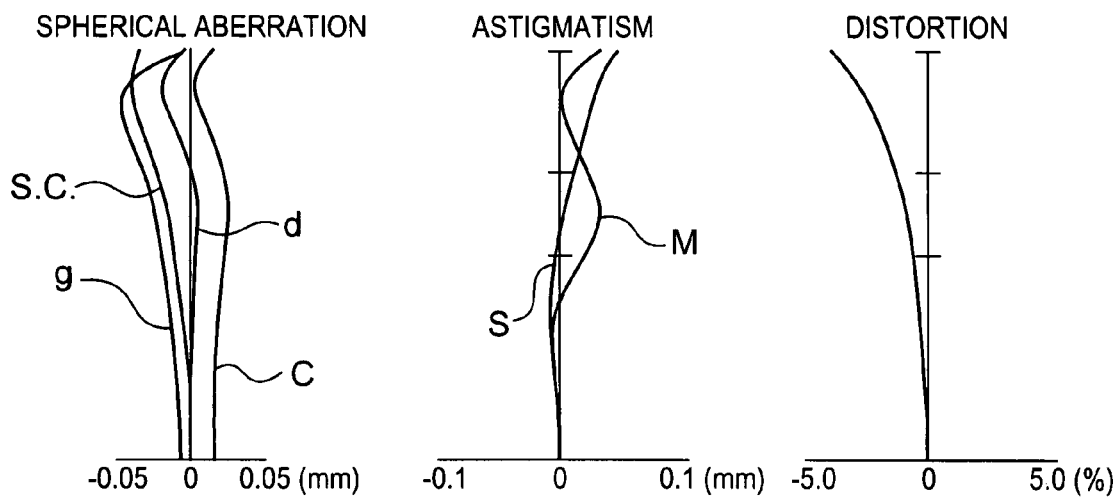
(EMBODIMENT 21: INTERMEDIATE AREA)
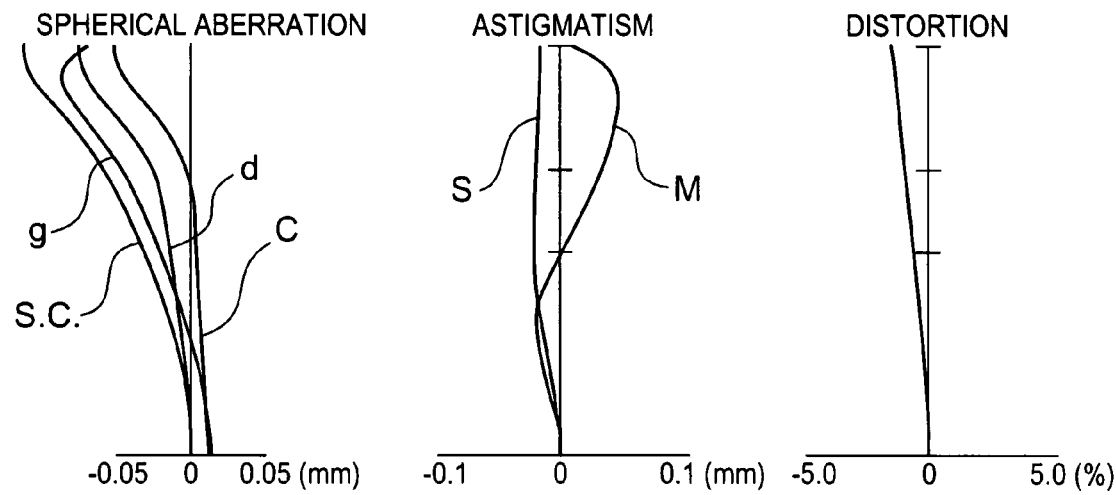
(EMBODIMENT 21: TELEPHOTO END)
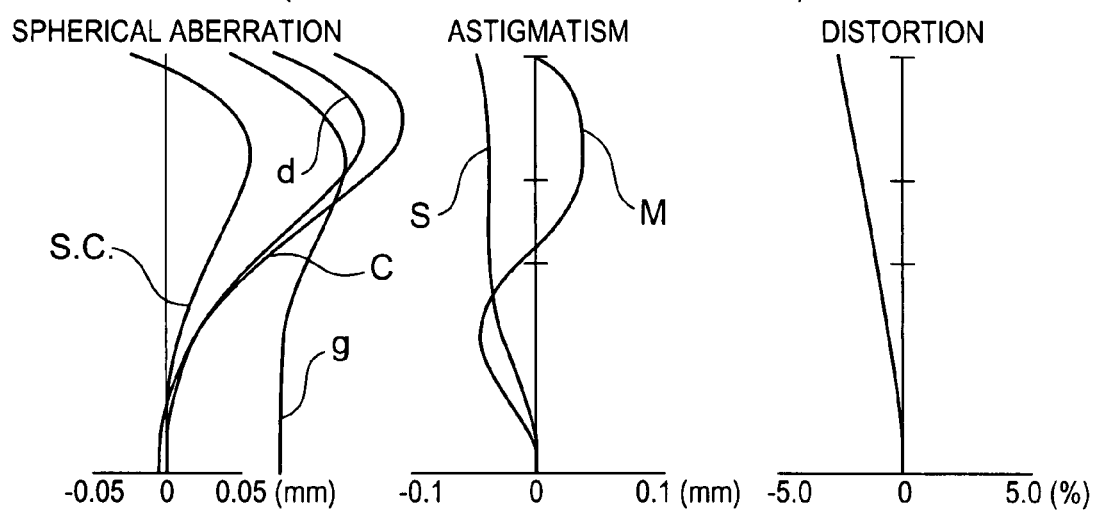

(EMBODIMENT 22)

FIG. 44
(EMBODIMENT 22: WIDE-ANGLE END)
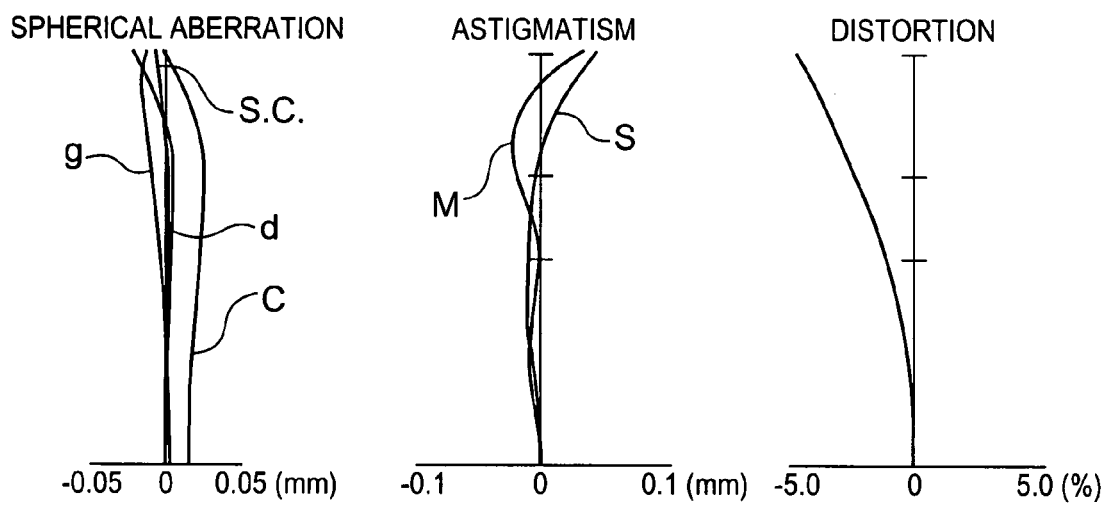
(EMBODIMENT 22: INTERMEDIATE AREA)
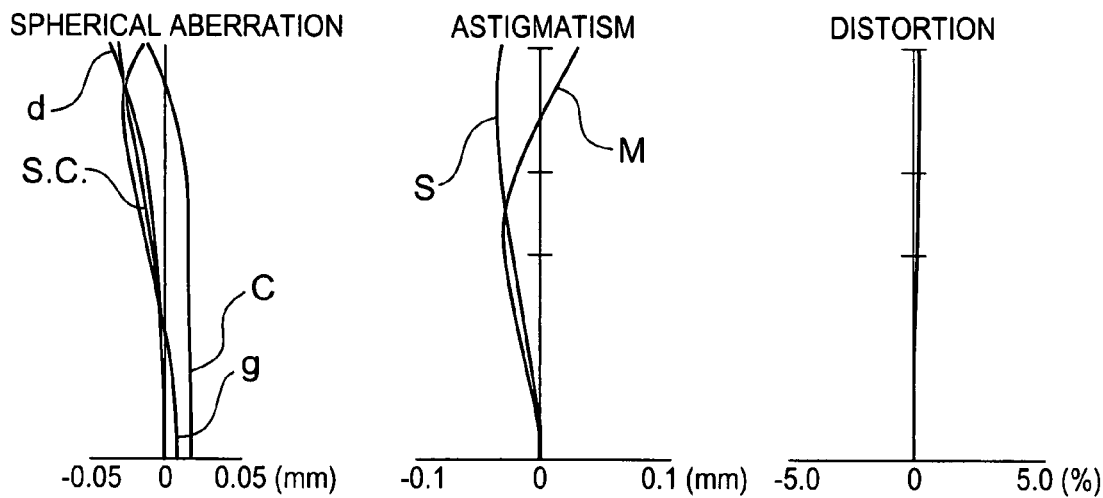
(EMBODIMENT 22: TELEPHOTO END)
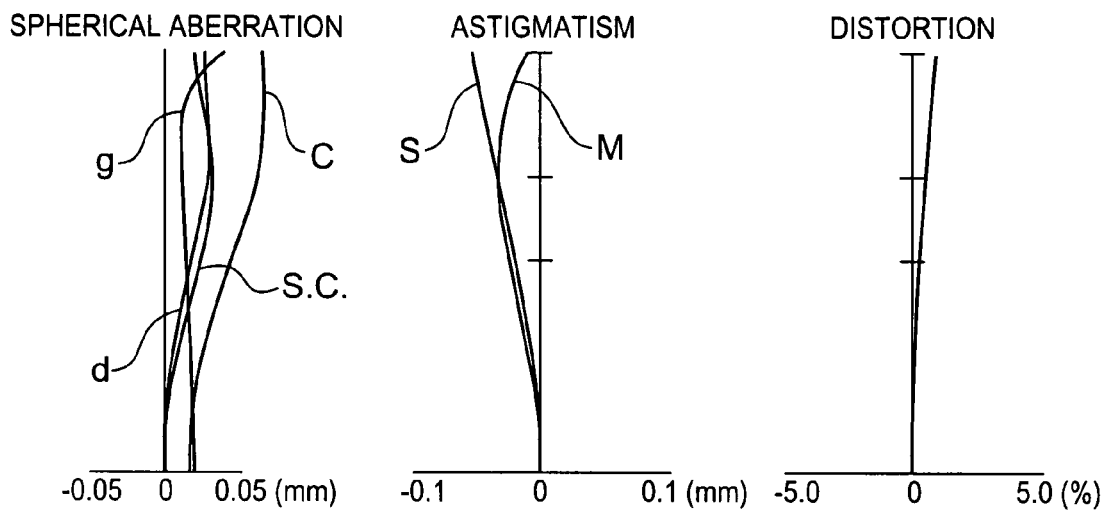

(EMBODIMENT 23)

FIG. 46
(EMBODIMENT 23: WIDE-ANGLE END)
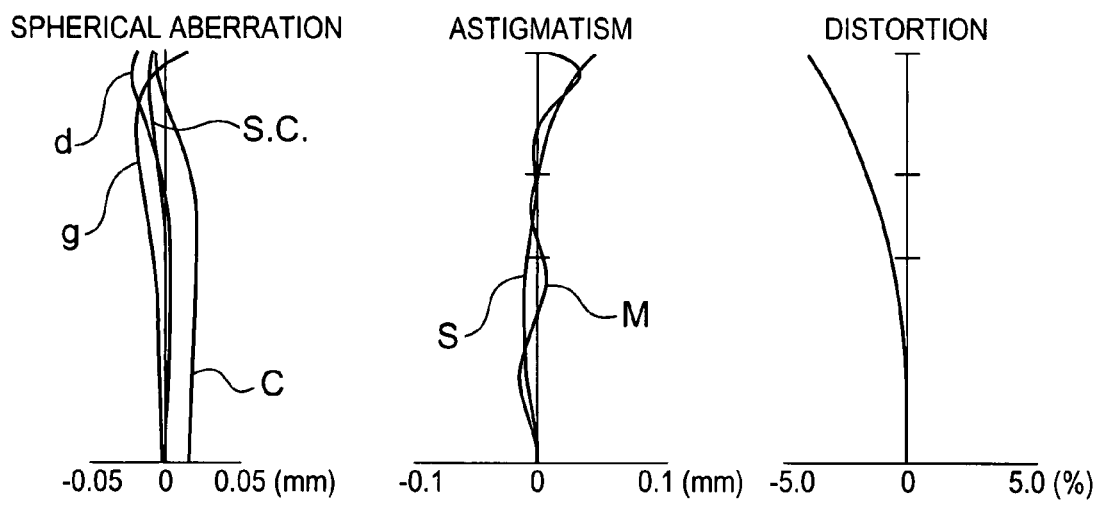
(EMBODIMENT 23: INTERMEDIATE AREA)
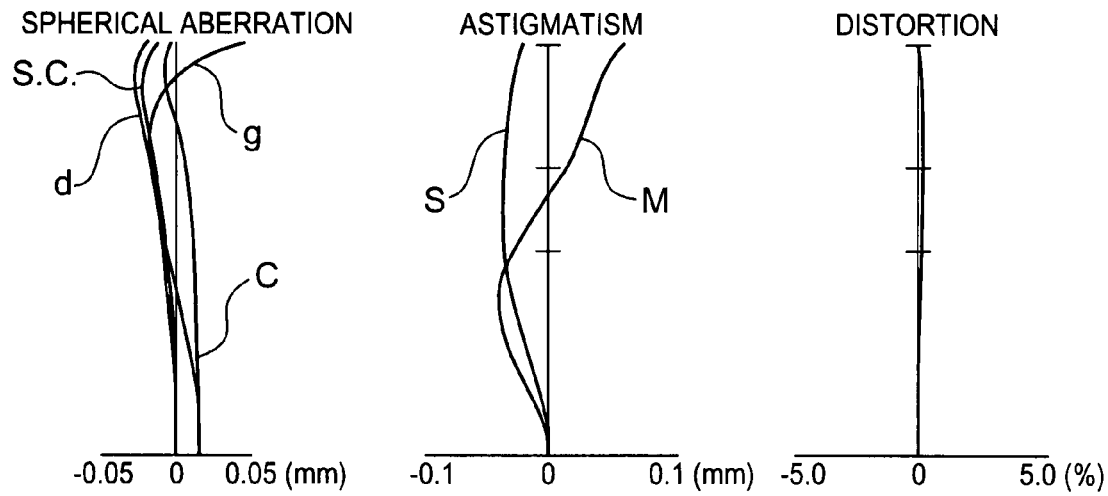
(EMBODIMENT 23: TELEPHOTO END)
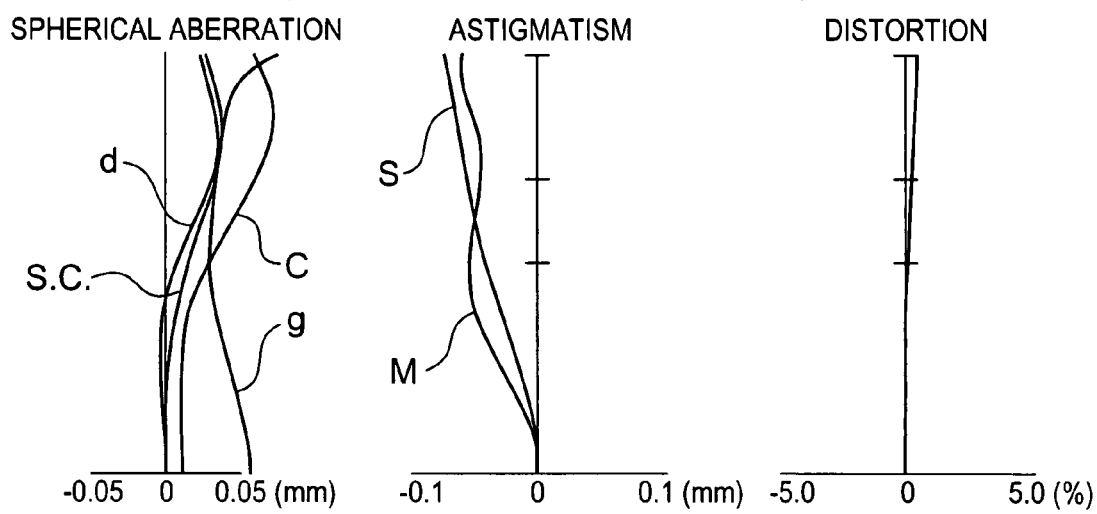

(EMBODIMENT 24)

FIG. 48
(EMBODIMENT 24: WIDE-ANGLE END)
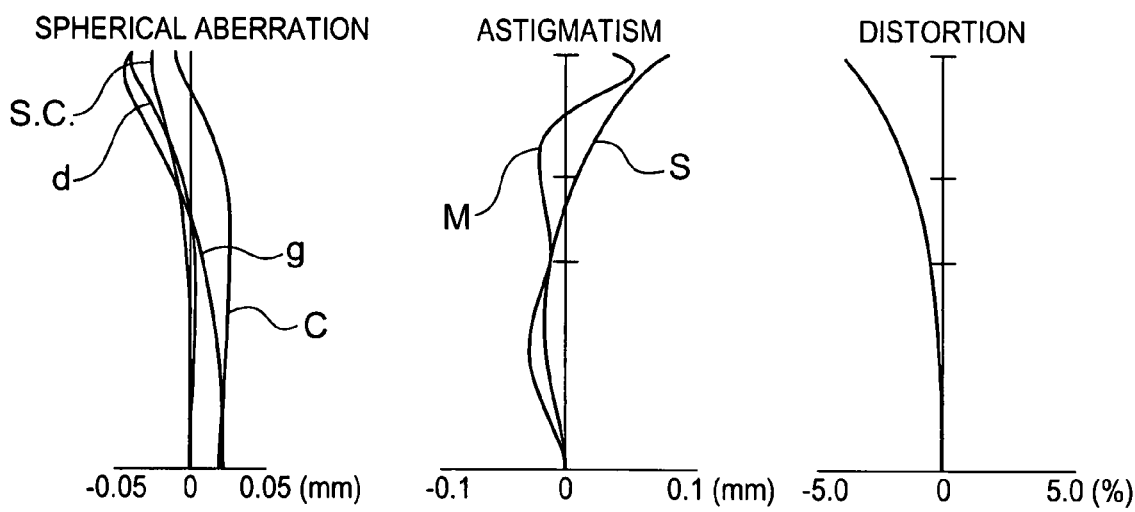
(EMBODIMENT 24: INTERMEDIATE AREA)
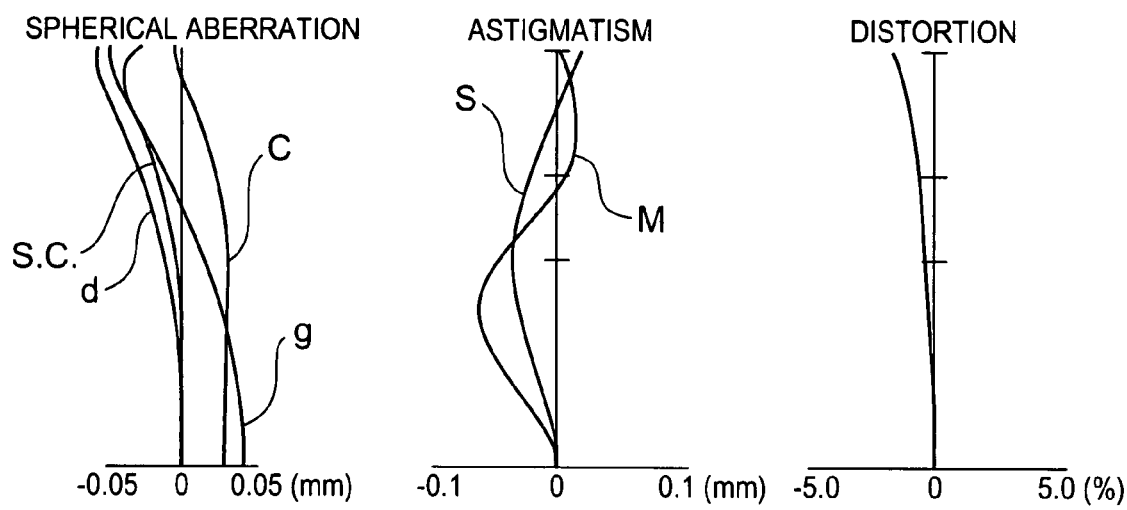
(EMBODIMENT 24: TELEPHOTO END)
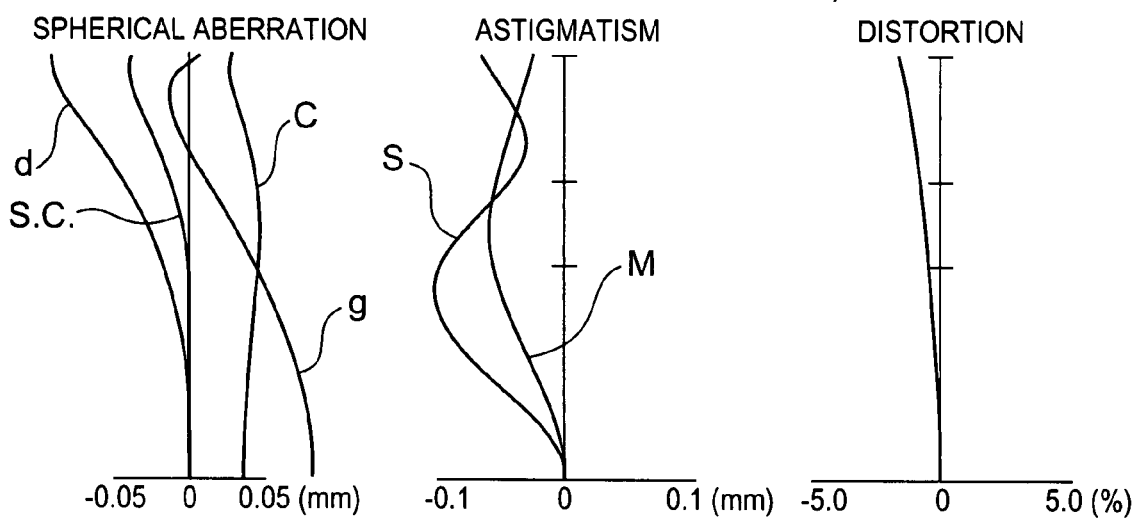

ZOOM LENS AND CAMERA WITH ZOOM LENS

BACKGROUND OF THE INVENTION

The present invention relates to a high-performance and fast (small f number) zoom lens which is used for a small sized photographic apparatus which utilizes an image sensor such as a CCD (charged coupled device) which is designed to be installed mainly on a digital still camera.

Small sized digital still cameras have been produced by devising systems and mechanisms which include the adoption of a single focus lens which can help reduce a dimension of the camera in a direction of an optical axis of the lens as much as possible in order to design a thin camera main body and, furthermore, the creation of a lens such as one disclosed in, for example, the Japanese Patent Unexamined Publication No. 2002-228922 (Patent Document No. 1) in which telecentric characteristics which are inherent in image sensors such as CCD's are taken into consideration. However, the installation of zoom lenses on cameras has been in strong demand, and currently, even in the field of digital still cameras, a main stream of digital still cameras produced and sold has been shifted to those with a zoom lens.

The invention is such as to provide a small sized zoom lens or a small camera with a zoom lens.

SUMMARY OF THE INVENTION

According to a preferred aspect of the invention, there is provided a zoom lens including, sequentially from an object side thereof, a first lens elements group having a negative refraction power as a whole, a second lens elements group having a positive refraction power as a whole and a third lens element group having a negative refraction power as a whole. The first lens elements group is made up by disposing three lens elements which include a first lens element which is a negative or diverging lens, a second lens element which is a positive or converging lens, and a third lens element which is a negative or diverging lens. The second lens elements group is made up by disposing four lens elements which include a fourth lens element which is a positive or converging lens, a fifth lens element which is a positive or converging lens, a sixth lens element which is a negative or diverging lens, and a seventh lens element which is a positive or converging lens. And the third lens element group is made up by disposing an eighth lens element which is a negative or diverging lens. A variable power is realized by shifting the positions of the first lens elements group and the second lens elements group in a direction of an optical axis thereof, or by shifting, in addition to the positions of the first lens elements group and the second lens elements group, the position of the third lens element group in a direction of an optical axis thereof.

BRIEF DESCRIPTION OF THE DRAWINGS

FIG. 2 is a diagram showing aberrations of the first embodiment.

FIG. 4 is a diagram showing aberrations of the second embodiment.

FIG. 6 is a diagram showing aberrations of the third embodiment.

FIG. 8 is a diagram showing aberrations of the fourth embodiment.

FIG. 10 is a diagram showing aberrations of the fifth embodiment.

FIG. 12 is a diagram showing aberrations of the sixth embodiment.

FIG. 14 is a diagram showing aberrations of the seventh embodiment.

FIG. 16 is a diagram showing aberrations of the eighth embodiment.

FIG. 20 is a diagram showing aberrations of the tenth embodiment.

FIG. 22 is a diagram showing aberrations of the 11th embodiment.

FIG. 24 is a diagram showing aberrations of the 12th embodiment.

FIG. 26 is a diagram showing aberrations of the 13th embodiment.

FIG. 28 is a diagram showing aberrations of the 14th embodiment.

FIG. 30 is a diagram showing aberrations of the 15th embodiment.

FIG. 32 is a diagram showing aberrations of the 16th embodiment.

FIG. 34 is a diagram showing aberrations of the 17th embodiment.

FIG. 36 is a diagram showing aberrations of the 18th embodiment.

FIG. 38 is a diagram showing aberrations of the 19th embodiment.

FIG. 40 is a diagram showing aberrations of the 20th embodiment.

FIG. 42 is a diagram showing aberrations of the 21st embodiment.

FIG. 44 is a diagram showing aberrations of the 22nd embodiment.

FIG. 46 is a diagram showing aberrations of the 23rd embodiment.

FIG. 48 is a diagram showing aberrations of the 24th embodiment.

DESCRIPTION OF THE PREFERRED EMBODIMENTS

Figure 1:
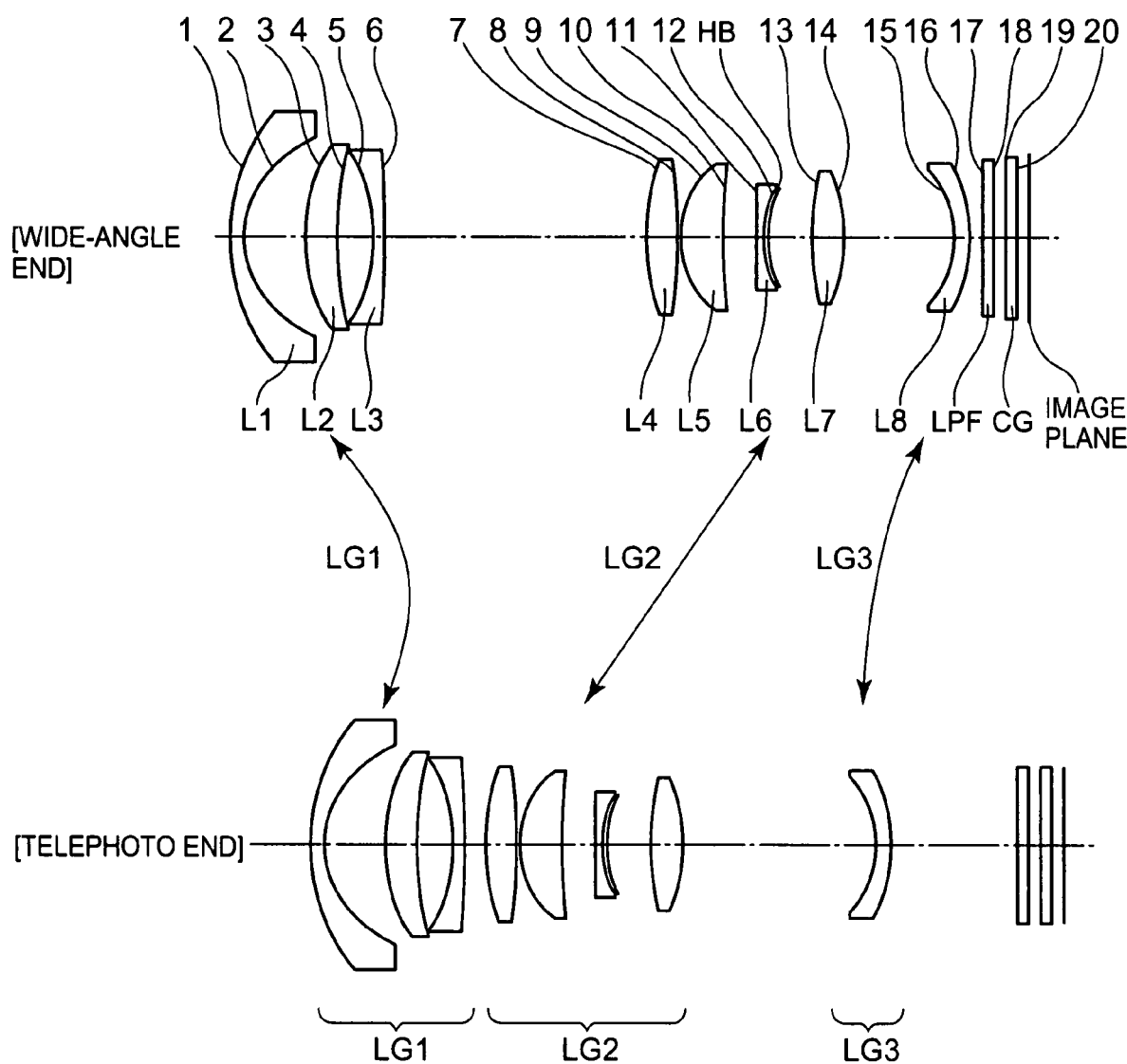
FIG. 1 is a diagram showing the configuration of lens elements of a first embodiment of a zoom lens of the invention.

Hereinafter, Embodiments 1 to 16 of the invention will be described by reference to specific numerical examples thereof.

In Embodiments 1 to 16 which will be described below, a zoom lens is made up of, sequentially from an object side thereof, a first lens elements group LG1, a second lens elements group LG2 and a third lens elements group LG3.

The first lens elements group LG1 has a negative refraction power as a whole and is made up by disposing a first lens element L1 (an object side surface of the first lens element L1 is to be referred to as a $1^{st}$ surface, and an image side surface as a $2^{nd}$ surface) which is a lens having a negative refraction power (hereinafter referred to as a negative lens), a second lens element L2 (an object side surface of the second lens element L2 is to be referred to as a $3^{rd}$ surface, and an image side surface as a $4^{th}$ surface) which is a lens having a positive refraction power (hereinafter, referred to as a positive lens) and a third lens element L3 (an object side surface of the third lens element L3 is to be referred to as a $5^{th}$ surface, and an image side surface as a $6^{th}$ surface) which is a negative lens.

The second lens elements group LG2 has a positive refraction power as a whole and is made up by disposing a fourth lens element L4 (an object side surface of the fourth lens element L4 is to be referred to as a $7^{th}$ surface, and an image side surface as an $8^{th}$ surface) which is a positive lens, a fifth lens element L5 (an object side surface of the fifth lens element L5 is to be referred to as a $9^{th}$ surface, and an image side surface as a $10^{th}$ surface) which is a positive lens, a sixth lens element L6 (although an object side surface of the sixth lens element L6 is referred to be as an $11^{th}$ surface and an image side surface as a $12^{th}$ surface, in a case where the fifth lens element L5 and the sixth lens element L6 are cemented together, only the surface number of the $11^{th}$ surface is indicated as parenthesized, or in a case where the $11^{th}$ surface or the $12^{th}$ surface constitutes a resin surface of a compound aspheric lens, a boundary plane between the resin and air is to be referred to as an HB plane) which is a negative lens and a seventh lens element L7 (an object side surface of the seventh lens element L7 is to be referred to as a $13^{th}$ surface, and an image side surface as a $14^{th}$ surface) which is a positive lens.

The third lens element group LG3 has a negative refraction power as a whole and is made up by disposing an eighth lens element L8 (an object side surface of the eighth lens element L8 is to be referred to as a $15^{th}$ surface, and an image side surface as a $16^{th}$ surface) which is a negative lens.

In addition, a crystal optical filter LPF (an object side surface of the crystal optical filter LPF is to be referred to as a $17^{th}$ surface, and an image side surface as an $18^{th}$ surface) and a cover glass CG (an object side surface of the cover glass CG is to be referred to as a $19^{th}$ surface, and an image side surface as a $20^{th}$ surface) which is for protection of a photographic portion of a CCD are disposed within an air space defined between the image side surface, which is the $16^{th}$ surface, of the eighth lens element L8 and an image plane.

The cutting of infrared rays which is required in handling an image sensor such as a CCD is understood to be implemented by applying an infrared reflection coating on to one side of refracting surfaces of the crystal optical filter LPF and, hence, is not illustrated.

A variable power is realized by shifting the positions of the first lens elements group LG1 and the second lens elements group LG2 in a direction of an optical axis of the zoom lens, or shifting, in addition to the first lens elements group LG1 and the second lens elements group LG2, the position of the third lens element group LG3.

In addition, in each embodiment, although a focal point adjustment for an object at a finite distance can be realized by shifting the position of the first lens elements group LG1 or the third lens element group LG3 in the direction of the optical axis, the implementation of focal point adjustment is not limited to the relevant method.

Furthermore, the shape of an aspheric surface used in each embodiment is defined as is known by giving a paraxial radius of curvature: R, a conic constant: K and high-order aspherical coefficients: A, B, C, D on a curved surface that is obtained by rotating round the optical axis a curve given by an aspherical equation:

$$Z=(Y^2/R)/[1+\sqrt{\{1-(1+K)(Y/R)^2\}}]+A\cdot Y^4+B\cdot Y^6+C\cdot Y^8+C\cdot Y^{10}+\ldots$$

when the Z axis is taken in the direction of the optical axis and the Y axis is taken in a direction which intersects the optical axis at right angles. Note that in the description of conic constants and high-order aspherical coefficients in tables, "E and numerals which follow it" represents an "exponent of 10." For example, "E-04" means $10^{-4}$, and a number just before it is multiplied by this number.

In addition, this embodiment satisfies the following conditional expression (1) with respect to the power that the first lens element group possesses, the following conditional expression (2) with respect to the size of the whole lens system, and the following conditional expression (3) with respect to the power that the third lens element group possesses.

$$-0.8 \leq f_w/f_I \leq -0.45 \quad (1)$$

$$4.5 \leq TL_w/f_w \leq 7.5 \quad (2)$$

$$-0.55 \leq f_w/f_{III} \leq 0 \quad (3)$$

where, $f_w$: composite focal length of the whole lens system at wide-angle end $f_I$: composite focal length of the first lens element group $f_{III}$: composite focal length of the third lens element group $TL_w$: distance from an object side surface of the first lens element making up the first lens elements group to the image plane at wide-angle end (where, a parallel plane glass portion is converted into an air space distance).

The conditional expression (1) relates to a proper distribution of power to the first lens element group which has the negative power.

This constitutes a balance for a condition for proper correction of the size and aberrations of the whole optical system. In the event that a lower limit is surpassed, this means that the negative power of the first lens elements group is large, and in conjunction with this, the positive power of the second lens elements group has to be intensified, and it becomes difficult to keep a balance among the aberrations, whereby the performance is decreased. In contrast to this, in the event that an upper limit is surpassed, large air spaces to the second lens elements group having the positive power have to be taken, whereby the size of the whole optical system is enlarged, and as a result, the compactness is lost.

The conditional expression (2) is such as to control the overall length of the zoom lens at the wide-angle end. Namely, this constitutes a condition which becomes a measure of reduction in size of the zoom lens of the invention.

In the event that an upper limit is surpassed, although it becomes advantageous in correcting the aberrations, it becomes impossible to provide a compact zoom lens, which is the object of the invention. On the contrary, in the event that a lower limit is surpassed, the power of each lens element has to be increased, and this calls for deterioration in the aberrations, whereby the production of the object zoom lens becomes difficult in reality.

The third conditional expression (3) is a conditional expression which is related to the power that the third lens element group possesses. It is a prime characteristic that it remains within the negative range, whereby a function is provided to cause the exit pupil of the optical system to approach the image plane side.

In general, the fact that the exit pupil is positioned in the proximity of the image plane is advantageous in making the zoom lens compact in such a way as to decrease the overall length thereof. In contrast thereto, this means that the telecentric characteristics on the periphery of the picture plane are collapsed. Namely, a principal ray of light passing through an image point on the periphery of the picture plane is angled, which is not good for an optical system which uses an image sensor such as a CCD.

Normally, in a zoom lens at a magnification of the order of 3×, the angle of a principal ray of light passing through an image point on the periphery of the picture plane is changed by an operation for variable power. Although it is natural that the amount of change differs depending on designs, in many cases, the amount of change in angle is nearly on the order of 10° or more at an image point of a maximum image height (for example, 10° at the wide-angle end, 0° at the telephoto end). In the case of a single focus lens which is free from change in angle of the principal ray of light, however, the change can exceed 20° by adapting the construction of a microlens of a CCD.

With the zoom lens of this embodiment, since by giving the negative power to the third lens element group, the change in angle of the principal ray of light when changing the magnification becomes about 1.9° to 4.9°, which is extremely small compared to the corresponding amount of change of a zoom lens of normal type, a large angle can be taken for the principal ray of light. In embodiments which will be described later on, the angle of a principal ray of light (when a bisector of an angle formed by an upper ray of light and a lower ray of light is defined as a principal ray of light) at a maximum image point on the picture plane is limited to be a maximum of 20°, and a lower limit value that is specified by the conditional expression of the conditional expression (3) is to be a range where the negative power of the third lens element group can be taken in that state. When the lower limit is surpassed, although it is effective in making the system compact, the angle of the principal ray of light exceeds 20°, and problems are caused of shading and insufficient quantity of light, whereby the high image quality required for a digital still camera or the like becomes unable to be maintained. On the contrary, when an upper limit is surpassed, it means that an optical system of a size results which does not have to be made compact by the application of the invention.

Furthermore, this embodiment satisfies the following conditional expression (4) with respect to the power that the second lens element of the first lens elements group possesses, the following conditional expression (5) with respect to the dispersion properties that are distributed to each lens element of the first lens elements group, and the following conditional expression (6) with respect to the refractive index of the second lens element.

$$0.22 \leq f_w/f_2 \leq 0.55 \quad (4)$$

$$15 \leq (\upsilon_1 + \upsilon_3)/2 - \upsilon_2 \quad (5)$$

$$1.65 \leq n_2 \quad (6)$$

where, $f_2$: focal length of the second lens element which makes up the first lens elements group $\upsilon_1$: Abbe number of the first lens element which makes up the first lens elements group $\upsilon_2$: Abbe number of the second lens element which makes up the first lens elements group $\upsilon_3$: Abbe number of the third lens element which makes up the first lens elements group $n_2$: refractive index relative to the d line of the second lens element which makes up the first lens elements group.

The conditional expression (4) specifies a requirement for correcting properly basic aberrations of the first lens elements group as a whole.

Namely, as has been described above, although the first lens elements group is made up of the negative, positive and negative powers, chromatic aberration and curvature of field can basically be corrected by imparting a proper positive power to the second lens element within a range specified by the conditional expression (4) along with the selection of glass material based on the conditional expression (5) and the conditional expression (6). In the event that an upper limit is surpassed, although the power of the positive lens becomes too large, the power of the negative lens inevitably becomes too large, and high-order aberrations are produced. In the event that a lower limit is surpassed, although a combination of small powers is enabled, the correction effect of chromatic aberration and curvature of field is small, and in this case, too, a proper correction of the aberrations becomes impossible.

The conditional expression (5) relates to the distribution of Abbe numbers of the negative lenses and the positive lens which make up the first lens elements group. This is a conditional expression for properly maintaining the chromatic aberration correction for the first lens elements group, and a proper distribution of powers can be realized to enable a proper correction of chromatic aberration by implementing the selection of glass materials for the negative lenses and the positive lens which make up the first lens elements group based on a condition specified under the conditional expression (5). In the event that a lower limit is surpassed, the power of each lens becomes excessive in order to correct chromatic aberration, and the aberrations are deteriorated.

The conditional expression (6) specifies a condition for correction of curvature of field. The reduction in the Petzval sum is deal with by increasing the refractive index of the second lens element which is the only positive lens in the first lens element group, and therefore, in the event that a lower limit is surpassed, the curvature of field is increased.

In addition, in this embodiment, the first lens element which makes up the first lens elements group is an aspherical lens, and the embodiment satisfies the following conditional expression (7) with respect to the configuration of an image side surface thereof and also satisfies the following conditional expression (8) with respect to a relative characteristic on configuration between the image side surface of the first lens element and an object side surface of the second lens element which makes up the first lens elements group.

$$0.4 \leq f_w/r_2 \leq 1.4 \tag{7}$$

$$0 \leq r_2/r_3 \leq 1.5 \tag{8}$$

where, $r_2$: radius of curvature of the image side surface of the first lens element which makes up the first lens elements group $r_3$: radius of curvature of the object side surface of the second lens element which makes up the first lens elements group.

A basic configuration for suppressing the occurrence of off-axis aberrations such as coma aberration and distortion is realized by providing a concentric configuration relative to the entrance pupil under the strong negative power which is imparted to the first lens element, and the conditional expression (7) specifies a condition for realizing the relevant configuration.

Namely, the first lens element is formed into a meniscus configuration having the strong negative power. In the event that with the object side surface of the first lens element formed into an aspherical shape, a reduction in the overall length is implemented strongly, although the overall configuration can be said to take a meniscus configuration, when looking at a paraxial radius of curvature, there may occur a case where a resulting configuration constitutes a double-concave lens. In the event that a lower limit of the conditional expression (7) is surpassed, the occurrence of coma aberration and distortion cannot be suppressed sufficiently. On the contrary, in the event that an upper limit is surpassed, although it is effective to suppress the occurrence of aberrations, the curvature of the shape of the meniscus negative lens becomes excessive, and the production of the lens becomes difficult.

In addition, in order to correct effectively off-axis aberrations such as astigmatism and distortion, it is better to form the image side surface of the first lens element into an aspherical surface shape, and as this occurs, although as aspherical surfaces to be manufactured, a glass molded aspherical surface, a composite aspherical surface with a resin material and the like are preferred, there is no specific limitation on the method for manufacturing the aspherical surface.

The conditional expression (8) is a conditional expression for correcting properly a positive spherical aberration that is caused by a strong diverging action occurring on the image side surface of the first lens element having the negative power. In the event that an upper limit is surpassed, a negative spherical aberration by the second lens element becomes excessive, and on the contrary, in the event that a lower limit is surpassed, the positive spherical aberration by the first lens element becomes excessive, whereby in either of the cases, the spherical aberrations cannot be corrected properly.

In addition, this embodiment satisfies the following conditional expression (9) with respect to a positive composite power that the fourth lens element and the fifth lens element of the second lens elements group possess, the following conditional expression (10) with respect to the negative power that the sixth lens element possesses, the following conditional expression (11) with respect to the dispersion properties that are distributed to the fourth lens element, the fifth lens element and the sixth lens element which are disposed closer to the object side in the second lens elements group, and the following conditional expression (12) with respect to the refractive index that each of the similar lens elements possesses.

$$0.5 \leq f_w/f_{4,5} \leq 1.5 \tag{9}$$

$$-1.5 \leq f_w/f_6 \leq 0.25 \tag{10}$$

$$28 \leq (\upsilon_4+\upsilon_5)/2-\upsilon_6 \tag{11}$$

$$(n_4+n_5)/2-n_6 \leq -0.24 \tag{12}$$

where, $f_{4,5}$: composite focal length of the fourth lens element and the fifth lens element which make up the second lens elements group $f_6$: focal length of the sixth lens element which makes up the second lens elements group (where, in the event that the sixth lens element makes up a composite aspherical lens, a composite focal length of a base spherical lens and a resin portion)

$\upsilon_4$: Abbe number of the fourth lens element which makes up the second lens elements group $\upsilon_5$: Abbe number of the fifth lens element which makes up the second lens elements group $\upsilon_6$: Abbe number of the sixth lens element which makes up the second lens elements group (where, Abbe number of a glass material of a base spherical lens, in the event that the sixth lens element makes up a composite aspherical lens)

$n_4$: refractive index relative to the d line of the fourth lens element which makes up the second lens elements group $n_5$: refractive index relative to the d line of the fifth lens element which makes up the second lens elements group $n_6$: refractive index relative to the d line of the sixth lens element which makes up the second lens elements group.

The conditional expression (9) relates to the fourth lens element and the fifth lens element which are disposed closest to the object side in the second lens elements group and which have the strong positive power.

The conditional expression (9) provides a condition for imparting a large positive power for collecting rays of light which diverge from the first lens elements group and correcting properly the aberrations. In the event that an upper limit is surpassed, the positive power becomes excessive, and at the same time, the spherical aberration is corrected insufficiently, whereas in the event that a lower limit is surpassed, the positive power for collecting light rays from the first lens elements group becomes insufficient, and an excessive correction of spherical aberration results. In either of the cases, however, in addition to spherical aberration, the off-axis aberration such as coma aberration and chromatic aberration are largely affected.

The conditional expression (10) relates to the negative power of the negative lens which makes up the second lens elements group and specifies a prime requirement for correction of the basic chromatic aberration and curvature of field of the second lens elements group as a whole.

Namely, in the event that an upper limit is surpassed, although a lens configuration made up of a combination in which the powers of the respective lens elements of the second lens elements group are small, the correction of chromatic aberration and curvature of field becomes insufficient, and on the contrary, in the event a lower limit is surpassed, since each lens power becomes excessive, high-order spherical aberration and coma aberration are produced, and a good performance cannot be obtained.

The conditional expression (11) relates to the distribution of Abbe numbers of the positive lens and the negative lens which are disposed on the object side in the second lens elements group so as to be used in a portion which keeps a balance of aberrations while having a strong positive power for collecting rays of light which diverge from the first lens elements group. In this case, although the seventh lens elements, which also makes up the second lens elements group, has a relatively large positive power, the magnitude of the power is such as to be determined in many cases by a balance with the negative power of the third lens element group, and therefore, the seventh lens element is not represented in the conditional expression (11). Consequently, the conditional expression (11) is expressed by the fourth lens elements and fifth lens element which are positive lenses and the sixth lens element which is a negative lens and specifies a condition for keeping a balance with the aberrations while correcting properly the chromatic aberration of the whole lens system. In the event that a lower limit is surpassed, the power of each lens element has to be increased so as to correct chromatic aberration, which constitutes a disadvantageous condition for correcting spherical aberration and coma aberration.

The conditional expression (12) relates to the correction of curvature of field in the second lens elements group. In order to balance a negative Petzval sum produced from the first lens elements group, the refractive index of each lens element needs to be a value which falls within a range specified by a condition presented by the relevant expression. In the event that an upper limit is surpassed, the Petzval sum becomes too small, and the correction of curvature of field becomes excessive.

In addition, in this embodiment, of refracting surfaces of each lens element which makes up the second lens elements group, at least one of the refracting surfaces is formed into an aspherical shape, and the embodiment satisfies the following conditional expression (13) with respect to the configuration of an object side surface of the fourth lens element and the following conditional expression (14) with respect to an image side surface of the sixth lens element.

$$0.2 \leq f_w/r_7 \leq 1.0 \quad (13)$$

$$0.4 \leq f_w/r_{12} \leq 1.6 \quad (14)$$

where, $r_7$: radius of curvature of the object side surface of the fourth lens element which makes up the second lens elements group $r_{12}$: radius of curvature of the image side surface of the sixth lens element which makes up the second lens elements group (where, radius of curvature of a boundary plane between resin and air in the event that the image side surface of the sixth lens element is made up of a resin lens surface of a compound lens).

The conditional expression (13) is a conditional expression in relation to the configuration of the object side surface of the fourth lens element. Since the object side surface of the fourth lens element is disposed right behind an aperture stop, the relevant surface plays an important role in correcting spherical aberration. The conditional expression (13) specifies a condition for properly correcting spherical aberration in connection with the negative power of the first lens elements group.

In the event that an upper limit of the conditional expression (13) is surpassed, although off-axis aberrations such as coma aberration and astigmatism get easy to be corrected, an insufficient correction of spherical aberration results. On the contrary, in the event that a lower limit is surpassed, an excessive correction of spherical aberration results, and at the same time, a proper correction of the off-axis aberrations becomes difficult.

The conditional expression (14) is a conditional expression which relates to the configuration of the image side surface of the sixth lens element. The object side surface of the fourth lens element that is expressed in the previous conditional expression (13) is a surface which is disposed closest to an incident side in the second lens elements group, and moderate negative spherical aberration and coma aberration that are produced on the relevant surface are corrected by producing a positive aberration on the image side surface of the sixth lens element. Consequently, in the event that an upper limit is surpassed, the positive spherical aberration becomes excessive, and on the contrary, in the event that a lower limit is surpassed, the negative spherical aberration becomes excessive, whereby in either of the cases, a proper correction of spherical aberration and coma aberration is disabled.

Furthermore, in this embodiment, the third lens element group is made up of only the eighth lens element which is the negative lens, and the embodiment satisfies the following conditional expression (15) with respect to the configuration of the object side surface of the eighth lens element.

$$-2.0 \leq f_w/r_{15} \leq 0.2 \quad (15)$$

where, $r_{15}$: radius of curvature of the object side surface of the eighth lens which makes up the third lens element group.

As is shown by the conditional expression (15), in order to cause rays of light converging from the second lens elements group to focus on an image plane with production of little aberration, basically, the configuration of the object side surface of the eighth lens element is preferably formed into a concentric shape relative to the second lens elements group.

Consequently, although it is good that the value of the conditional expression (15) basically takes a negative value, depending on design specifications such as overall length, in the event that the relevant surface is an aspherical surface, as is shown at an upper limit of the conditional expression (15), there may occur a case where the expression takes a slightly positive value. However, in the event that the value surpasses an upper limit to become too large, both the peripheral shape and the concentric shape are changed, whereby aberrations such as comma aberration and distortion are produced. In the event that a lower limit is surpassed, the Petzval sum due to the object side surface of the eighth lens element becomes too large on the negative side, and the angle of an emerging ray of light also becomes excessive.

Embodiment 1

A numerical example for a first embodiment of a zoom lens of the invention will be shown in Table 1. In addition, FIG. 1 is a diagram showing the configuration of lens elements of the zoom lens, and FIG. 2 is a diagram showing aberrations thereof. In the table and figures, f denotes the focal length of a whole lens system (hereinafter, values shown therein are from the left-hand side values at a wide-angle end, intermediate area and telephoto end), $F_{no}$ f number, and $2\omega$ total angle of view of lens. In addition, R denotes radius of curvature, D lens element thickness or lens element space, $N_d$ refractive index of d line, and $\upsilon_d$ Abbe number of d line. In diagrams showing aberrations, d, g, C in diagrams showing spherical aberrations denote aberration curves in individual wavelengths. In addition, S.C. denotes sine condition. In astigmatism diagrams, S denotes sagital, and M denotes meridional.

Embodiment 2

Figure 3:
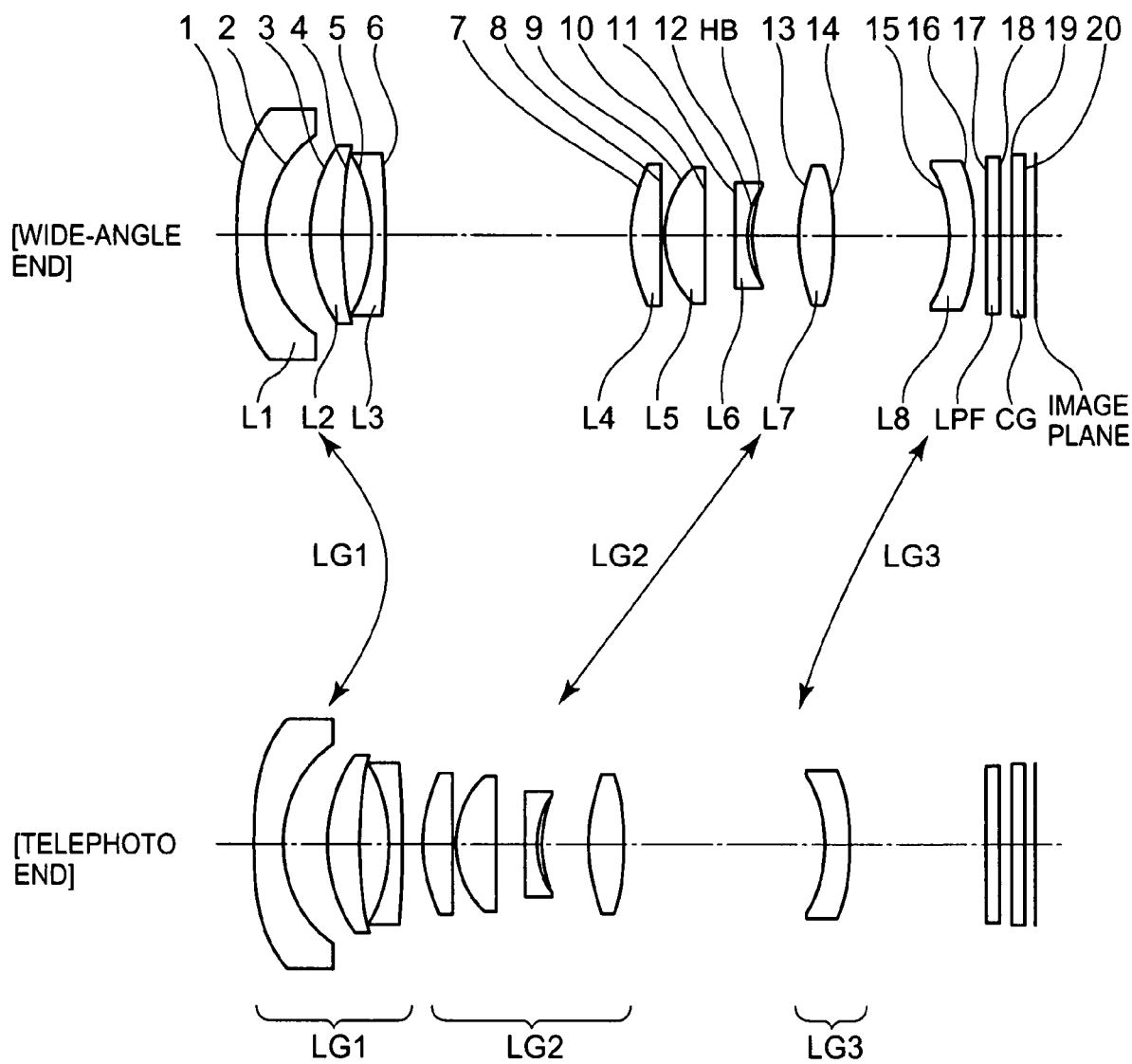
FIG. 3 is a diagram showing the configuration of lens elements of a second embodiment of a zoom lens of the invention.

A numerical example for a second embodiment of a zoom lens of the invention will be shown in Table 2. In addition, FIG. 3 is a diagram showing the configuration of lens elements of the zoom lens, and FIG. 4 is a diagram showing aberrations thereof.

TABLE 2

$f = 7.44\sim12.58\sim21.20$
$F = 2.20\sim2.93\sim4.10$
$2\omega = 65.14\sim39.89\sim23.95$

| Surface number | R | D | $N_d$ | $\upsilon_d$ |
|---|---|---|---|---|
| 1 | −267.083 | 1.39 | 1.69400 | 56.30 |
| 2 | 11.085 | 2.29 | — | — |
| 3 | 10.025 | 1.56 | 1.75211 | 25.05 |
| 4 | 25.674 | 1.50 | — | — |
| 5 | −10.134 | 0.60 | 1.71300 | 53.93 |
| 6 | −93.913 | 12.45~5.48~1.15 | — | — |
| 7 | 9.858 | 1.55 | 1.51680 | 64.20 |
| 8 | −253.893 | 0.10 | — | — |
| 9 | 6.030 | 1.99 | 1.48749 | 70.45 |
| 10 | 296.170 | 1.54 | — | — |
| 11 | −48.736 | 0.60 | 1.80518 | 25.46 |
| 12 | 5.591 | 0.27 | 1.51576 | 52.63 |
| HB | 9.556 | 2.30 | — | — |
| 13 | 11.259 | 1.86 | 1.59270 | 35.45 |
| 14 | −15.730 | 5.78~7.07~9.97 | — | — |
| 15 | −8.354 | 1.20 | 1.51680 | 64.20 |
| 16 | −17.033 | 0.62~3.77~7.00 | — | — |
| 17 | ∞ | 0.64 | 1.54892 | 69.76 |
| 18 | ∞ | 0.64 | — | — |

TABLE 1

$f = 6.84\sim11.56\sim19.50$
$F = 1.96\sim2.66\sim3.74$
$2\omega = 69.23\sim43.08\sim26.17$

| Surface number | R | D | $N_d$ | $\upsilon_d$ |
|---|---|---|---|---|
| 1 | 19.150 | 0.72 | 1.80610 | 40.73 |
| 2 | 6.645 | 3.07 | — | — |
| 3 | 10.387 | 1.67 | 1.84666 | 23.78 |
| 4 | 24.186 | 1.83 | — | — |
| 5 | −10.585 | 0.60 | 1.63246 | 63.80 |
| 6 | −96.268 | 13.56~6.08~1.15 | — | — |
| 7 | 14.518 | 1.57 | 1.63246 | 63.80 |
| 8 | −49.735 | 0.10 | — | — |
| 9 | 5.882 | 2.25 | 1.49700 | 81.61 |
| 10 | 52.012 | 1.76 | — | — |
| 11 | 214.910 | 0.40 | 2.13120 | 24.07 |
| 12 | 7.481 | 0.19 | 1.51576 | 52.63 |
| HB | 10.449 | 2.24 | — | — |
| 13 | 16.417 | 1.70 | 1.62588 | 35.74 |
| 14 | −12.343 | 5.63~6.35~9.82 | — | — |
| 15 | −6.396 | 0.82 | 1.52470 | 0.00 |
| 16 | −10.024 | 0.57~3.85~6.50 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — | aspherical coefficients

| $1^{st}$ surface | $2^{nd}$ surface | HB plane | $15^{th}$ surface |
|---|---|---|---|
| K = 0.00000E+00 | K = 0.00000E+00 | K = 0.00000E+00 | K = 0.00000E+00 |
| A = 9.19296E−04 | A = 8.11291E−04 | A = 1.68001E−03 | A = 1.95798E−04 |
| B = −4.56716E−05 | B = −3.72117E−05 | B = 1.68591E−05 | B = 4.34601E−05 |
| C = 1.31412E−06 | C = −2.90672E−07 | C = 1.09717E−06 | C = −5.07535E−06 |
| D = −1.73534E−08 | D = 5.16007E−08 | | D = 3.28041E−07 |
| E = 9.03438E−11 | E = −8.31094E−10 | | E = −7.45431E−09 |

TABLE 2-continued

| 19 | ∞ | 0.64 | 1.51680 | 64.20 |
| 20 | ∞ | — | — | — |

| aspherical coefficients | | |
|---|---|---|
| 1st surface | 2nd surface | HB plane |
| K = 0.00000E+00 | K = 0.00000E+00 | K = 0.00000E+00 |
| A = 1.58852E−03 | A = 1.73732E−03 | A = 1.65275E−03 |
| B = −5.49799E−05 | B = −3.74083E−05 | B = 2.44004E−05 |
| C = 1.35002E−06 | C = −2.45701E−07 | C = 7.67809E−07 |

TABLE 2-continued

| D = −1.65445E−08 | D = 4.40830E−08 |
| E = 8.89968E−11 | E = −3.77383E−10 |

Embodiment 3

Figure 5:
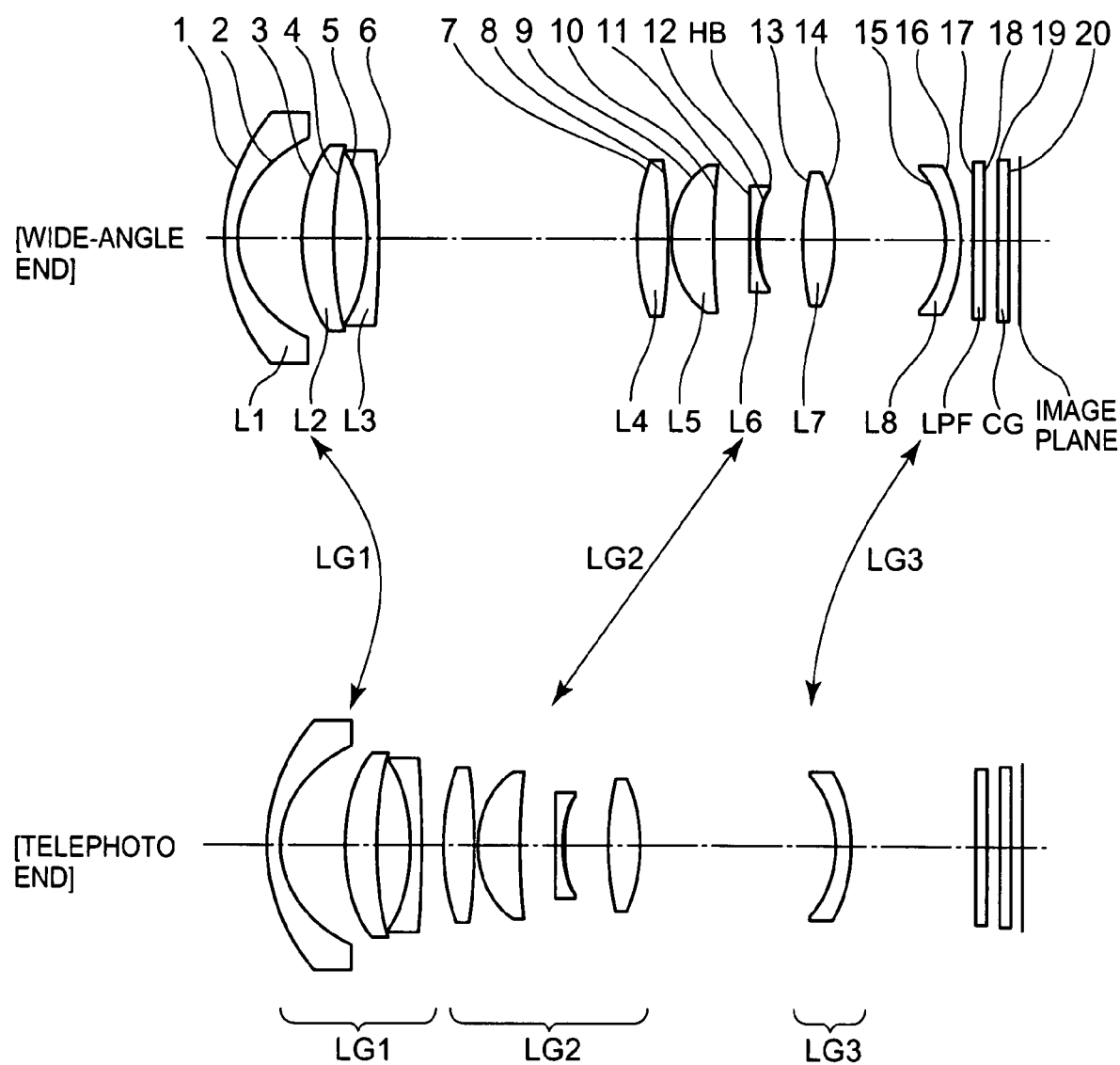
FIG. 5 is a diagram showing the configuration of lens elements of a third embodiment of a zoom lens of the invention.

A numerical example for a third embodiment of a zoom lens of the invention will be shown in Table 3. In addition, FIG. 5 is a diagram showing the configuration of lens elements of the zoom lens, and FIG. 6 is a diagram showing aberrations thereof.

TABLE 3

$f = 7.16 \sim 12.08 \sim 20.34$
$F = 1.96 \sim 2.67 \sim 3.78$
$2\omega = 66.05 \sim 41.13 \sim 25.07$

| Surface number | R | D | $N_d$ | $\nu_d$ |
|---|---|---|---|---|
| 1 | 15.847 | 0.72 | 1.82080 | 42.71 |
| 2 | 6.335 | 3.18 | — | — |
| 3 | 10.201 | 1.77 | 1.80518 | 25.46 |
| 4 | 31.687 | 1.58 | — | — |
| 5 | −11.002 | 0.60 | 1.72916 | 54.66 |
| 6 | −120.591 | 13.45~6.03~1.15 | — | — |
| 7 | 16.318 | 1.54 | 1.59240 | 68.30 |
| 8 | −43.237 | 0.10 | — | — |
| 9 | 5.818 | 2.44 | 1.49700 | 81.61 |
| 10 | 75.148 | 1.80 | — | — |
| 11 | 2047.052 | 0.40 | 2.13120 | 24.07 |
| 12 | 8.259 | 0.08 | 1.51576 | 52.63 |
| HB | 11.960 | 2.25 | — | — |
| 13 | 21.742 | 1.58 | 1.63980 | 34.57 |
| 14 | −12.178 | 5.75~6.57~10.10 | — | — |
| 15 | −6.312 | 0.86 | 1.52470 | 0.00 |
| 16 | −9.915 | 0.59~3.83~6.50 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — |

| aspherical coefficients | | | |
|---|---|---|---|
| 1st surface | 2nd surface | HB plane | 15th surface |
| K = 0.00000E+00 | K = 0.00000E+00 | K = 0.00000E+00 | K = 0.00000E+00 |
| A = 7.71215E−04 | A = 6.01874E−04 | A = 1.80140E−03 | A = 3.16319E−04 |
| B = −3.90277E−05 | B = −3.37703E−05 | B = 1.85580E−05 | B = 2.25248E−05 |
| C = 1.18125E−06 | C = −2.01670E−07 | C = 1.80175E−06 | C = −1.22537E−06 |
| D = −1.67917E−08 | D = 4.13201E−08 | | D = 3.38575E−08 |
| E = 9.93339E−11 | E = −7.40014E−10 | | E = 7.76062E−10 |

Embodiment 4

Figure 7:
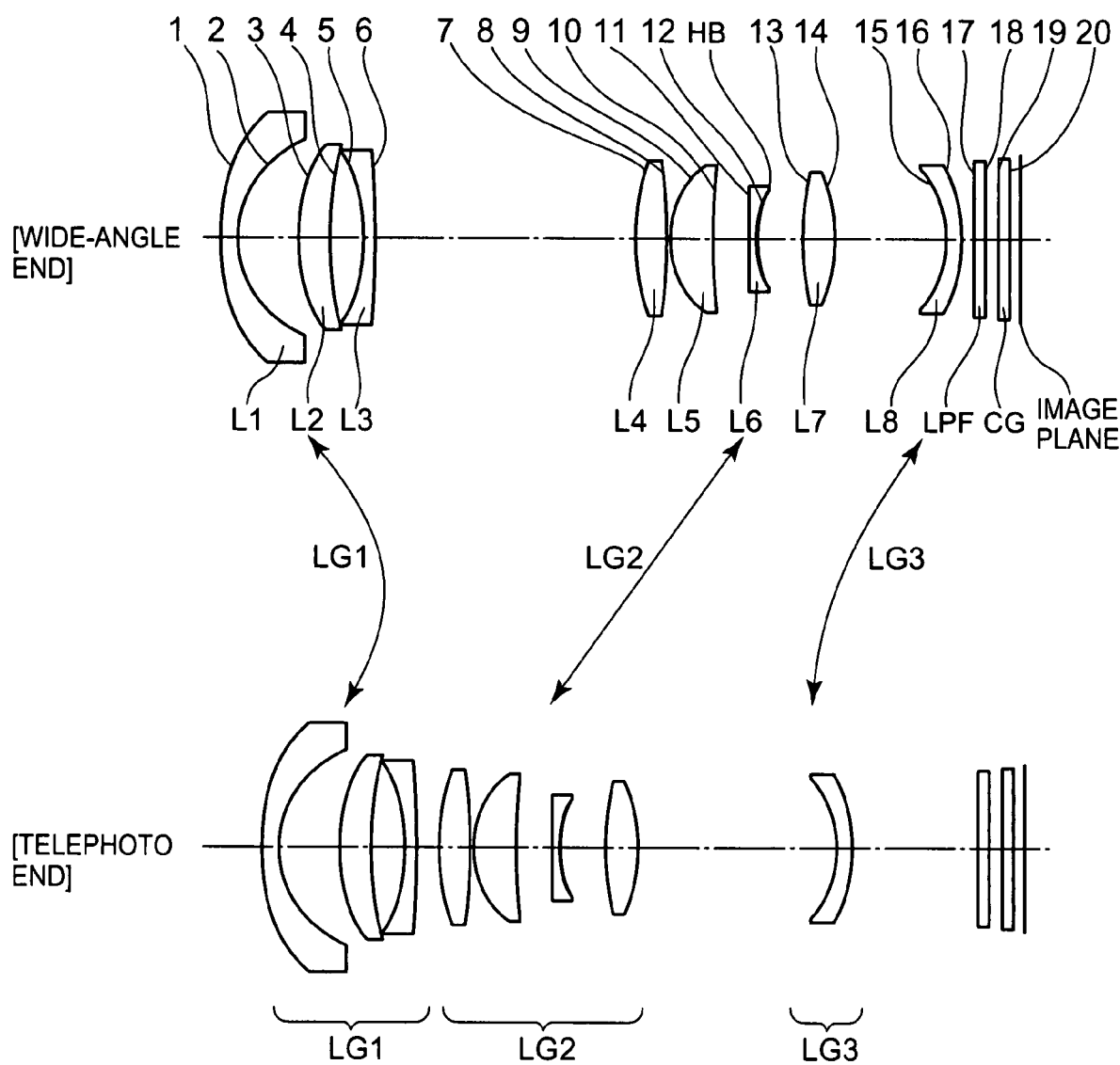
FIG. 7 is a diagram showing the configuration of lens elements of a fourth embodiment of a zoom lens of the invention.

A numerical example for a fourth embodiment of a zoom lens of the invention will be shown in Table 4. In addition, FIG. 7 is a diagram showing the configuration of lens elements of the zoom lens, and FIG. 8 is a diagram showing aberrations thereof.

TABLE 4

$f = 7.05 \sim 11.91 \sim 20.11$
$F = 1.96 \sim 2.67 \sim 3.77$
$2\omega = 66.82 \sim 41.71 \sim 25.41$

| Surface number | R | D | $N_d$ | $\nu_d$ |
|---|---|---|---|---|
| 1 | 18.403 | 0.86 | 1.74330 | 49.33 |
| 2 | 6.257 | 3.09 | — | — |

TABLE 4-continued

| | | | | |
|---|---|---|---|---|
| 3 | 10.128 | 1.76 | 1.75211 | 25.05 |
| 4 | 31.779 | 1.59 | — | — |
| 5 | −10.608 | 0.60 | 1.77250 | 49.65 |
| 6 | −49.451 | 13.36~6.01~1.15 | — | — |
| 7 | 16.422 | 1.54 | 1.59240 | 68.30 |
| 8 | −42.611 | 0.10 | — | — |
| 9 | 5.781 | 2.45 | 1.49700 | 81.61 |
| 10 | 73.135 | 1.73 | — | — |
| 11 | 230.193 | 0.40 | 2.13120 | 24.07 |
| 12 | 8.067 | 0.08 | 1.51576 | 52.63 |
| HB | 11.696 | 2.34 | — | — |
| 13 | 22.222 | 1.56 | 1.64769 | 33.84 |
| 14 | −12.637 | 5.79~6.59~10.16 | — | — |
| 15 | −6.358 | 0.81 | 1.52470 | 0.00 |
| 16 | −9.961 | 0.60~3.86~6.50 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — | aspherical coefficients

| $1^{st}$ surface | $2^{nd}$ surface | HB plane | $15^{th}$ surface |
|---|---|---|---|
| K = 0.00000E+00 | K = 0.00000E+00 | K = 0.00000E+00 | K = 0.00000E+00 |
| A = 7.49568E−04 | A = 5.54774E−04 | A = 1.80112E−03 | A = 3.10476E−04 |
| B = −3.53466E−05 | B = −2.80784E−05 | B = 1.82356E−05 | B = 2.07038E−05 |
| C = 1.04455E−06 | C = −5.44305E−07 | C = 2.03684E−06 | C = −1.23507E−06 |
| D = −1.45700E−08 | D = 5.21552E−08 | | D = 4.49982E−08 |
| E = 8.45726E−11 | E = −8.89130E−10 | | E = 3.26333E−10 |

Embodiment 5

Figure 9:
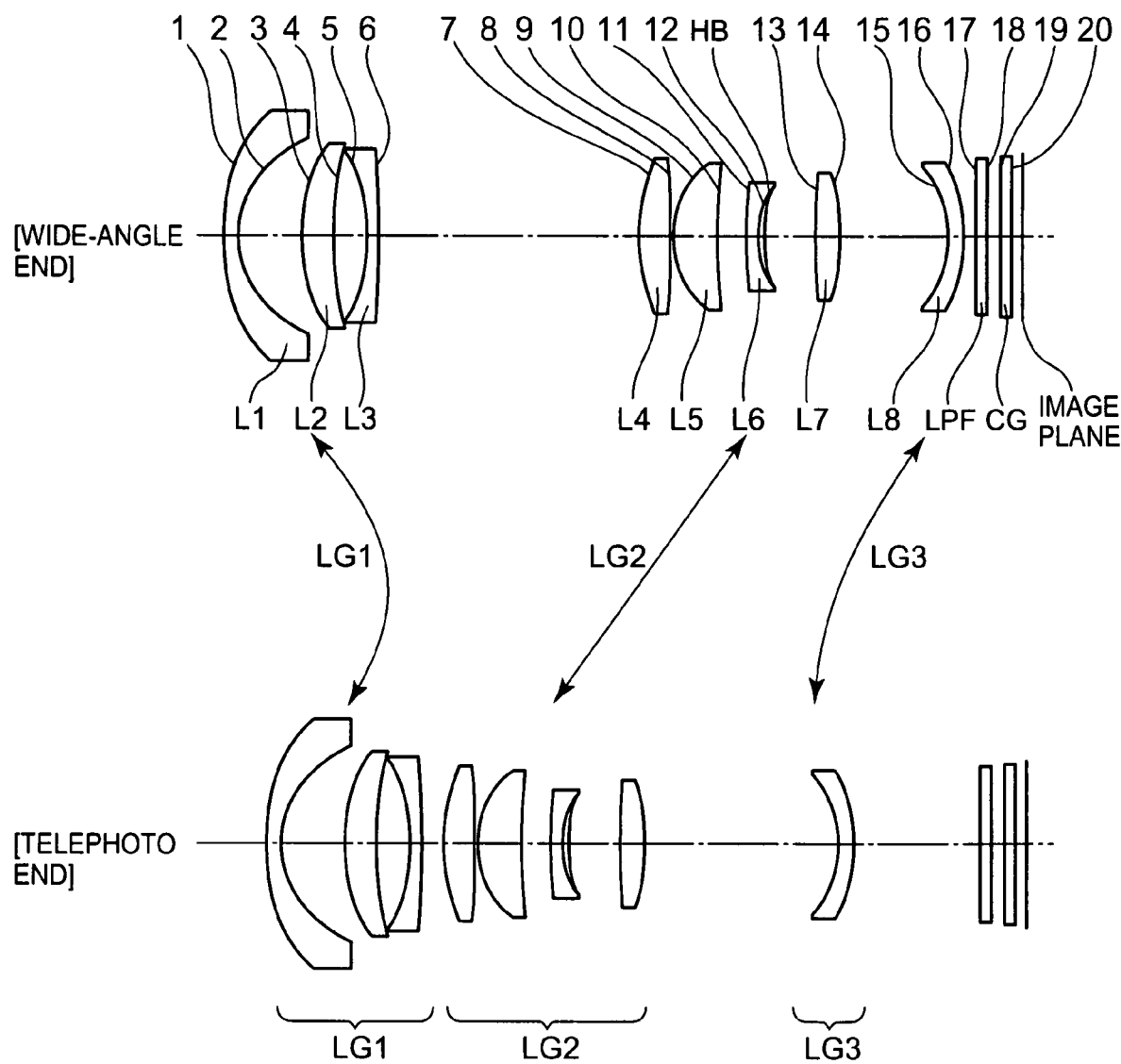
FIG. 9 is a diagram showing the configuration of lens elements of a fifth embodiment of a zoom lens of the invention.

A numerical example for a fifth embodiment of a zoom lens of the invention will be shown in Table 5. In addition, FIG. 9 is a diagram showing the configuration of lens elements of the zoom lens, and FIG. 10 is a diagram showing aberrations thereof.

TABLE 5 f = 7.32~12.36~20.86
F = 1.96~2.67~3.77
2ω = 64.85~40.24~24.51

| Surface number | R | D | $N_d$ | $v_d$ |
|---|---|---|---|---|
| 1 | 15.627 | 0.72 | 1.80139 | 45.45 |
| 2 | 6.382 | 3.28 | — | — |
| 3 | 10.091 | 1.82 | 1.75211 | 25.05 |
| 4 | 34.848 | 1.48 | — | — |
| 5 | −11.446 | 0.60 | 1.77250 | 49.65 |
| 6 | −104.339 | 13.52~6.03~1.15 | — | — |
| 7 | 13.018 | 1.55 | 1.59240 | 68.30 |
| 8 | −186.490 | 0.10 | — | — |
| 9 | 6.245 | 2.43 | 1.49700 | 81.61 |
| 10 | 103.629 | 1.39 | — | — |
| 11 | 50.000 | 0.60 | 1.84666 | 23.78 |
| 12 | 6.284 | 0.27 | 1.51576 | 52.63 |
| HB | 11.765 | 2.68 | — | — |
| 13 | 77.186 | 1.18 | 1.72825 | 28.31 |
| 14 | −16.362 | 5.54~6.28~9.90 | — | — |
| 15 | −6.274 | 0.80 | 1.52470 | 0.00 |
| 16 | −9.088 | 0.66~3.94~6.50 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — |

TABLE 5-continued aspherical coefficients

| $1^{st}$ surface | $2^{nd}$ surface | HB plane | $15^{th}$ surface |
|---|---|---|---|
| K = 0.00000E+00 | K = 0.00000E+00 | K = 0.00000E+00 | K = 0.00000E+00 |
| A = 7.00066E−04 | A = 5.17317E−04 | A = 1.57492E−03 | A = 3.07622E−04 |
| B = −3.49645E−05 | B = −2.82572E−05 | B = 1.49192E−05 | B = 2.11729E−05 |
| C = 1.05833E−06 | C = −3.38472E−07 | C = 2.33017E−06 | C = −4.37666E−07 |
| D = −1.49056E−08 | D = 4.25868E−08 | | D = −3.75725E−08 |
| E = 8.68760E−11 | E = −7.40912E−10 | | E = 2.60868E−09 |

Embodiment 6

Figure 11:
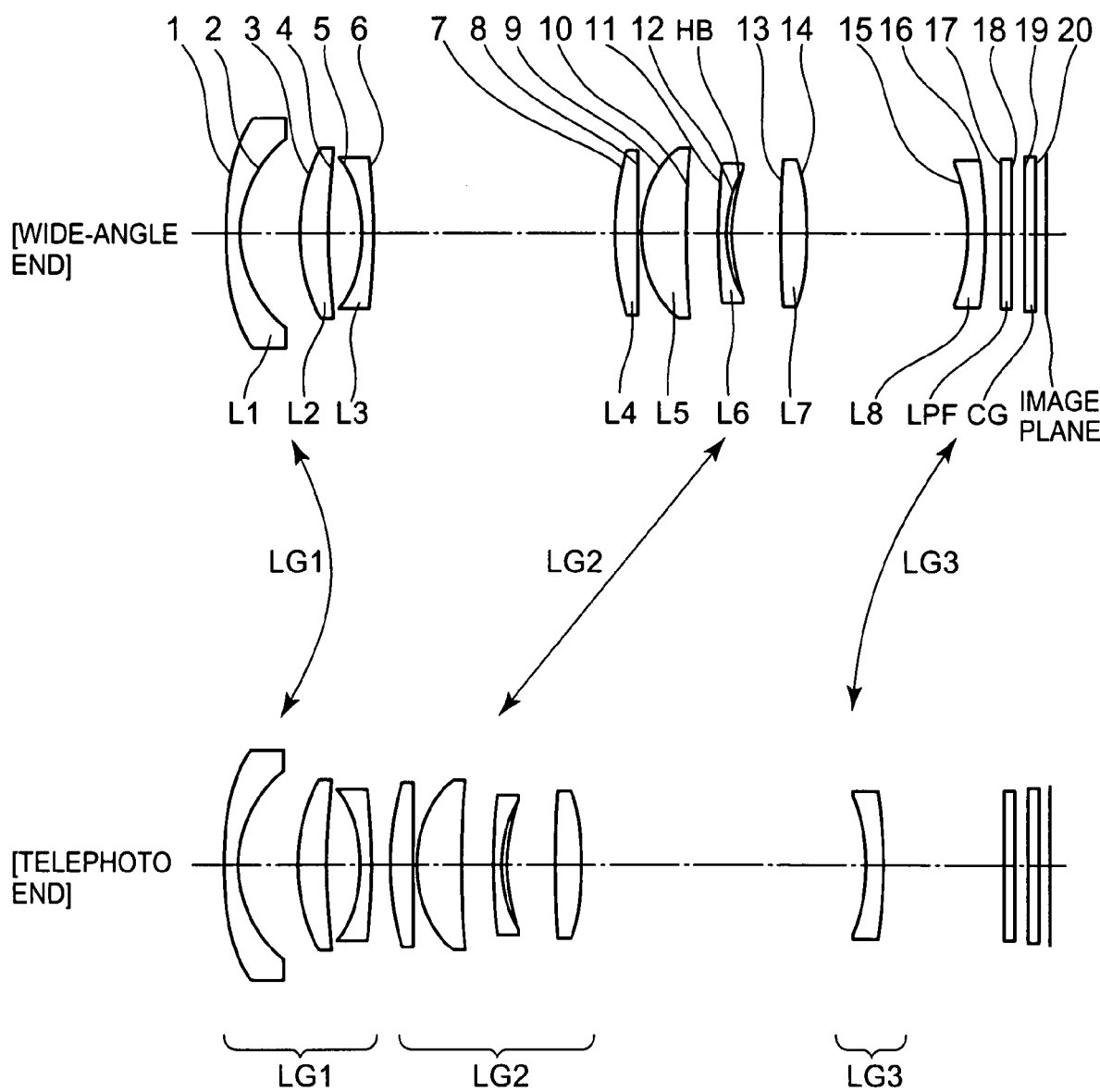
FIG. 11 is a diagram showing the configuration of lens elements of a sixth embodiment of a zoom lens of the invention.

A numerical example for a sixth embodiment of a zoom lens of the invention will be shown in Table 6. In addition, FIG. 11 is a diagram showing the configuration of lens elements of the zoom lens, and FIG. 12 is a diagram showing aberrations thereof.

TABLE 6 f = 7.50~12.67~21.38
F = 1.96~2.64~3.67
2ω = 64.46~39.41~23.74

| Surface number | R | D | $N_d$ | $v_d$ |
|---|---|---|---|---|
| 1 | 24.732 | 0.72 | 1.80139 | 45.45 |
| 2 | 7.162 | 3.23 | | |
| 3 | 12.488 | 1.49 | 1.84666 | 23.78 |
| 4 | 51.817 | 1.73 | | |
| 5 | −8.938 | 0.60 | 1.72916 | 54.66 |
| 6 | −31.223 | 12.98~6.03~1.15 | | |
| 7 | 23.748 | 1.20 | 1.56907 | 71.30 |
| 8 | ∞ | 0.10 | | |
| 9 | 7.165 | 2.41 | 1.56907 | 71.30 |
| 10 | 48.475 | 1.68 | | |
| 11 | 25.193 | 0.40 | 1.92286 | 20.88 |
| 12 | 8.143 | 0.28 | 1.51576 | 52.63 |
| HB | 16.145 | 2.57 | | |
| 13 | 53.546 | 1.55 | 1.59270 | 35.45 |
| 14 | −14.324 | 8.41~9.04~14.94 | | |
| 15 | −15.561 | 0.94 | 1.48749 | 70.45 |
| 16 | −56.216 | 0.85~5.00~6.50 | | |
| 17 | ∞ | 0.64 | 1.54892 | 69.76 |
| 18 | ∞ | 0.64 | | |
| 19 | ∞ | 0.64 | 1.51680 | 64.20 |
| 20 | ∞ | | | | aspherical coefficients

| $1^{st}$ surface | $2^{nd}$ surface | HB plane |
|---|---|---|
| K = 0.00000E+00 | K = 0.00000E+00 | K = 0.00000E+00 |
| A = 5.24648E−04 | A = 2.78611E−04 | A = 9.70290E−04 |
| B = −2.94471E−05 | B = −2.49964E−05 | B = 1.32384E−05 |
| C = 9.41191E−07 | C = −2.50676E−07 | C = 2.14344E−08 |
| D = −1.29636E−08 | D = 4.13496E−08 | D = 2.39724E−08 |
| E = 6.72139E−11 | E = −7.49035E−10 | |

Embodiment 7

Figure 13:
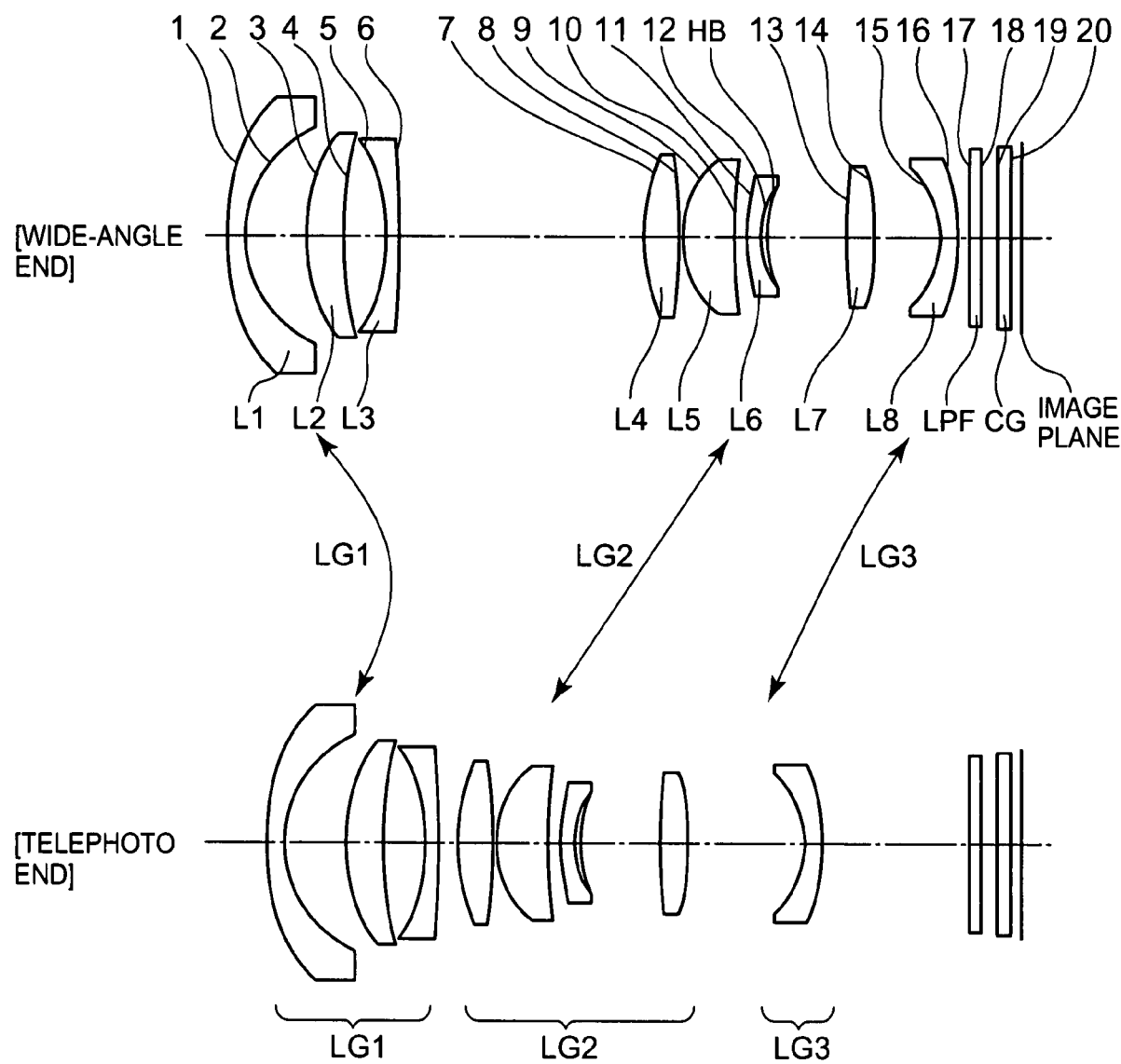
FIG. 13 is a diagram showing the configuration of lens elements of a seventh embodiment of a zoom lens of the invention.

A numerical example for a seventh embodiment of a zoom lens of the invention will be shown in Table 7. In addition, FIG. 13 is a diagram showing the configuration of lens elements of the zoom lens, and FIG. 14 is a diagram showing aberrations thereof.

TABLE 7 f = 6.84~11.55~19.51
F = 1.96~2.71~3.87
2ω = 69.08~42.81~26.10

| Surface number | R | D | $N_d$ | $v_d$ |
|---|---|---|---|---|
| 1 | 15.653 | 0.72 | 1.80139 | 45.45 |
| 2 | 6.040 | 2.70 | | |
| 3 | 9.350 | 1.85 | 1.75211 | 25.05 |
| 4 | 38.082 | 1.31 | | |
| 5 | −11.201 | 0.60 | 1.80420 | 46.49 |
| 6 | −244.422 | 11.13~5.11~1.15 | | |
| 7 | 10.418 | 1.63 | 1.63246 | 63.80 |
| 8 | −56.708 | 0.10 | | |
| 9 | 5.172 | 2.30 | 1.49700 | 81.61 |
| 10 | 24.537 | 0.56 | | |
| 11 | 11.319 | 0.60 | 2.13120 | 24.07 |
| 12 | 4.674 | 0.28 | 1.51576 | 52.63 |
| HB | 8.571 | 3.56 | | |
| 13 | 49.982 | 1.17 | 1.72825 | 28.32 |
| 14 | −16.470 | 2.85~3.39~5.07 | | |
| 15 | −5.163 | 0.80 | 1.52470 | 56.24 |
| 16 | −11.872 | 0.42~3.18~6.50 | | |
| 17 | ∞ | 0.64 | 1.54892 | 69.76 |
| 18 | ∞ | 0.64 | | |
| 19 | ∞ | 0.64 | 1.51680 | 64.20 |
| 20 | ∞ | | | |

TABLE 7-continued aspherical coefficients

| $1^{st}$ surface | $2^{nd}$ surface | HB plane | $15^{th}$ surface |
|---|---|---|---|
| K = 0.00000E+00 | K = 0.00000E+00 | K = 0.00000E+00 | K = 0.00000E+00 |
| A = 6.73986E−04 | A = 4.58940E−04 | A = 2.46880E−03 | A = 8.07318E−04 |
| B = −3.42408E−05 | B = −2.49784E−05 | B = 3.77422E−05 | B = −1.31471E−05 |
| C = 1.13307E−06 | C = −7.03415E−07 | C = 9.84085E−06 | C = 6.51045E−06 |
| D = −1.70404E−08 | D = 6.45140E−08 | | D = −4.71874E−07 |
| E = 1.08315E−10 | E = −1.11179E−09 | | E = 1.44714E−08 |

Embodiment 8

Figure 15:
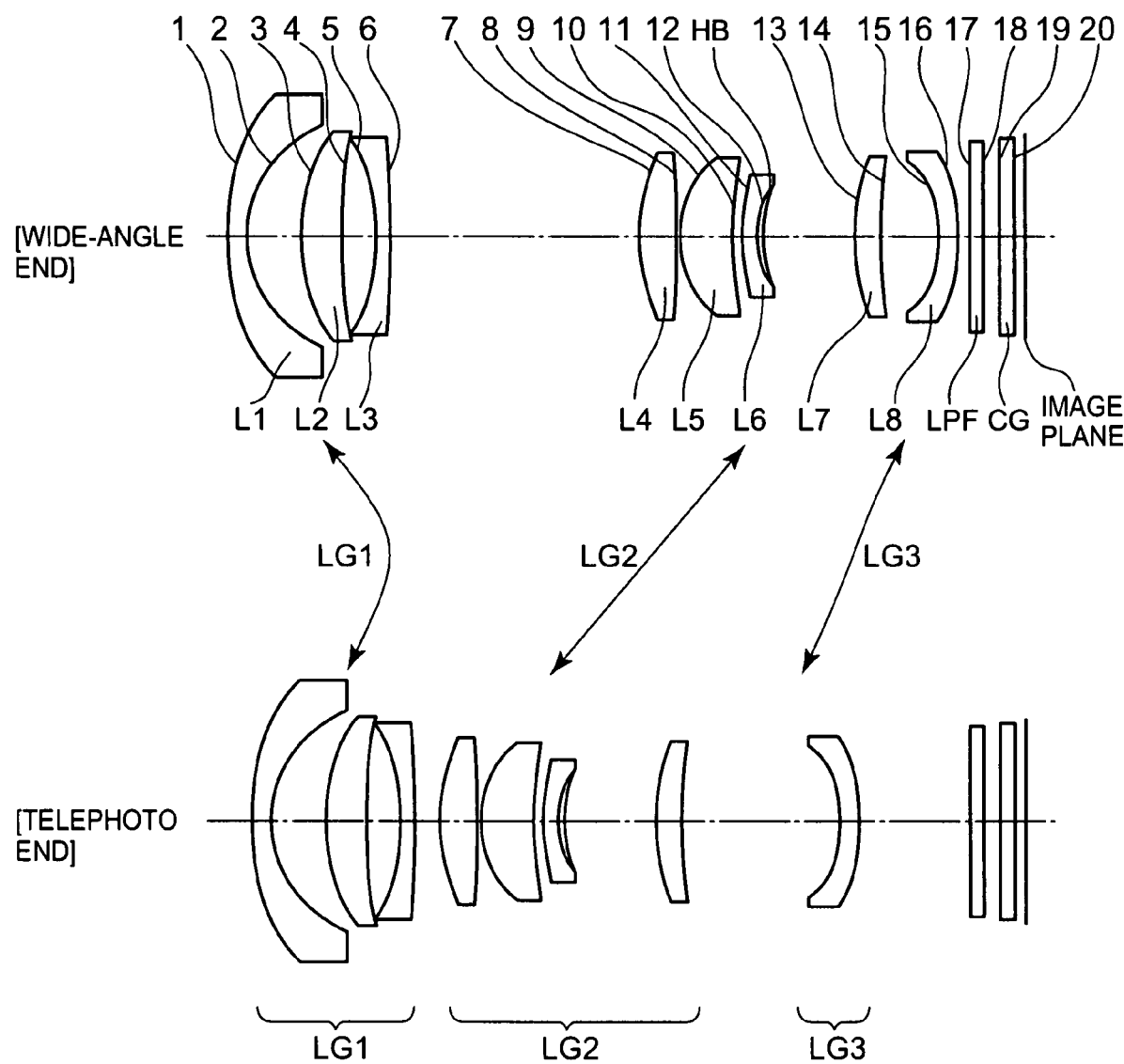
FIG. 15 is a diagram showing the configuration of lens elements of an eighth embodiment of a zoom lens of the invention.

A numerical example for an eighth embodiment of a zoom lens of the invention will be shown in Table 8. In addition, FIG. 15 is a diagram showing the configuration of lens elements of the zoom lens, and FIG. 16 is a diagram showing aberrations thereof.

TABLE 8 f = 6.31~10.65~17.98
F = 1.96~2.63~3.86
2ω = 73.41~46.41~28.54

| Surface number | R | D | $N_d$ | $v_d$ |
|---|---|---|---|---|
| 1 | 17.015 | 0.72 | 1.80139 | 45.45 |
| 2 | 5.363 | 2.18 | — | — |
| 3 | 9.445 | 1.85 | 1.75211 | 25.05 |
| 4 | 58.657 | 1.21 | — | — |
| 5 | −10.533 | 0.60 | 1.80420 | 46.49 |
| 6 | −73.349 | 10.29~4.57~1.15 | — | — |
| 7 | 9.281 | 1.60 | 1.63246 | 63.80 |
| 8 | −146.546 | 0.10 | — | — |
| 9 | 5.000 | 2.20 | 1.56907 | 71.30 |
| 10 | 15.862 | 0.43 | — | — |
| 11 | 8.653 | 0.60 | 2.13120 | 24.07 |
| 12 | 4.035 | 0.28 | 1.51576 | 52.63 |
| HB | 6.778 | 3.80 | — | — |
| 13 | 10.273 | 1.16 | 1.64769 | 33.84 |
| 14 | 44.746 | 2.33~3.96~6.50 | — | — |
| 15 | −11.741 | 0.80 | 1.52470 | 56.24 |
| 16 | −100.000 | 0.42~2.06~4.67 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — | aspherical coefficients

| $1^{st}$ surface | $2^{nd}$ surface | HB plane |
|---|---|---|
| K = 0.00000E+00 | K = 0.00000E+00 | K = 0.00000E+00 |
| A = 7.11482E−04 | A = 4.23375E−04 | A = 2.66098E−03 |
| B = −4.64796E−05 | B = −6.38713E−05 | B = 2.18014E−04 |
| C = 1.77120E−06 | C = 8.81002E−07 | C = −2.03204E−05 |
| D = −3.35921E−08 | D = 3.08608E−08 | D = 2.93539E−06 |
| E = 2.73324E−10 | E = −1.74431E−09 | |

| $15^{th}$ surface | $16^{th}$ surface |
|---|---|
| K = 0.00000E+00 | K = 0.00000E+00 |
| A = −2.93208E−03 | A = −4.12052E−03 |
| B = −1.27225E−03 | B = −4.73899E−04 |
| C = 2.33560E−04 | C = 9.24730E−05 |
| D = −1.67617E−05 | D = −5.77245E−06 |
| E = 4.44737E−07 | E = 1.28099E−07 |

Embodiment 9

Figure 17:
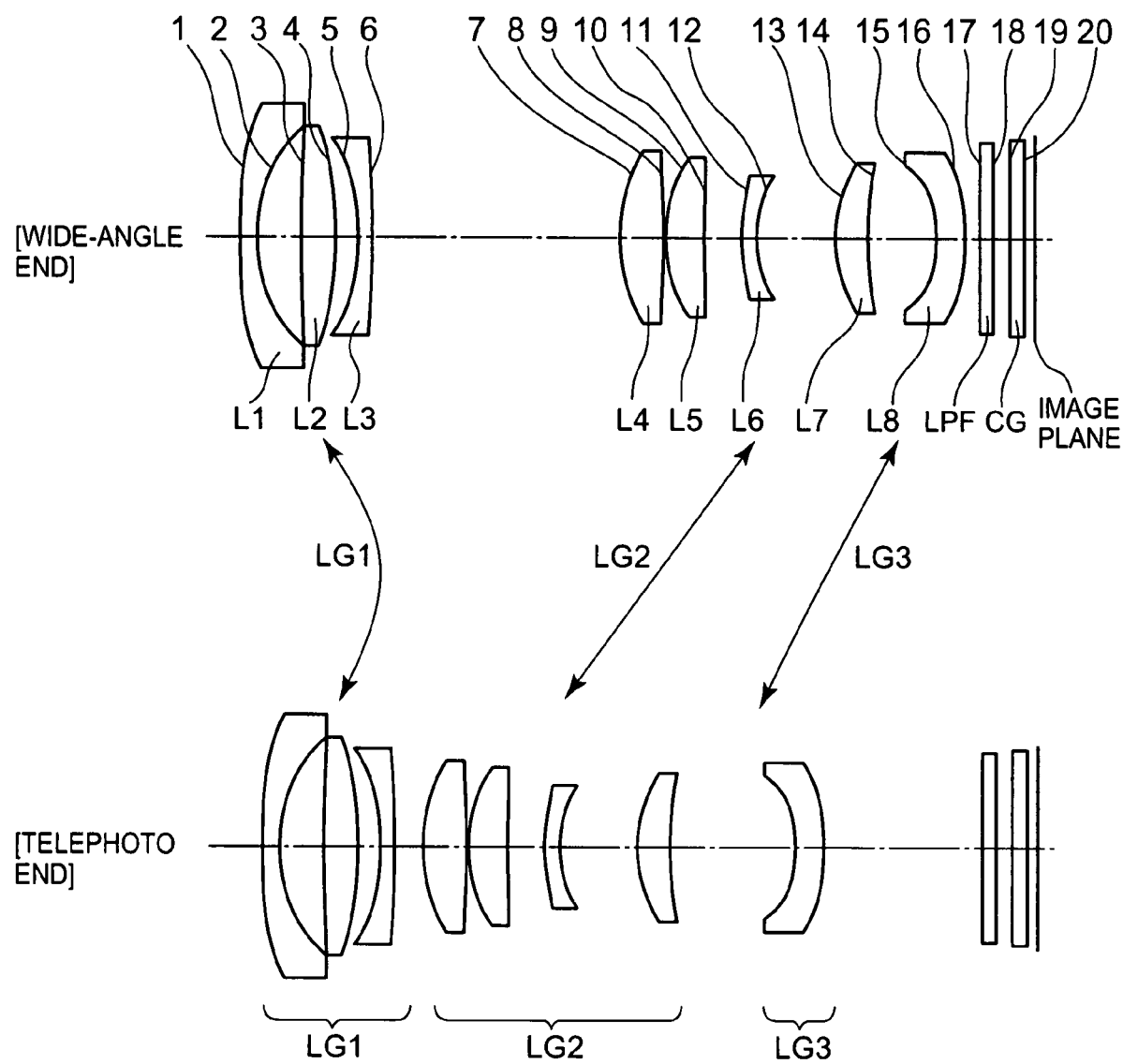
FIG. 17 is a diagram showing the configuration of lens elements of a ninth embodiment of a zoom lens of the invention.
Figure 18:
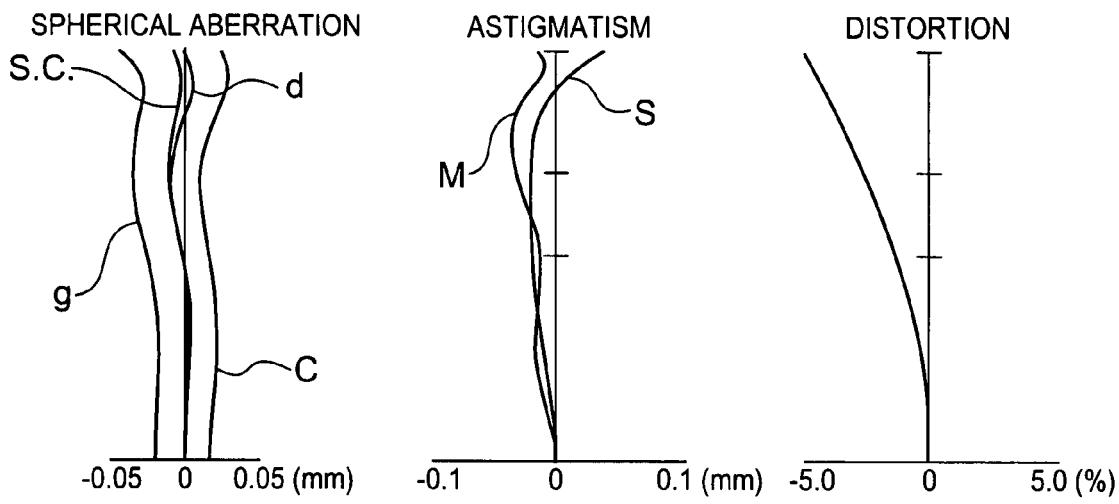
FIG. 18 is a diagram showing aberrations of the ninth embodiment.

A numerical example for a ninth embodiment of a zoom lens of the invention will be shown in Table 9. In addition, FIG. 17 is a diagram showing the configuration of lens elements of the zoom lens, and FIG. 18 is a diagram showing aberrations thereof.

TABLE 9 f = 6.74~11.38~19.21
F = 1.96~2.68~3.87
2ω = 70.13~43.83~26.48

| Surface number | R | D | $N_d$ | $v_d$ |
|---|---|---|---|---|
| 1 | 36.140 | 0.72 | 1.80139 | 45.45 |
| 2 | 8.483 | 1.74 | — | — |
| 3 | 56.891 | 1.41 | 1.90680 | 21.20 |
| 4 | −24.955 | 1.03 | — | — |
| 5 | −10.738 | 0.60 | 1.80420 | 46.49 |
| 6 | −200.000 | 10.20~4.59~1.15 | — | — |
| 7 | 8.042 | 1.84 | 1.49700 | 81.61 |
| 8 | −68.006 | 0.10 | — | — |
| 9 | 7.177 | 1.58 | 1.49700 | 81.61 |
| 10 | 172.553 | 1.58 | — | — |
| 11 | 11.875 | 0.60 | 1.94595 | 17.98 |
| 12 | 6.430 | 3.22 | — | — |
| 13 | 6.958 | 1.38 | 1.59270 | 35.45 |
| 14 | 25.063 | 2.82~3.74~5.23 | — | — |
| 15 | −10.314 | 1.20 | 1.69400 | 56.30 |
| 16 | −100.000 | 0.58~2.92~6.50 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — | aspherical coefficients

| $1^{st}$ surface | $2^{nd}$ surface | $9^{th}$ surface |
|---|---|---|
| K = 0.00000E+00 | K = 0.00000E+00 | K = 0.00000E+00 |
| A = 4.98461E−04 | A = 3.87140E−04 | A = −3.14332E−04 |
| B = −2.03601E−05 | B = −1.30231E−05 | B = 2.43375E−08 |
| C = 7.01097E−07 | C = −1.46782E−07 | C = −1.12574E−06 |
| D = −1.03245E−08 | D = 3.28872E−08 | D = 1.85915E−08 |
| E = 5.90908E−11 | E = −5.56360E−10 | |

| $10^{th}$ surface | $15^{th}$ surface | $16^{th}$ surface |
|---|---|---|
| K = 0.00000E+00 | K = 0.00000E+00 | K = 0.00000E+00 |
| A = 3.04348E−04 | A = −7.06471E−03 | A = −5.59290E−03 |
| B = −5.47777E−06 | B = 9.93684E−05 | B = 2.40927E−04 |
| C = −5.02203E−07 | C = −7.12983E−06 | C = −1.03510E−05 |
| D = 1.54264E−08 | D = 1.49799E−06 | D = 5.98947E−07 |
| | E = −7.81775E−08 | E = −1.89781E−08 |

Embodiment 10

Figure 19:
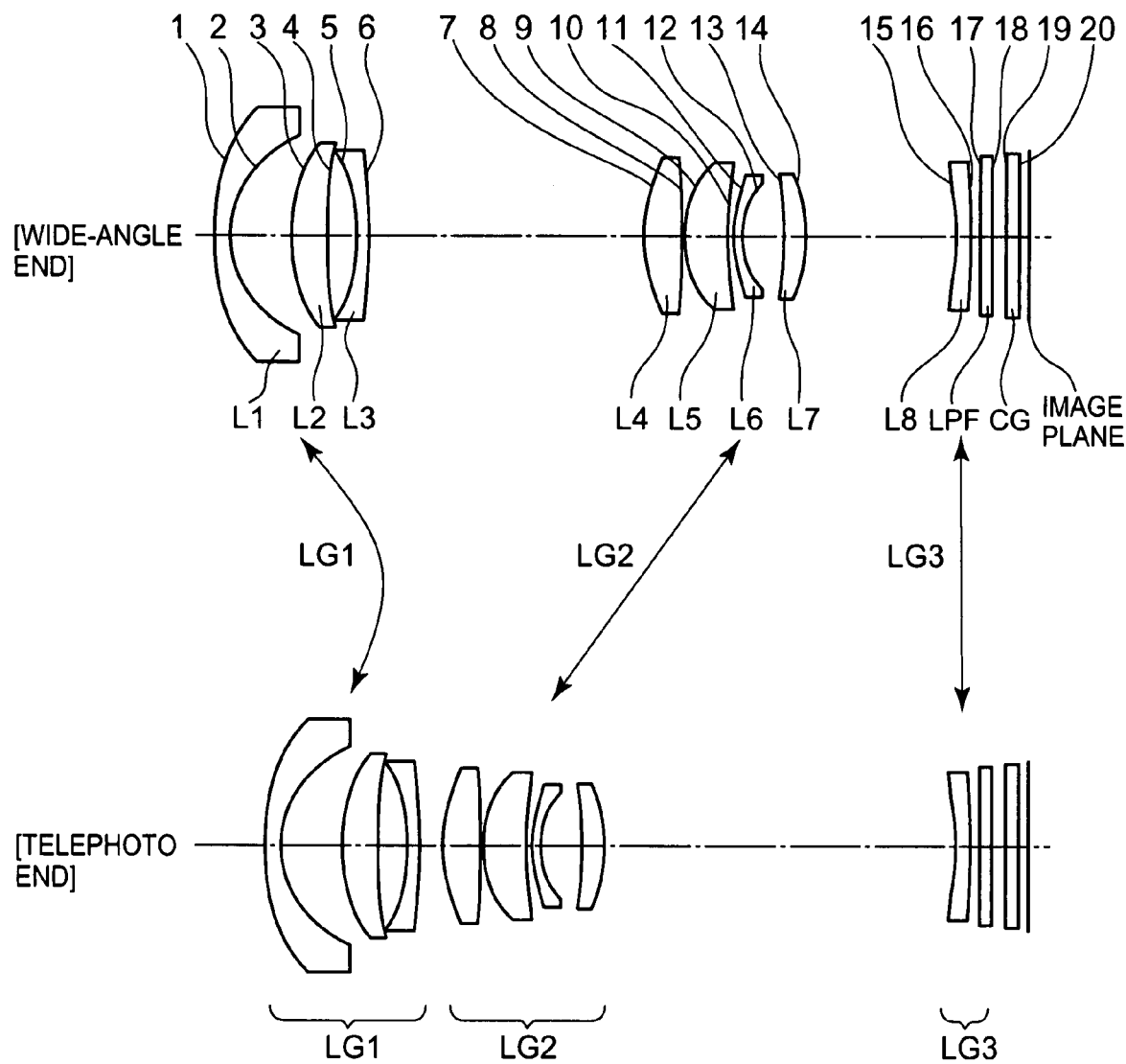
FIG. 19 is a diagram showing the configuration of lens elements of a tenth embodiment of a zoom lens of the invention.

A numerical example for a 10th embodiment of a zoom lens of the invention will be shown in Table 10. In addition, FIG. 19 is a diagram showing the configuration of lens elements of the zoom lens, and FIG. 20 is a diagram showing aberrations thereof.

TABLE 10 f = 6.34~10.72~18.08
F = 1.96~2.56~3.56
2ω = 73.38~45.12~27.42

| Surface number | R | D | $N_d$ | $v_d$ |
|---|---|---|---|---|
| 1 | 18.462 | 0.73 | 1.80139 | 45.45 |
| 2 | 5.886 | 3.15 | — | — |
| 3 | 10.180 | 1.74 | 1.80518 | 25.46 |
| 4 | 33.752 | 1.57 | — | — |
| 5 | −10.151 | 0.60 | 1.71300 | 53.93 |
| 6 | −43.539 | 14.00~5.92~1.15 | — | — |
| 7 | 9.569 | 1.96 | 1.48749 | 70.45 |
| 8 | −169.263 | 0.10 | — | — |
| 9 | 6.063 | 2.30 | 1.49700 | 81.61 |
| 10 | 251.755 | 0.27 | — | — |
| 11 | 9.793 | 0.44 | 2.13120 | 24.07 |
| 12 | 5.562 | 2.00 | — | — |
| 13 | −29.901 | 1.19 | 1.58144 | 40.89 |
| 14 | −9.099 | 7.59~11.45~17.93 | — | — |
| 15 | −28.509 | 0.77 | 1.80139 | 45.45 |
| 16 | −100.000 | 0.50 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — |

TABLE 10-continued aspherical coefficients

| $1^{st}$ surface | $2^{nd}$ surface | $9^{th}$ surface |
|---|---|---|
| K = 0.00000E+00 | K = 0.00000E+00 | K = 0.00000E+00 |
| A = 9.57722E−04 | A = 7.56659E−04 | A = −1.40806E−04 |
| B = −6.34113E−05 | B = −6.70163E−05 | B = 3.06302E−06 |
| C = 2.14801E−06 | C = 1.68608E−07 | C = −1.81087E−07 |
| D = −3.42100E−08 | D = 7.76286E−08 | D = 3.31558E−09 |
| E = 2.15103E−10 | E = −1.91822E−09 | |

| $10^{th}$ surface | $15^{th}$ surface | $16^{th}$ surface |
|---|---|---|
| K = 0.00000E+00 | K = 0.00000E+00 | K = 0.00000E+00 |
| A = 9.68134E−04 | A = −2.91282E−03 | A = −3.01357E−03 |
| B = −3.49836E−06 | B = 3.46542E−04 | B = 2.99577E−04 |
| C = −7.95269E−08 | C = −1.06580E−05 | C = −4.82336E−06 |
| D = 5.61073E−09 | | D = −1.55216E−07 |

Embodiment 11

Figure 21:
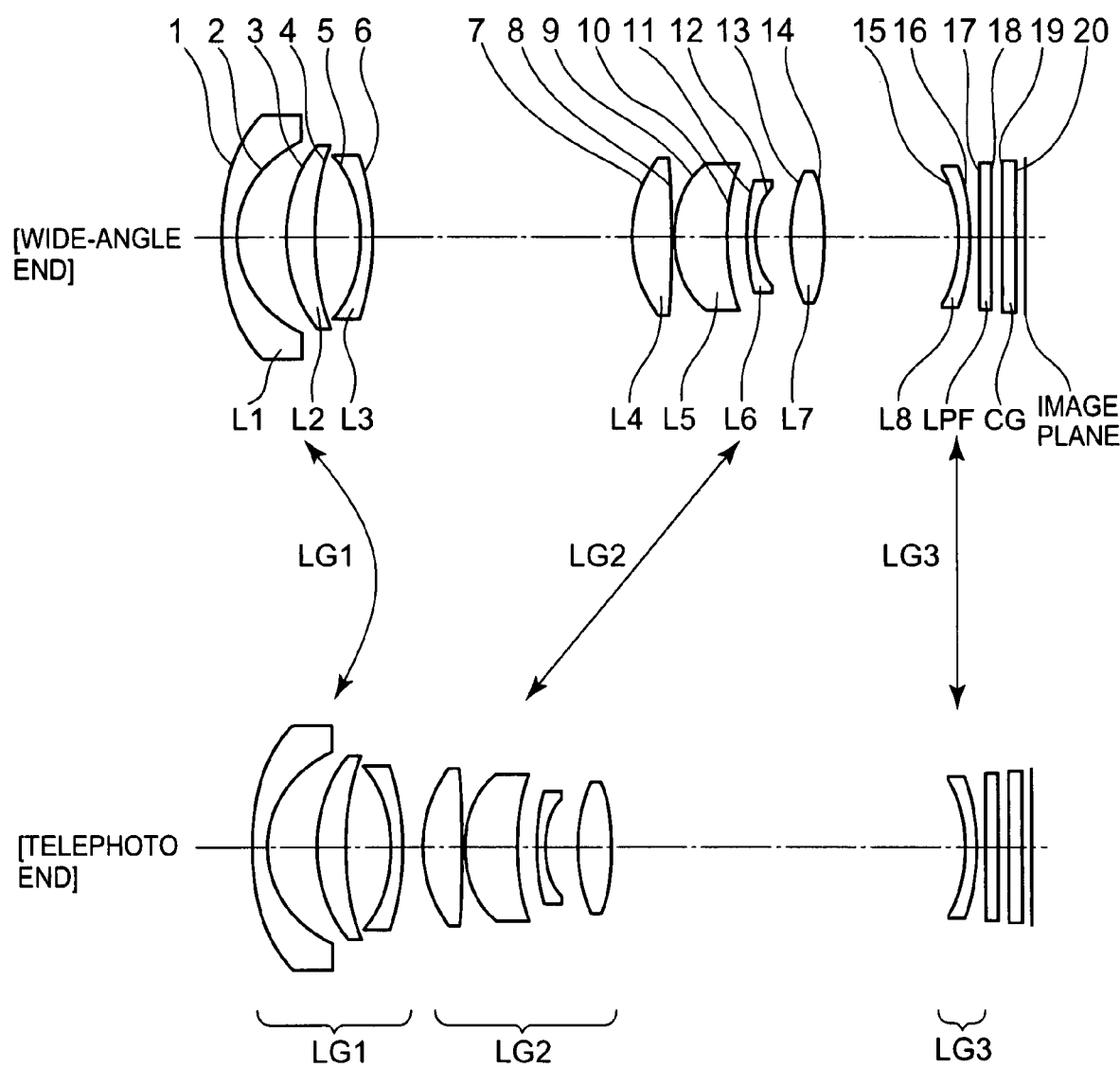
FIG. 21 is a diagram showing the configuration of lens elements of an 11th embodiment of a zoom lens of the invention.

A numerical example for an 11th embodiment of a zoom lens of the invention will be shown in Table 11. In addition, FIG. 21 is a diagram showing the configuration of lens elements of zoom lens, and FIG. 22 is a diagram showing aberrations thereof.

TABLE 11 f = 6.71~11.33~19.11
F = 1.96~2.58~3.67
2ω = 70.19~43.46~26.13

| Surface number | R | D | $N_d$ | $v_d$ |
|---|---|---|---|---|
| 1 | 19.622 | 0.72 | 1.80139 | 45.45 |
| 2 | 6.259 | 2.66 | — | — |
| 3 | 9.860 | 1.50 | 1.92286 | 20.88 |
| 4 | 16.423 | 2.52 | — | — |
| 5 | −9.063 | 0.60 | 1.72916 | 54.66 |
| 6 | −18.779 | 14.00~5.92~1.15 | — | — |
| 7 | 8.982 | 2.15 | 1.49700 | 81.61 |
| 8 | −100.000 | 0.10 | — | — |
| 9 | 6.397 | 2.84 | 1.49700 | 81.61 |
| 10 | 26.611 | 1.07 | — | — |
| 11 | 16.986 | 0.46 | 2.13120 | 24.07 |
| 12 | 5.793 | 1.78 | — | — |
| 13 | 10.614 | 1.80 | 1.59270 | 35.45 |
| 14 | −16.340 | 7.23~11.54~18.80 | — | — |
| 15 | −9.688 | 0.60 | 1.77250 | 49.65 |
| 16 | −13.280 | 0.50 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — | aspherical coefficients

| $1^{st}$ surface | $2^{nd}$ surface | $9^{th}$ surface | $10^{th}$ surface |
|---|---|---|---|
| K = 0.00000E+00 | K = 0.00000E+00 | K = 0.00000E+00 | K = 0.00000E+00 |
| A = 7.65552E−04 | A = 6.40643E−04 | A = −9.82365E−05 | A = 6.50969E−04 |
| B = −3.73883E−05 | B = −4.06795E−05 | B = −1.65981E−06 | B = 7.92004E−06 |
| C = 1.05806E−06 | C = 3.14200E−07 | C = 1.11062E−07 | C = −6.07931E−07 |
| D = −1.44013E−08 | D = 1.86716E−08 | D = −8.98355E−09 | D = 1.03289E−08 |
| E = 8.24195E−11 | E = −4.30497E−10 | | |

Embodiment 12

Figure 23:
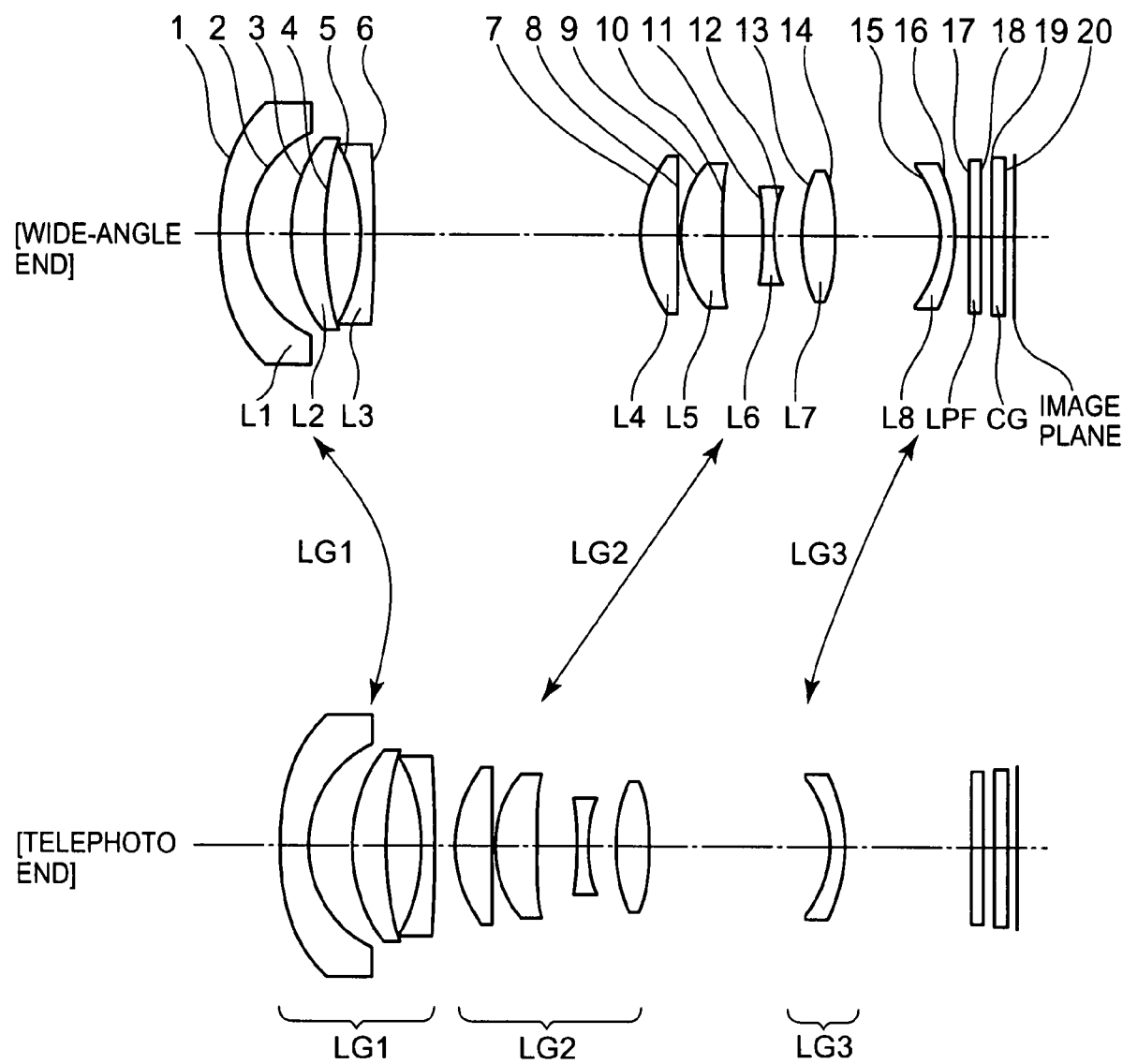
FIG. 23 is a diagram showing the configuration of lens elements of a 12th embodiment of a zoom lens of the invention.

A numerical example for a 12th embodiment of a zoom lens of the invention will be shown in Table 12. In addition, FIG. 23 is a diagram showing the configuration of lens elements of the zoom lens, and FIG. 24 is a diagram showing aberrations thereof.

TABLE 12

$f = 7.50\sim12.66\sim21.38$
$F = 1.96\sim2.64\sim3.74$
$2\omega = 64.22\sim39.44\sim23.82$

| Surface number | R | D | $N_d$ | $\nu_d$ |
|---|---|---|---|---|
| 1 | 27.549 | 1.41 | 1.92110 | 22.40 |
| 2 | 8.142 | 2.25 | — | — |
| 3 | 10.099 | 1.85 | 1.94595 | 17.98 |
| 4 | 26.525 | 1.78 | — | — |
| 5 | −11.762 | 0.60 | 1.72916 | 54.66 |
| 6 | −166.667 | 14.00~6.13~1.15 | — | — |
| 7 | 8.538 | 1.96 | 1.56907 | 71.30 |
| 8 | 0.000 | 0.10 | — | — |
| 9 | 7.083 | 2.15 | 1.49700 | 81.61 |
| 10 | 33.148 | 2.11 | — | — |
| 11 | −22.428 | 0.60 | 1.92110 | 22.40 |
| 12 | 11.132 | 1.49 | — | — |
| 13 | 12.933 | 1.80 | 1.59270 | 35.45 |
| 14 | −11.410 | 5.39~6.38~9.37 | — | — |
| 15 | −6.312 | 0.80 | 1.52470 | 56.24 |
| 16 | −9.596 | 0.65~3.49~6.50 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — | aspherical coefficients

| $1^{st}$ surface | $2^{nd}$ surface | $12^{th}$ surface | $15^{th}$ surface |
|---|---|---|---|
| K = 0.00000E+00 | K = 0.00000E+00 | K = 0.00000E+00 | K = 0.00000E+00 |
| A = 8.23589E−04 | A = 9.18013E−04 | A = 1.06746E−03 | A = 1.48298E−04 |
| B = −2.32953E−05 | B = −1.56289E−05 | B = 4.78234E−06 | B = 4.39621E−05 |
| C = 4.76324E−07 | C = −3.09049E−07 | C = 5.17213E−07 | C = −4.31510E−06 |
| D = −4.68996E−09 | D = 2.31994E−08 | D = −3.58877E−09 | D = 2.34094E−07 |
| E = 2.00330E−11 | E = −2.15404E−10 | | E = −4.28919E−09 |

Embodiment 13

Figure 25:
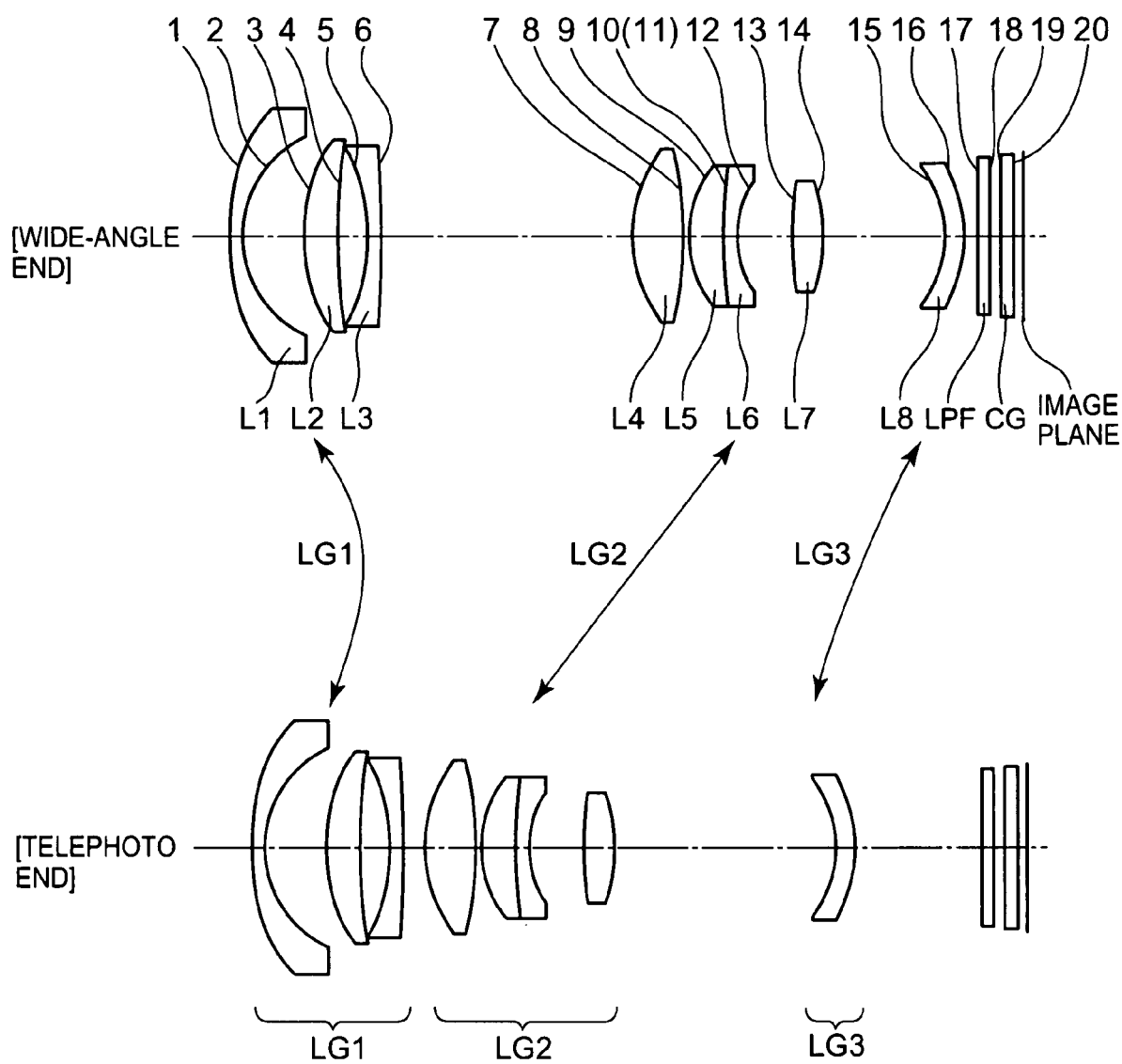
FIG. 25 is a diagram showing the configuration of lens elements of a 13th embodiment of a zoom lens of the invention.

A numerical example for a 13th embodiment of a zoom lens of the invention will be shown in Table 13. In addition, FIG. 25 is a diagram showing the configuration of lens elements of the zoom lens, and FIG. 26 is a diagram showing aberrations thereof.

TABLE 13

$f = 7.45\sim12.58\sim21.23$
$F = 1.96\sim2.69\sim3.89$
$2\omega = 64.57\sim39.80\sim24.08$

| Surface number | R | D | $N_d$ | $\nu_d$ |
|---|---|---|---|---|
| 1 | 17.811 | 0.72 | 1.81474 | 37.03 |
| 2 | 6.504 | 3.14 | — | — |
| 3 | 10.745 | 1.74 | 1.84666 | 23.78 |
| 4 | 40.771 | 1.49 | — | — |
| 5 | −10.771 | 0.60 | 1.71300 | 53.93 |
| 6 | −254.187 | 12.99~5.79~1.15 | — | — |
| 7 | 7.909 | 2.57 | 1.63246 | 63.80 |
| 8 | −19.247 | 0.33 | — | — |
| 9 | 6.575 | 1.77 | 1.49700 | 81.61 |
| 10 | 33.647 | 0.60 | 2.08160 | 30.38 |
| (11) | | | | |
| 12 | 5.624 | 2.94 | — | — |
| 13 | 27.585 | 1.49 | 1.51742 | 52.15 |
| 14 | −10.421 | 6.28~7.32~11.42 | — | — |
| 15 | −6.326 | 1.02 | 1.52470 | 56.24 |
| 16 | −8.836 | 0.67~3.94~6.50 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — | aspherical coefficients

| $1^{st}$ surface | $2^{nd}$ surface | $7^{th}$ surface |
|---|---|---|
| K = 0.00000E+00 | K = 0.00000E+00 | K = 0.00000E+00 |
| A = 5.60092E−04 | A = 3.49256E−04 | A = −2.07419E−04 |
| B = −2.82891E−05 | B = −2.58974E−05 | B = −2.23611E−06 |
| C = 8.47721E−07 | C = −1.55937E−07 | C = −1.42245E−08 |
| D = −1.16415E−08 | D = 2.87711E−08 | D = 1.03618E−09 |
| E = 6.74009E−11 | E = −5.02015E−10 | |

| $8^{th}$ surface | $15^{th}$ surface |
|---|---|
| K = 0.00000E+00 | K = 0.00000E+00 |
| A = 3.03841E−04 | A = 2.10416E−04 |
| B = −4.33614E−06 | B = 2.52471E−05 |
| C = 9.06291E−08 | C = −2.26441E−06 |
| | D = 1.20990E−07 |
| | E = −1.65381E−09 |

Embodiment 14

Figure 27:
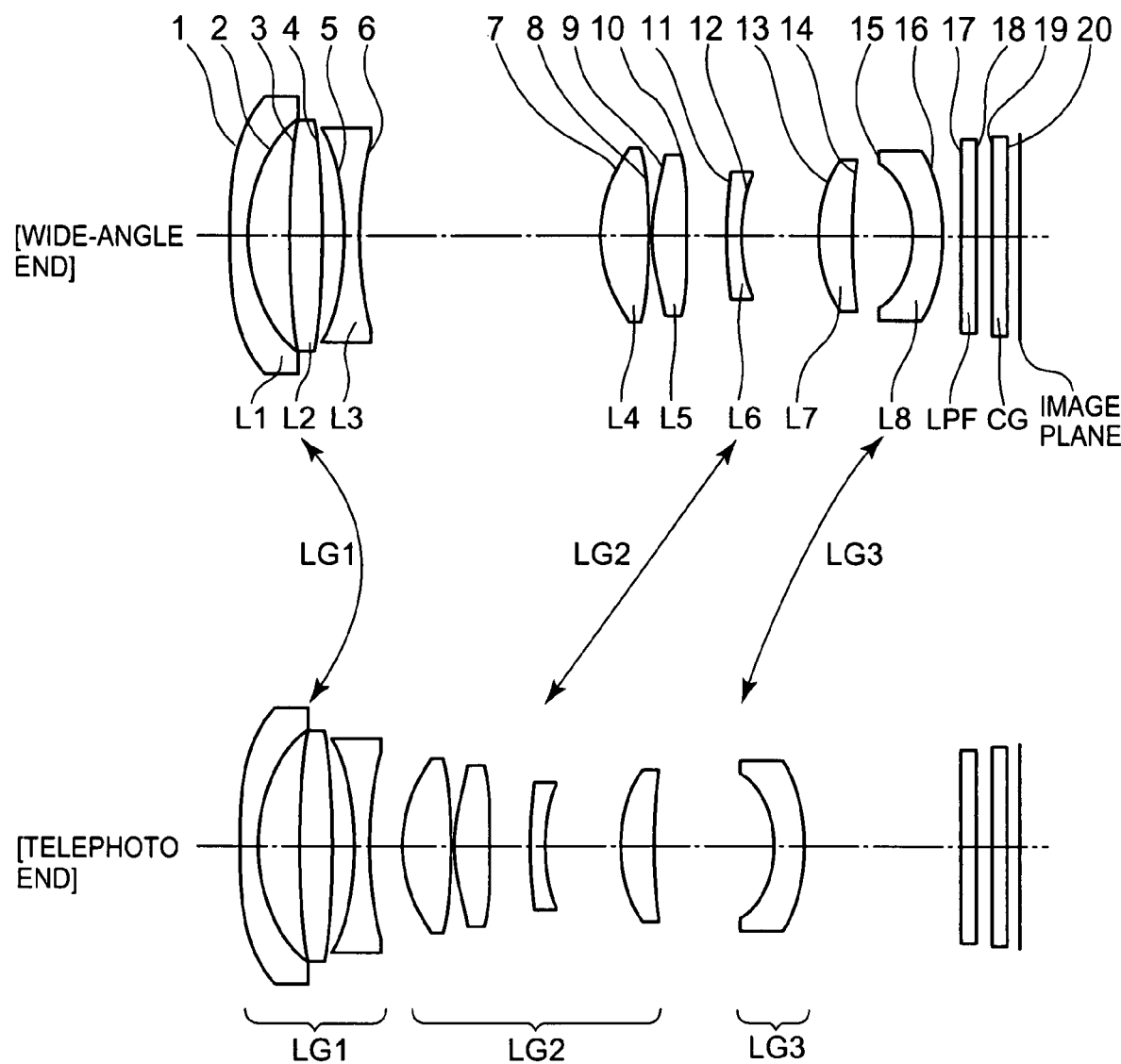
FIG. 27 is a diagram showing the configuration of lens elements of a 14th embodiment of a zoom lens of the invention.

A numerical example for a 14th embodiment of a zoom lens of the invention will be shown in Table 14. In addition, FIG. 27 is a diagram showing the configuration of lens elements of the zoom lens, and FIG. 28 is a diagram showing aberrations thereof.

TABLE 14

$f = 6.57 \sim 11.09 \sim 18.74$
$F = 1.96 \sim 2.67 \sim 3.87$
$2\omega = 71.53 \sim 44.99 \sim 27.19$

| Surface number | R | D | $N_d$ | $v_d$ |
|---|---|---|---|---|
| 1 | 38.088 | 0.72 | 1.80139 | 45.45 |
| 2 | 10.760 | 1.68 | — | — |
| 3 | 38.575 | 1.32 | 1.90680 | 21.20 |
| 4 | −42.703 | 0.80 | — | — |
| 5 | −13.194 | 0.60 | 1.69400 | 56.30 |
| 6 | 19.949 | 9.87~4.64~1.40 | — | — |
| 7 | 7.492 | 1.97 | 1.49700 | 81.61 |
| 8 | −29.304 | 0.10 | — | — |
| 9 | 8.036 | 1.42 | 1.49700 | 81.61 |
| 10 | 148.276 | 1.65 | — | — |
| 11 | 19.507 | 0.60 | 1.94595 | 17.98 |
| 12 | 8.199 | 3.09 | — | — |
| 13 | 6.795 | 1.46 | 1.59270 | 35.45 |
| 14 | 40.999 | 2.33~3.27~4.80 | — | — |
| 15 | −9.861 | 1.20 | 1.74330 | 49.33 |
| 16 | −99.988 | 0.80~3.09~6.52 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — | aspherical coefficients

| $1^{st}$ surface | $2^{nd}$ surface | $9^{th}$ surface |
|---|---|---|
| K = 0.00000E+00 | K = 0.00000E+00 | K = 0.00000E+00 |
| A = 1.01570E−03 | A = 1.05848E−03 | A = −8.71380E−04 |
| B = −2.41130E−05 | B = −1.21429E−05 | B = −4.11912E−05 |
| C = 3.68148E−07 | C = −2.28661E−07 | C = −2.00496E−06 |
| D = −5.16203E−10 | D = 1.01210E−08 | D = −8.00461E−08 |
| E = −2.55290E−12 | E = 2.10694E−10 | |

| $10^{th}$ surface | $15^{th}$ surface | $16^{th}$ surface |
|---|---|---|
| K = 0.00000E+00 | K = 0.00000E+00 | K = 0.00000E+00 |
| A = −4.73025E−04 | A = −8.22096E−03 | A = −6.40932E−03 |
| B = −4.68723E−05 | B = 1.04367E−04 | B = 3.04870E−04 |
| C = −1.46586E−06 | C = 9.03387E−06 | C = −9.58281E−06 |
| D = −1.85909E−08 | D = −9.34746E−07 | D = 2.27246E−07 |
| | E = 5.93470E−08 | E = −1.47484E−09 |

Embodiment 15

Figure 29:
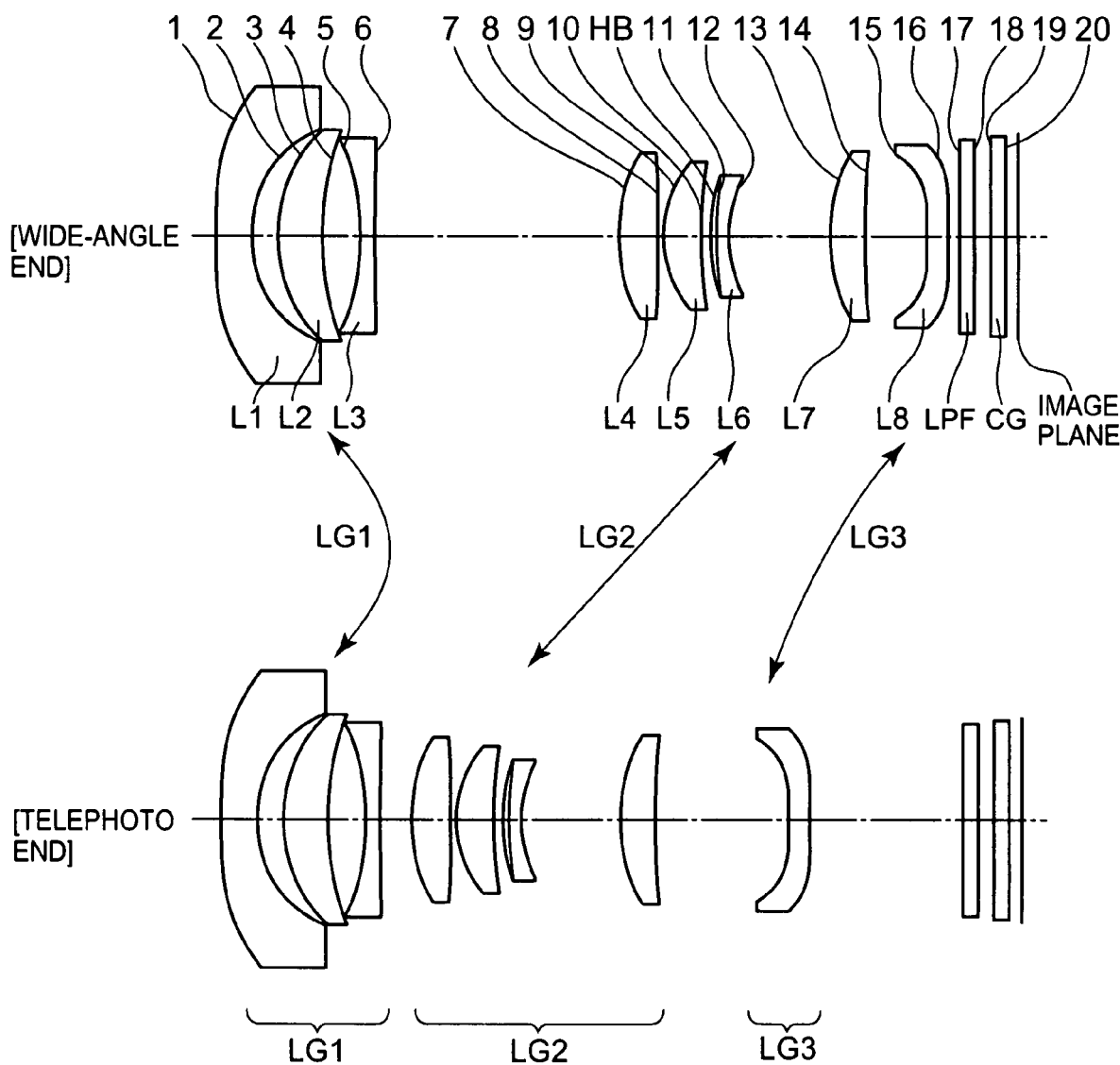
FIG. 29 is a diagram showing the configuration of lens elements of a 15th embodiment of a zoom lens of the invention.

A numerical example for a 15th embodiment of a zoom lens of the invention will be shown in Table 15. In addition, FIG. 29 is a diagram showing the configuration of lens elements of the zoom lens, and FIG. 30 is a diagram showing aberrations thereof.

TABLE 15

$f = 6.49 \sim 10.96 \sim 18.51$
$F = 1.96 \sim 2.61 \sim 3.73$
$2\omega = 71.73 \sim 44.92 \sim 27.28$

| Surface number | R | D | $N_d$ | $v_d$ |
|---|---|---|---|---|
| 1 | 98.945 | 1.50 | 1.76802 | 49.24 |
| 2 | 7.890 | 1.00 | — | — |
| 3 | 7.292 | 1.85 | 1.75211 | 25.05 |
| 4 | 15.697 | 1.50 | — | — |
| 5 | −11.908 | 0.60 | 1.69400 | 56.30 |
| 6 | 180.979 | 10.09~4.50~1.23 | — | — |
| 7 | 8.578 | 1.59 | 1.72916 | 54.66 |
| 8 | −92.380 | 0.20 | — | — |
| 9 | 5.608 | 1.55 | 1.56907 | 71.30 |
| 10 | 20.974 | 0.43 | — | — |
| HB | 8.560 | 0.28 | 1.51576 | 52.63 |
| 11 | 26.836 | 0.40 | 2.13120 | 24.07 |
| 12 | 5.623 | 4.22 | — | — |
| 13 | 8.119 | 1.47 | 1.67270 | 32.17 |
| 14 | 45.144 | 2.55~3.80~5.34 | — | — |
| 15 | 60.959 | 0.80 | 1.52470 | 56.24 |
| 16 | 10.937 | 0.55~2.65~6.41 | — | — |
| 17 | ∞ | 0.64 | 1.54892 | 69.76 |
| 18 | ∞ | 0.64 | — | — |
| 19 | ∞ | 0.64 | 1.51680 | 64.20 |
| 20 | ∞ | — | — | — | aspherical coefficients

| $1^{st}$ surface | $2^{nd}$ surface | HB plane |
|---|---|---|
| K = 0.00000E+00 | K = 0.00000E+00 | K = 0.00000E+00 |
| A = 1.76253E−03 | A = 2.17723E−03 | A = −1.21189E−03 |
| B = −6.27228E−05 | B = −3.32205E−05 | B = −2.93147E−05 |
| C = 1.53123E−06 | C = −1.01399E−06 | C = 6.04242E−07 |
| D = −1.91070E−08 | D = 8.46611E−08 | D = −2.12874E−08 |
| E = 9.93692E−11 | E = −5.29309E−10 | |

| $15^{th}$ surface | $16^{th}$ surface |
|---|---|
| K = 0.00000E+00 | K = 0.00000E+00 |
| A = −1.07470E−02 | A = −1.03696E−02 |
| B = 3.29717E−04 | B = 5.29364E−04 |
| C = −5.84664E−06 | C = −1.77903E−05 |
| D = 5.46775E−07 | D = 4.90408E−07 |
| E = −4.53815E−08 | E = −1.46981E−08 |

Embodiment 16

Figure 31:
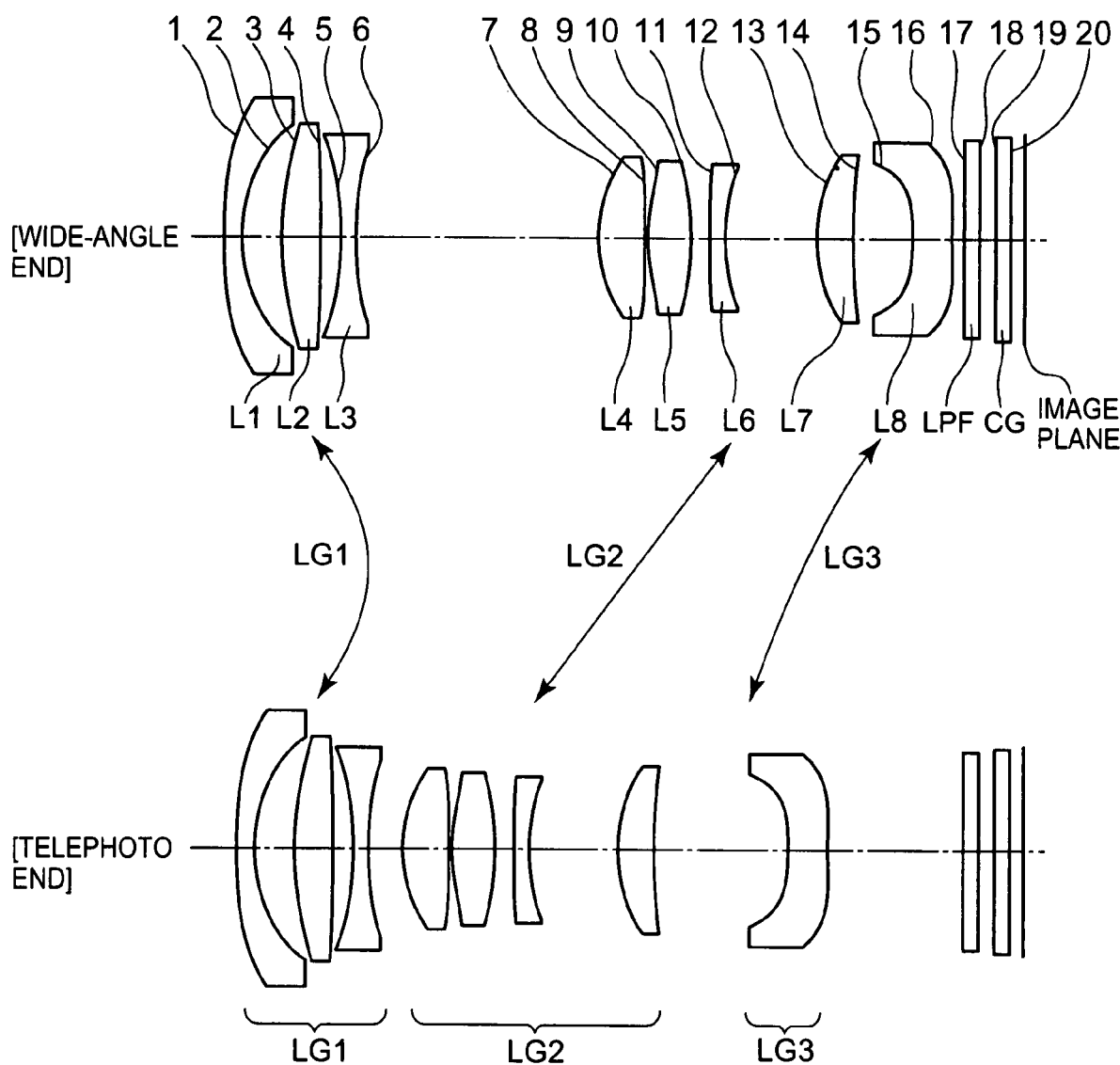
FIG. 31 is a diagram showing the configuration of lens elements of a 16th embodiment of a zoom lens of the invention.

A numerical example for a 16th embodiment of a zoom lens of the invention will be shown in Table 16. In addition, FIG. 31 is a diagram showing the configuration of lens elements of the zoom lens, and FIG. 32 is a diagram showing aberrations thereof.

TABLE 16

$f = 5.80 \sim 9.79 \sim 16.53$
$F = 1.96 \sim 2.64 \sim 3.79$
$2\omega = 77.96 \sim 50.42 \sim 30.92$

| Surface number | R | D | $N_d$ | $v_d$ |
|---|---|---|---|---|
| 1 | 28.033 | 0.72 | 1.80139 | 45.45 |
| 2 | 7.946 | 1.60 | — | — |
| 3 | 18.082 | 1.51 | 1.90680 | 21.20 |
| 4 | −124.335 | 0.67 | — | — |
| 5 | −15.650 | 0.60 | 1.71300 | 53.93 |
| 6 | 15.749 | 9.69~4.58~1.43 | — | — |
| 7 | 7.006 | 1.79 | 1.51680 | 64.20 |
| 8 | −34.445 | 0.10 | — | — |
| 9 | 8.888 | 1.72 | 1.48749 | 70.45 |
| 10 | −25.459 | 0.76 | — | — |
| 11 | 94.713 | 0.60 | 1.94595 | 17.98 |
| 12 | 10.602 | 3.53 | — | — |
| 13 | 7.168 | 1.42 | 1.59270 | 35.45 |
| 14 | 42.718 | 2.33~3.39~5.17 | — | — |
| 15 | −85.497 | 1.50 | 1.52470 | 56.24 |
| 16 | 9.769 | 0.44~2.43~5.36 | — | — |
| 17 | ∞ | 0.64 | 1.54892 | 69.76 |

TABLE 16-continued

| | | | | |
|---|---|---|---|---|
| 18 | ∞ | 0.64 | — | — |
| 19 | ∞ | 0.64 | 1.51680 | 64.20 |
| 20 | ∞ | — | — | — | aspherical coefficients

| 1st surface | 2nd surface | 9th surface |
|---|---|---|
| K = 0.00000E+00 | K = 0.00000E+00 | K = 0.00000E+00 |
| A = 8.67478E−04 | A = 7.89734E−04 | A = −1.12725E−03 |
| B = −2.29069E−05 | B = −3.88424E−06 | B = −6.89841E−05 |
| C = 4.18462E−07 | C = −8.96630E−07 | C = −4.63941E−07 |

TABLE 16-continued

| | | |
|---|---|---|
| D = −3.71746E−09 | D = 3.55035E−08 | D = −1.62051E−07 |
| E = 1.75344E−11 | E = −3.56438E−10 | |

| 10th surface | 15th surface | 16th surface |
|---|---|---|
| K = 0.00000E+00 | K = 0.00000E+00 | K = 0.00000E+00 |
| A = −5.87874E−04 | A = −1.17541E−02 | A = −1.07772E−02 |
| B = −8.31786E−05 | B = 3.57416E−04 | B = 6.05058E−04 |
| C = 2.77664E−06 | C = −5.86048E−05 | C = −3.89222E−05 |
| D = −1.93492E−07 | D = 5.75674E−06 | D = 2.04301E−06 |
| | E = −2.09336E−07 | E = −4.97521E−08 |

Next, with respect to Embodiments 1 to 16, values corresponding to the conditional expressions (1) to (15) will altogether be shown in Table 17.

TABLE 17

| | Embodiment 1 | Embodiment 2 | Embodiment 3 | Embodiment 4 | Embodiment 5 |
|---|---|---|---|---|---|
| Conditional expression (1) | −0.58 | −0.63 | −0.59 | −0.59 | −0.58 |
| Conditional expression (2) | 5.94 | 5.32 | 5.68 | 5.76 | 5.55 |
| Conditional expression (3) | −0.19 | −0.22 | −0.20 | −0.19 | −0.17 |
| Conditional expression (4) | 0.34 | 0.35 | 0.40 | 0.37 | 0.40 |
| Conditional expression (5) | 24.48 | 30.07 | 23.23 | 24.44 | 22.50 |
| Conditional expression (6) | 1.85 | 1.75 | 1.81 | 1.75 | 1.75 |
| Conditional expression (7) | 1.03 | 0.67 | 1.13 | 1.13 | 1.15 |
| Conditional expression (8) | 0.64 | 1.11 | 0.62 | 0.62 | 0.63 |
| Conditional expression (9) | 0.88 | 0.96 | 0.91 | 0.90 | 0.88 |
| Conditional expression (10) | −0.87 | −0.92 | −0.84 | −0.81 | −0.58 |
| Conditional expression (11) | 48.63 | 41.87 | 50.88 | 50.88 | 51.17 |
| Conditional expression (12) | −0.57 | −0.30 | −0.59 | −0.59 | −0.30 |
| Conditional expression (13) | 0.47 | 0.75 | 0.44 | 0.43 | 0.56 |
| Conditional expression (14) | 0.65 | 0.78 | 0.60 | 0.60 | 0.62 |
| Conditional expression (15) | −1.07 | −0.89 | −1.13 | −1.11 | −1.17 |

| | Embodiment 6 | Embodiment 7 | Embodiment 8 | Embodiment 9 | Embodiment 10 |
|---|---|---|---|---|---|
| Conditional expression (1) | −0.65 | −0.59 | −0.63 | −0.64 | −0.56 |
| Conditional expression (2) | 5.79 | 5.05 | 5.16 | 4.83 | 6.48 |
| Conditional expression (3) | −0.17 | −0.38 | −0.25 | −0.40 | −0.13 |
| Conditional expression (4) | 0.39 | 0.43 | 0.43 | 0.35 | 0.36 |
| Conditional expression (5) | 26.27 | 20.92 | 20.92 | 24.77 | 24.24 |
| Conditional expression (6) | 1.85 | 1.75 | 1.75 | 1.91 | 1.81 |
| Conditional expression (7) | 1.05 | 1.13 | 1.18 | 0.79 | 1.08 |
| Conditional expression (8) | 0.57 | 0.65 | 0.57 | 0.15 | 0.58 |
| Conditional expression (9) | 0.69 | 1.00 | 0.97 | 0.88 | 0.81 |
| Conditional expression (10) | −0.34 | −0.59 | −0.57 | −0.43 | −0.53 |
| Conditional expression (11) | 50.42 | 48.63 | 43.48 | 63.63 | 51.96 |
| Conditional expression (12) | −0.35 | −0.57 | −0.53 | −0.45 | −0.64 |
| Conditional expression (13) | 0.32 | 0.66 | 0.68 | 0.84 | 0.66 |
| Conditional expression (14) | 0.46 | 0.80 | 0.93 | 1.05 | 1.14 |
| Conditional expression (15) | −0.48 | −1.32 | −0.54 | −0.65 | −0.22 |

| | Embodiment 11 | Embodiment 12 | Embodiment 13 | Embodiment 14 | Embodiment 15 | Embodiment 16 |
|---|---|---|---|---|---|---|
| Conditional expression (1) | −0.61 | −0.56 | −0.62 | −0.66 | −0.63 | −0.64 |
| Conditional expression (2) | 6.40 | 5.45 | 5.41 | 4.81 | 5.02 | 5.34 |
| Conditional expression (3) | −0.13 | −0.20 | −0.15 | −0.44 | −0.25 | −0.35 |
| Conditional expression (4) | 0.28 | 0.46 | 0.44 | 0.29 | 0.39 | 0.33 |
| Conditional expression (5) | 29.19 | 20.55 | 21.70 | 29.68 | 27.73 | 28.49 |
| Conditional expression (6) | 1.92 | 1.95 | 1.85 | 1.91 | 1.75 | 1.91 |
| Conditional expression (7) | 1.07 | 0.92 | 1.15 | 0.61 | 0.82 | 0.73 |
| Conditional expression (8) | 0.63 | 0.81 | 0.61 | 0.28 | 1.08 | 0.44 |
| Conditional expression (9) | 0.80 | 0.90 | 1.21 | 0.89 | 1.07 | 0.88 |
| Conditional expression (10) | −0.84 | −0.94 | −1.18 | −0.43 | −0.73 | −0.46 |
| Conditional expression (11) | 57.54 | 54.05 | 42.32 | 63.63 | 38.91 | 49.34 |
| Conditional expression (12) | −0.63 | −0.39 | −0.52 | −0.45 | −0.48 | −0.44 |
| Conditional expression (13) | 0.75 | 0.88 | 0.94 | 0.88 | 0.76 | 0.83 |
| Conditional expression (14) | 1.16 | 0.67 | 1.32 | 0.80 | 1.15 | 0.55 |
| Conditional expression (15) | −0.69 | −1.19 | −1.18 | −0.67 | −0.11 | −0.07 |

As is obvious from Table 17, the values for each embodiment from Embodiments 1 to 16 satisfy the conditional expressions (1) to (15), and as is obvious from the aberration diagrams of each embodiment, the individual aberrations are corrected properly.

Next, Embodiments 17 to 24 of the invention will be described by reference to specific numerical examples thereof.

Also, in Embodiments 17 to 24 which will be described below, a zoom lens is made up of, sequentially from an object side thereof, a first lens elements group LG1, a second lens elements group LG2 and a third lens element group LG3.

The first lens elements group LG1 has a negative refraction power as a whole and is made up by disposing a first lens element L1 (an object side surface of the first lens element L1 is to be referred to as a $1^{st}$ surface, and an image side surface as a $2^{nd}$ surface) which is a lens having a negative refraction power (hereinafter referred to as a negative lens) and which has a meniscus configuration which is convex on the object side surface, a second lens element L2 (an object side surface of the second lens element L2 is to be referred to as a $3^{rd}$ surface, and an image side surface as a $4^{th}$ surface) which is a lens having a positive refraction power (hereinafter, referred to as a positive lens) and which has a meniscus configuration which is convex on the object side surface, and a third lens element L3 (an object side surface of the third lens element L3 is to be referred to as a $5^{th}$ surface, and an image side surface as a $6^{th}$ surface) which is a negative lens.

The second lens elements group LG2 has a positive refraction power as a whole and is made up by disposing a fourth lens element L4 (an object side surface of the fourth lens element L4 is to be referred to as a $7^{th}$ surface, and an image side surface as an $8^{th}$ surface) which is a positive lens, a fifth lens element L5 (an object side surface of the fifth lens element L5 is to be referred to as a $9^{th}$ surface, and an image side surface as a $10^{th}$ surface) which is a negative lens and which has a meniscus configuration which is convex on the object side surface, and a sixth lens element L6 (an object side surface of the sixth lens element L6 is referred to be as an $11^{th}$ surface and an image side surface as a $12^{th}$ surface) which is a positive lens.

The third lens element group LG3 has a negative refraction power as a whole and is made up by disposing a seventh lens element L7 (an object side surface of the seventh lens element L7 is to be referred to as a $13^{th}$ surface, and an image side surface as a $14^{th}$ surface) which is a negative lens.

In addition, a crystal optical filter LPF (an object side surface of the crystal optical filter LPF is to be referred to as a $15^{th}$ surface, and an image side surface as an $16^{th}$ surface) and a cover glass CG (an object side surface of the cover glass CG is to be referred to as a $17^{th}$ surface, and an image side surface as an $18^{th}$ surface) which is for protection of a photographic portion of a CCD are disposed within an air space defined between the image side surface, which is the $14^{th}$ surface, of the seventh lens element L7 and an image plane.

The cutting of infrared rays which is required in handling an image sensor such as a CCD is understood to be implemented by applying an infrared reflection coating on to one side of refracting surfaces of the crystal optical filter LPF and, hence, is not illustrated.

A variable power is realized by shifting the positions of the first lens elements group LG1 and the second lens elements group LG2 in a direction of an optical axis of the zoom lens, or shifting, in addition to the first lens elements group LG1 and the second lens elements group LG2, the position of the third lens element group LG3.

In addition, in each embodiment, although a focal point adjustment for an object at a finite distance can be realized by shifting the position of the first lens elements group LG1 or the third lens element group LG3 in the direction of the optical axis, the implementation of focal point adjustment is not limited to the relevant method.

Furthermore, the shape of an aspheric surface used in each embodiment is defined as is known by giving a paraxial radius of curvature: R, a conic constant: K and high-order aspherical coefficients: A, B, C, D on a curved surface that is obtained by rotating round the optical axis a curve given by an aspherical equation:

$$Z=(Y^2/R)/[1+\sqrt{\{1-(1+K)(Y/R)^2\}}]+A\cdot Y^4+B\cdot Y^6+C\cdot Y^8+C\cdot Y^{10}+\ldots$$

when the Z axis is taken in the direction of the optical axis and the Y axis is taken in a direction which intersects the optical axis at right angles. Note that in the description of conic constants and high-order aspherical coefficients in tables, "E and numerals which follow it" represents an "exponent of 10." For example, "E-04" means $10^{-4}$, and a number just before it is multiplied by this number.

In addition, this embodiment, which is made up of the seven lens elements, satisfies the following conditional expression (16) with respect to the power that the first lens element group possesses, the following conditional expression (17) with respect to the size of the whole lens system, and the following conditional expression (18) with respect to the power that the third lens element group possesses.

$$-0.8 \leq f_w/f_I \leq -0.4 \tag{16}$$

$$4.5 \leq TL_w/f_w \leq 7.5 \tag{17}$$

$$-0.6 \leq f_w/f_{III} \leq 0 \tag{18}$$

where, $f_w$: composite focal length of the whole lens system at wide-angle end $f_I$: composite focal length of the first lens element group $f_{III}$: composite focal length of the third lens element group $TL_w$: distance from an object side surface of the first lens element making up the first lens elements group to the image plane at wide-angle end (where, a parallel plane glass portion is converted into an air space distance).

The conditional expression (16) relates to a proper distribution of power to the first lens element group which has the negative power. The conditional expression (16) specifies a condition for providing a well-balanced solution to properly correct the size and aberrations of the whole optical system and is substantially similar to the conditional expression (1) for Embodiments 1 to 16 that have been described before.

The conditional expression (17) is such as to control the overall length of the zoom lens at the wide-angle end. Namely, this expression specifies a condition which becomes a measure of reduction in size of the zoom lens of the invention and provides a similar condition to the condition for Embodiments 1 to 16 that have been described before. This conditional expression (17) has the same numerical range as that of the conditional expression (2).

The third conditional expression (18) is a conditional expression which is related to the power that the third lens element group possesses. It is a prime characteristic that it remains within the negative range, whereby a function is provided to cause the exit pupil of the optical system to approach the image plane side. This conditional expression (18) is substantially similar to the conditional expression (3) for Embodiments 1 to 16 that have been described before.

In addition, in the case of this embodiment, since by giving the negative power to the third lens element group, the change in angle of the principal ray of light when changing the magnification becomes about 2.6° to 4.6°, which is extremely small compared to the corresponding amount of change of a zoom lens of normal type in which the third lens elements group has a positive power, a large angle can be taken for the principal ray of light.

In embodiments to be described later on in which seven lens elements are provided, the angle of a principal ray of light (when a bisector of an angle formed by an upper ray of light and a lower ray of light is defined as a principal ray of light) at a maximum image point on the picture plane is limited to be a maximum of 18°, and a lower limit value that is specified by the conditional expression of the conditional expression (18) is to be a range where the negative power of the third lens element group can be taken in that state. When the lower limit is surpassed, although it is effective in making the system compact, the angle of the principal ray exceeds 20°, and problems are caused of shading and insufficient quantity of light, whereby the high image quality required for a digital still camera or the like becomes unable to be maintained. On the contrary, when an upper limit is surpassed, it means that an optical system of a size results which does not have to be made compact by the application of the invention.

In addition, in this embodiment, the first lens element which makes up the first lens elements group is an aspherical lens, and this embodiment satisfies the following conditional expression (19) with respect to the power that the second lens element possesses, the following conditional expression (20) with respect to the dispersion properties that are distributed to each lens element of the first lens elements group, the following conditional expression (21) with respect to the refractive index of the second lens element, the following conditional expression (22) with respect to the configuration of the image side surface of the first lens element, and satisfies the following conditional expression (23) with respect to a relative characteristic on configuration between the image side surface of the first lens element and the object side surface of the second lens element.

$$0.25 \leq f_w/f_2 \leq 0.55 \qquad (19)$$

$$15 \leq (\upsilon_1+\upsilon_3)/2-\upsilon_2 \qquad (20)$$

$$1.65 \leq n_2 \qquad (21)$$

$$0.8 \leq f_w/r_2 1.5 \qquad (22)$$

$$0.45 \leq r_2/r_3 \leq 0.85 \qquad (23)$$

where, $f_2$: focal length of the second lens element which makes up the first lens elements group $\upsilon_1$: Abbe number of the first lens element which makes up the first lens elements group $\upsilon_2$: Abbe number of the second lens element which makes up the first lens elements group $\upsilon_3$: Abbe number of the third lens element which makes up the first lens elements group $n_2$: refractive index relative to the d line of the second lens element which makes up the first lens elements group $r_2$: radius of curvature of the image side surface of the first lens element which makes up the first lens elements group $r_3$: radius of curvature of the object side surface of the second lens element which makes up the first lens elements group.

The conditional expression (19) is substantially similar to the conditional expression (4) for Embodiments 1 to 16 that have been described before in that the former expression also specifies a requirement for correcting properly basic aberrations of the first lens elements group as a whole.

The conditional expression (20) relates to the distribution of Abbe numbers of the negative lenses and the positive lens which make up the first lens elements group and specifies a similar condition to the condition for Embodiments 1 to 16 that have been described above. This conditional expression (20) has the same numerical range as that of the conditional expression (5).

In addition, the conditional expression (21) specifies a condition for correction of curvature of field and is substantially similar to the conditional expression (6) for Embodiments 1 to 16 that have been described before.

A basic configuration for suppressing the occurrence of off-axis aberrations such as coma aberration and distortion is realized by providing a concentric configuration relative to the entrance pupil under the strong negative power which is imparted to the first lens element, and the conditional expression (22) specifies a condition for realizing the relevant configuration and is substantially similar to the conditional expression (7) for Embodiments 1 to 16 that have been described above.

The conditional expression (23) is a conditional expression for correcting properly a positive spherical aberration that is caused by a strong diverging action occurring on the image side surface of the first lens element having the negative power.

In the event that an upper limit is surpassed, a negative spherical aberration by the second lens element becomes excessive, and on the contrary, in the event that a lower limit is surpassed, the positive spherical aberration by the first lens element becomes excessive, whereby in either of the cases, the spherical aberrations cannot be corrected properly.

Furthermore, in this embodiment, of refracting surfaces of each lens element which makes up the second lens elements group, at least one of the refracting surfaces is formed into an aspherical shape, and this embodiment satisfies the following conditional expression (24) with respect to the positive power that the fourth lens element possesses, the following conditional expression (25) with respect to the negative power that the fifth lens element possesses, and the following conditional expression (26) with respect the dispersion properties that are distributed to each lens element which makes up the second lens elements group, the following conditional expression (27) with respect to the refractive index that each of the similar lens elements possesses, the following conditional expression (28) with respect to the configuration of the object side surface of the fourth lens element and the following conditional expression (29) with respect to a relative relationship between the configuration of the object side surface of the fourth lens element and the configuration of an image side surface of the sixth lens element.

$$0.65 \leq f_w/f_4 \leq 1.05 \qquad (24)$$

$$-0.5 \leq f_w/f_5 \leq -0.3 \qquad (25)$$

$$25 \leq (\upsilon_4+\upsilon_6)/2-\upsilon_5 \qquad (26)$$

$$-0.45 \leq (n_4+n_6)/2-n_5 \leq -0.20 \qquad (27)$$

$$0.8 \leq f_w/r_7 \leq 1.3 \qquad (28)$$

$$-1.1 \leq r_7/r_{12} \leq -0.7 \qquad (29)$$

where, $f_4$: focal length of the fourth lens element which makes up the second lens elements group $f_5$: focal length of the fifth lens element which makes up the second lens elements group $\upsilon_4$: Abbe number of the fourth lens element which makes up the second lens elements group $\upsilon_5$: Abbe number of the fifth lens element which makes up the second lens elements group $\upsilon_6$: Abbe number of the sixth lens element which makes up the second lens elements group $n_4$: refractive index relative to the d line of the fourth lens element which makes up the second lens elements group $n_5$: refractive index relative to the d line of the fifth lens element which makes up the second lens elements group $n_6$: refractive index relative to the d line of the sixth lens element which makes up the second lens elements group $r_7$: radius of curvature of the object side surface of the fourth lens element which makes up the second lens elements group $r_{12}$: radius of curvature of the image side surface of the sixth lens element which makes up the second lens elements group.

The conditional expression (24) relates to the power of the fourth lens element which is disposed closest to the object side in the second lens elements group and which has the strong positive power, the fourth lens element being used in place of the fourth lens elements and the fifth lens elements in Embodiments 1 to 16 that have been described above. This conditional expression (24) specifies conditions for imparting a large positive power for collecting rays of light which diverge from the first lens elements group and properly correcting the aberrations.

In the event that an upper limit is surpassed, the positive power becomes excessive, and at the same time, the spherical aberration is corrected insufficiently, and on the contrary, in the event that a lower limit is surpassed, the positive power for collecting light rays from the first lens elements group becomes insufficient, and an excessive correction of spherical aberration results. In either of the cases, however, in addition to spherical aberration, the off-axis aberration such as coma aberration and chromatic aberration are largely affected.

The conditional expression (25) relates to the power of the negative lens which makes up the second lens elements group and specifies a prime requirement for correction of the basic chromatic aberration and curvature of field of the second lens elements group as a whole. Namely, in the event that an upper limit is surpassed, although a lens configuration made up of a combination in which the powers of the respective lens elements of the second lens elements group are small, the correction of chromatic aberration and curvature of field becomes insufficient, and on the contrary, in the event a lower limit is surpassed, since each lens power becomes excessive, high-order spherical aberration and coma aberration are produced, and a good performance cannot be obtained.

The conditional expression (26) relates to the distribution of Abbe numbers of the positive lens and the negative lens which is to be taken into consideration in determining a glass material for each lens element of the second lens elements group. Namely, the conditional expression (26) specifies a condition for keeping a balance with each aberration while properly correcting the chromatic aberration of the whole lens system. In the event that a lower limit is surpassed, the power of each lens element has to be increased so as to correct the chromatic aberration, and this will constitute a disadvantageous condition in correcting the spherical aberration and coma aberration.

The conditional expression (27) relates to the correction of curvature of field in the second lens elements group. In order to balance a negative Petzval sum produced from the first lens elements group, the refractive index of each lens element needs to be a value which falls within a range specified by a condition presented by the relevant expression. In the event that an upper limit is surpassed, the Petzval sum becomes too small, and the balance with the spherical aberration is lost, causing the correction of curvature of field to become excessive. Similarly, a lower unit is surpassed, the correction of curvature of field becomes insufficient, and the performance of the whole picture plane cannot be maintained.

In addition, the conditional expression (28) is a conditional expression in relation to the configuration of the object side surface of the fourth lens element. Since the object side surface of the fourth lens element is disposed right behind an aperture stop, the relevant surface plays an important role in correcting spherical aberration. The conditional expression (28) specifies a condition for properly correcting spherical aberration in connection with the negative power of the first lens elements group.

In the event that an upper limit of the conditional expression (28) is surpassed, although off-axis aberrations such as coma aberration and astigmatism get easy to be corrected, an insufficient correction of spherical aberration results. On the contrary, in the event that a lower limit is surpassed, an excessive correction of spherical aberration results, and at the same time, a proper correction of the off-axis aberrations becomes difficult.

The conditional expression (29) is, along with the conditional expression (28), a conditional expression which corrects spherical aberration and other aberrations in a balanced fashion. In the event that an upper limit is surpassed, the correction of aberrations becomes difficult, and on the contrary, in the event that a lower limit is surpassed, a proper correction of spherical aberration is disabled.

In addition, the embodiment satisfies the following conditional expression (30) with respect to the configuration of the object side surface of the seventh lens element which makes up the third lens element group.

$$-1.2 \leq f_w/r_{13} \leq 0.4 \quad (30)$$

where, $r_{13}$: radius of curvature of the object side surface of the seventh lens element which makes up the third lens element group.

As is shown by the conditional expression (30), in order to cause rays of light converging from the second lens elements group to focus on an image plane with production of little aberration, basically, the configuration of the object side surface of the seventh lens element is preferably formed into a concentric shape relative to the second lens elements group.

Consequently, although it is good that the value of the conditional expression (30) basically takes a negative value, depending on design specifications such as overall length, in the event that the relevant surface is an aspherical surface, as is shown at an upper limit of the conditional expression (30), there may occur a case where the expression takes at least a positive value. However, in the event that the value surpasses an upper limit to become too large, both the peripheral shape and the concentric shape are changed, whereby aberrations such as comma aberration and distortion are produced. In the event that a lower limit is surpassed, the Petzval sum due to the object side surface of the seventh lens element becomes too large on the negative side, and the angle of an emerging ray of light also becomes excessive.

Embodiment 17

Figure 33:
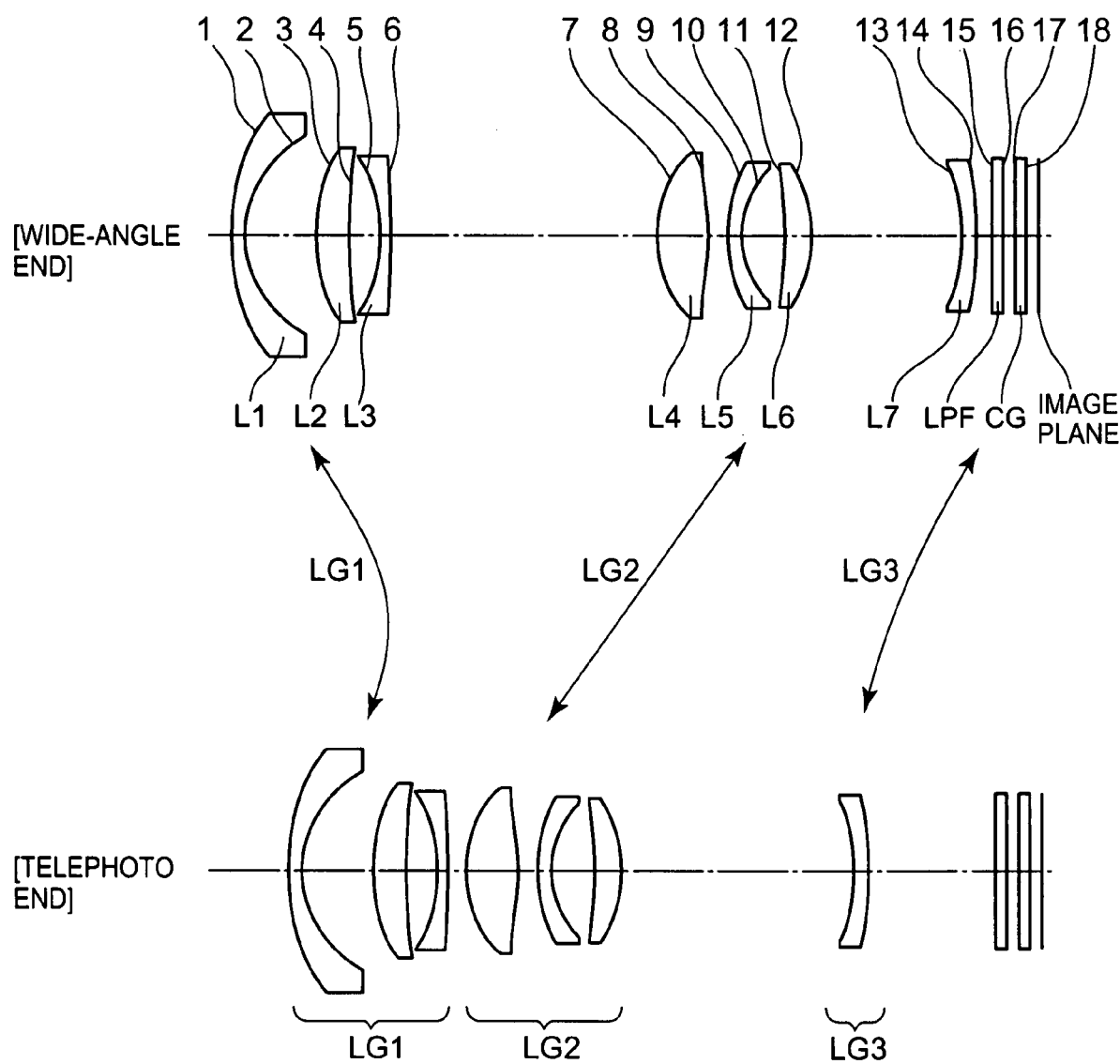
FIG. 33 is a diagram showing the configuration of lens elements of a 17th embodiment of a zoom lens of the invention.

A numerical example for a 17th embodiment of a zoom lens of the invention will be shown in Table 18. In addition, FIG. 33 is a diagram showing the configuration of lens elements of the zoom lens, and FIG. 34 is a diagram showing aberrations thereof. In the table and figures, f denotes the focal length of a whole lens system (hereinafter, values shown therein are from the left-hand side values at a wide-angle end, intermediate area and telephoto end), $F_{no}$ f number, and $2\omega$ total angle of view of lens. In addition, R denotes radius of curvature, D lens element thickness or lens element space, $N_d$ refractive index of d line, and $\upsilon_d$ Abbe number of d line. In diagrams showing aberrations, d, g, C in diagrams showing spherical aberrations denote aberration curves in individual wavelengths. In addition, S.C. denotes sine condition. In astigmatism diagrams, S denotes sagital, and M denotes meridional.

TABLE 18 f = 7.06~11.92~20.10
F = 1.96~2.59~3.60
2ω = 67.41~41.42~25.07

| Surface number | R | D | $N_d$ | $\nu_d$ |
|---|---|---|---|---|
| 1 | 16.729 | 0.72 | 1.81474 | 37.03 |
| 2 | 6.464 | 3.52 | — | — |
| 3 | 11.169 | 1.67 | 1.84666 | 23.78 |
| 4 | 42.179 | 1.39 | — | — |
| 5 | −11.183 | 0.60 | 1.71300 | 53.93 |
| 6 | −218.787 | 13.77~6.15~1.15 | — | — |
| 7 | 6.828 | 2.63 | 1.56907 | 71.30 |
| 8 | −17.616 | 1.00 | — | — |
| 9 | 10.138 | 0.67 | 1.92286 | 20.88 |
| 10 | 5.946 | 2.28 | — | — |
| 11 | −32.449 | 1.37 | 1.51680 | 64.20 |
| 12 | −8.425 | 7.59~8.07~12.02 | — | — |
| 13 | −12.285 | 0.80 | 1.52470 | 56.24 |
| 14 | −23.623 | 0.79~4.28~6.50 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| $1^{st}$ surface | $2^{nd}$ surface | $7^{th}$ surface |
|---|---|---|
| K = 0.00000E+00 | K = 0.00000E+00 | K = 0.00000E+00 |
| A = 4.78485E−04 | A = 2.48666E−04 | A = −3.98997E−04 |
| B = −2.71492E−05 | B = −2.59409E−05 | B = −8.90933E−07 |
| C = 8.50633E−07 | C = −1.25078E−07 | C = −2.60573E−08 |
| D = −1.21986E−08 | D = 2.89371E−08 | D = −9.58774E−10 |
| E = 7.20010E−11 | E = −5.65562E−10 | |

| $8^{th}$ surface | $13^{th}$ surface |
|---|---|
| K = 0.00000E+00 | K = 0.00000E+00 |
| A = 4.76749E−04 | A = 1.22023E−04 |
| B = −2.35319E−06 | B = −3.67055E−05 |
| C = 5.30018E−08 | C = 5.84669E−06 |
| | D = −3.87348E−07 |
| | E = 9.48144E−09 |

Embodiment 18

Figure 35:
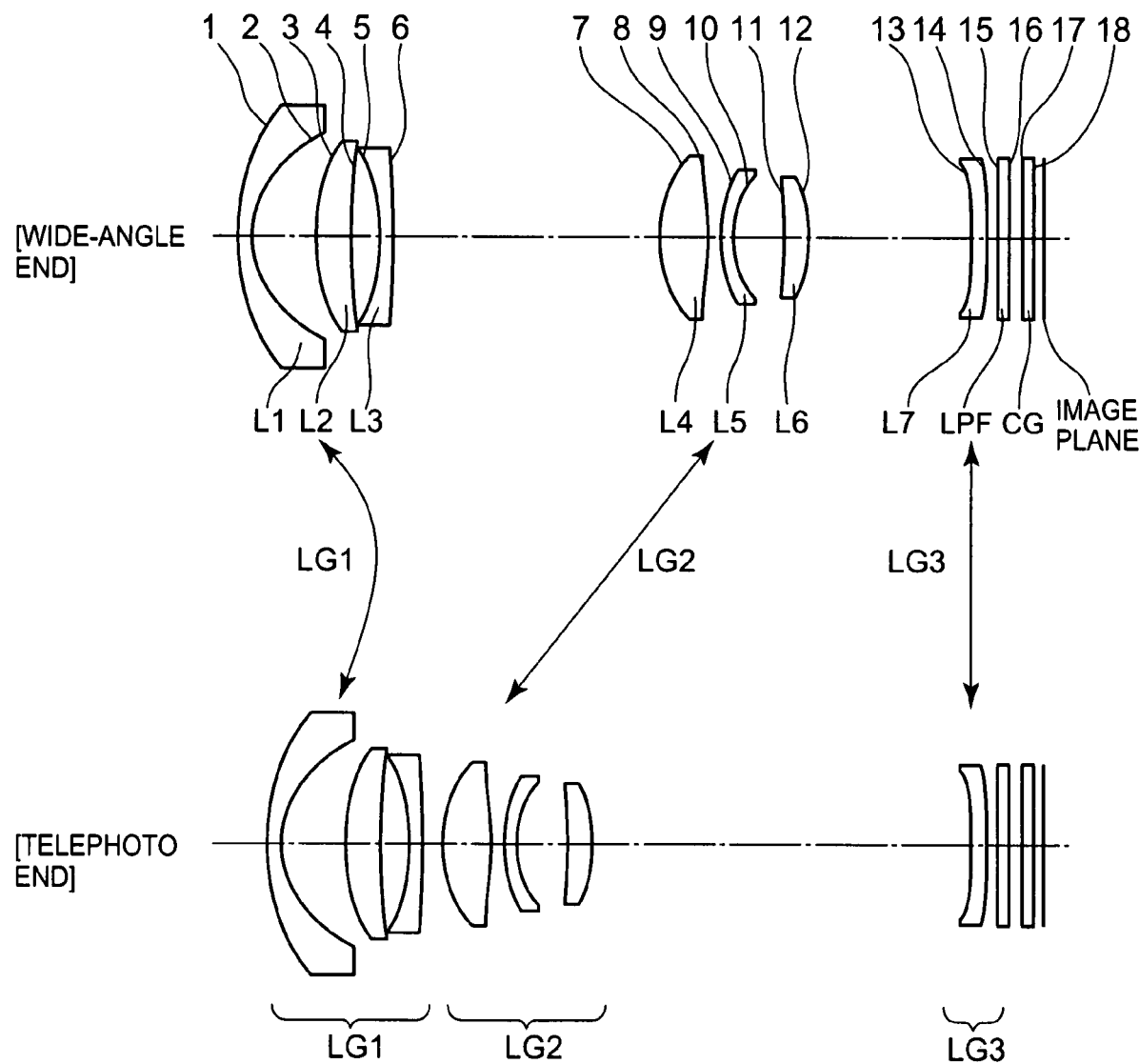
FIG. 35 is a diagram showing the configuration of lens elements of an 18th embodiment of a zoom lens of the invention.

A numerical example for an 18th embodiment of a zoom lens of the invention will be shown in Table 19. In addition, FIG. 35 is a diagram showing the configuration of lens elements of the zoom lens, and FIG. 36 is a diagram showing aberrations thereof.

TABLE 19 f = 6.60~11.16~18.82
F = 1.96~2.59~3.66
2ω = 71.47~44.07~26.69

| Surface number | R | D | $N_d$ | $\nu_d$ |
|---|---|---|---|---|
| 1 | 17.897 | 0.76 | 1.80610 | 40.73 |
| 2 | 6.060 | 3.11 | — | — |
| 3 | 10.235 | 1.79 | 1.84666 | 23.78 |
| 4 | 35.572 | 1.47 | — | — |
| 5 | −11.491 | 0.60 | 1.71300 | 53.93 |
| 6 | −975.094 | 13.53~5.75~1.15 | — | — |
| 7 | 7.081 | 2.37 | 1.63246 | 63.80 |
| 8 | −24.413 | 0.76 | — | — |
| 9 | 9.621 | 0.60 | 1.94595 | 17.98 |
| 10 | 5.884 | 2.57 | — | — |
| 11 | −48.524 | 1.23 | 1.51742 | 52.15 |
| 12 | −9.264 | 8.19~12.30~19.23 | — | — |
| 13 | 22.153 | 0.80 | 1.52470 | 56.24 |
| 14 | 11.862 | 0.56 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| $1^{st}$ surface | $2^{nd}$ surface | $7^{th}$ surface |
|---|---|---|
| K = 0.00000E+00 | K = 0.00000E+00 | K = 0.00000E+00 |
| A = 9.08795E−04 | A = 7.05999E−04 | A = −3.29615E−04 |
| B = −5.66115E−05 | B = −5.62207E−05 | B = −8.69046E−07 |
| C = 1.79363E−06 | C = −4.84236E−08 | C = −1.90336E−08 |
| D = −2.64987E−08 | D = 6.52311E−08 | D = −3.22161E−09 |
| E = 1.55558E−10 | E = −1.39692E−09 | |

| $8^{th}$ surface | $13^{th}$ surface | $14^{th}$ surface |
|---|---|---|
| K = 0.00000E+00 | K = 0.00000E+00 | K = 0.00000E+00 |
| A = 3.69730E−04 | A = −7.92748E−03 | A = −9.80709E−03 |
| B = −9.71883E−07 | B = 6.45709E−04 | B = 7.96636E−04 |
| C = −5.82142E−08 | C = −2.23222E−05 | C = −2.87699E−05 |
| | D = 6.79738E−08 | D = 2.84988E−07 |
| | E = 3.12782E−09 | |

Embodiment 19

Figure 37:
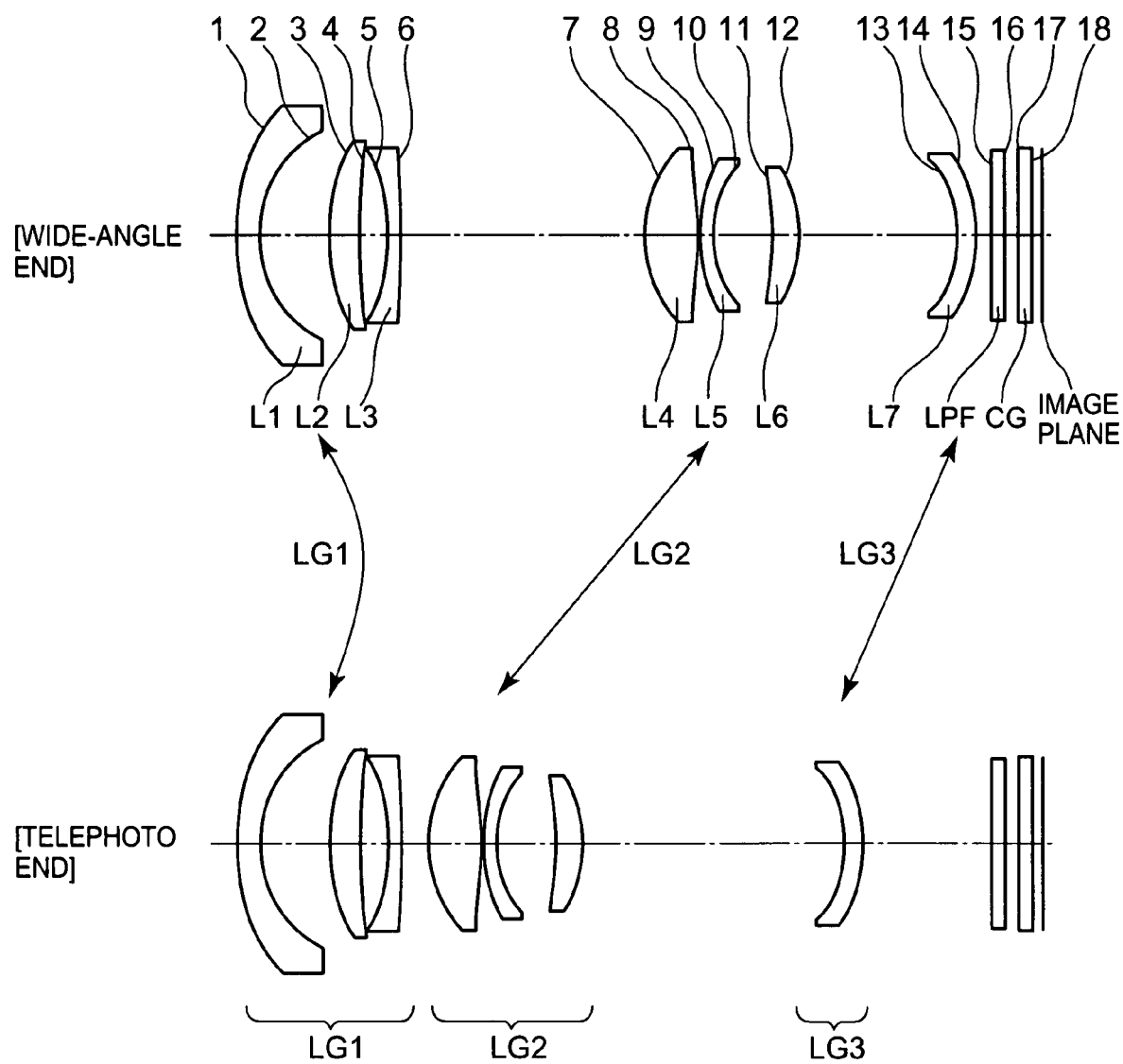
FIG. 37 is a diagram showing the configuration of lens elements of a 19th embodiment of a zoom lens of the invention.

A numerical example for a $19^{th}$ embodiment of a zoom lens of the invention will be shown in Table 20. In addition, FIG. 37 is a diagram showing the configuration of lens elements of the zoom lens, and FIG. 38 is a diagram showing aberrations thereof.

TABLE 20 f = 7.21~12.17~20.56
F = 1.96~2.64~3.77
2ω = 66.09~41.08~24.97

| Surface number | R | D | $N_d$ | $\nu_d$ |
|---|---|---|---|---|
| 1 | 19.074 | 1.07 | 1.81474 | 37.03 |
| 2 | 7.196 | 3.33 | — | — |
| 3 | 10.800 | 1.41 | 1.90680 | 21.20 |
| 4 | 25.164 | 1.44 | — | — |
| 5 | −10.203 | 0.60 | 1.72916 | 54.66 |
| 6 | −135.833 | 11.75~5.24~1.15 | — | — |
| 7 | 6.502 | 2.59 | 1.63246 | 63.80 |
| 8 | −19.202 | 0.10 | — | — |
| 9 | 9.505 | 0.63 | 1.92286 | 20.88 |
| 10 | 5.644 | 2.89 | — | — |
| 11 | −21.863 | 1.26 | 1.48749 | 70.45 |
| 12 | −7.726 | 7.65~8.88~12.56 | — | — |
| 13 | −11.251 | 0.86 | 1.52470 | 56.24 |

TABLE 20-continued

| | | | | |
|---|---|---|---|---|
| 14 | −20.216 | 0.80~3.67~6.50 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| $1^{st}$ surface | $2^{nd}$ surface | $7^{th}$ surface |
|---|---|---|
| K = 0.00000E+00 | K = 0.00000E+00 | K = 0.00000E+00 |
| A = 8.59718E−04 | A = 8.46466E−04 | A = −4.40865E−04 |
| B = −3.11014E−05 | B = −2.84513E−05 | B = −2.10515E−06 |
| C = 8.29049E−07 | C = 1.03543E−07 | C = −5.98113E−09 |
| D = −1.09284E−08 | D = 2.12528E−08 | D = 8.78276E−11 |
| E = 6.55720E−11 | E = −3.12894E−10 | |

| $8^{th}$ surface | $13^{th}$ surface | $14^{th}$ surface |
|---|---|---|
| K = 0.00000E+00 | K = 0.00000E+00 | K = 0.00000E+00 |
| A = 5.53958E−04 | A = −1.80421E−03 | A = −1.88435E−03 |
| B = −4.43099E−06 | B = −1.84005E−04 | B = −1.08716E−04 |
| C = 1.66778E−07 | C = 2.14189E−05 | C = 1.36062E−05 |
| | D = −6.75424E−07 | D = −4.81727E−07 |
| | E = −1.04548E−08 | |

Embodiment 20

Figure 39:
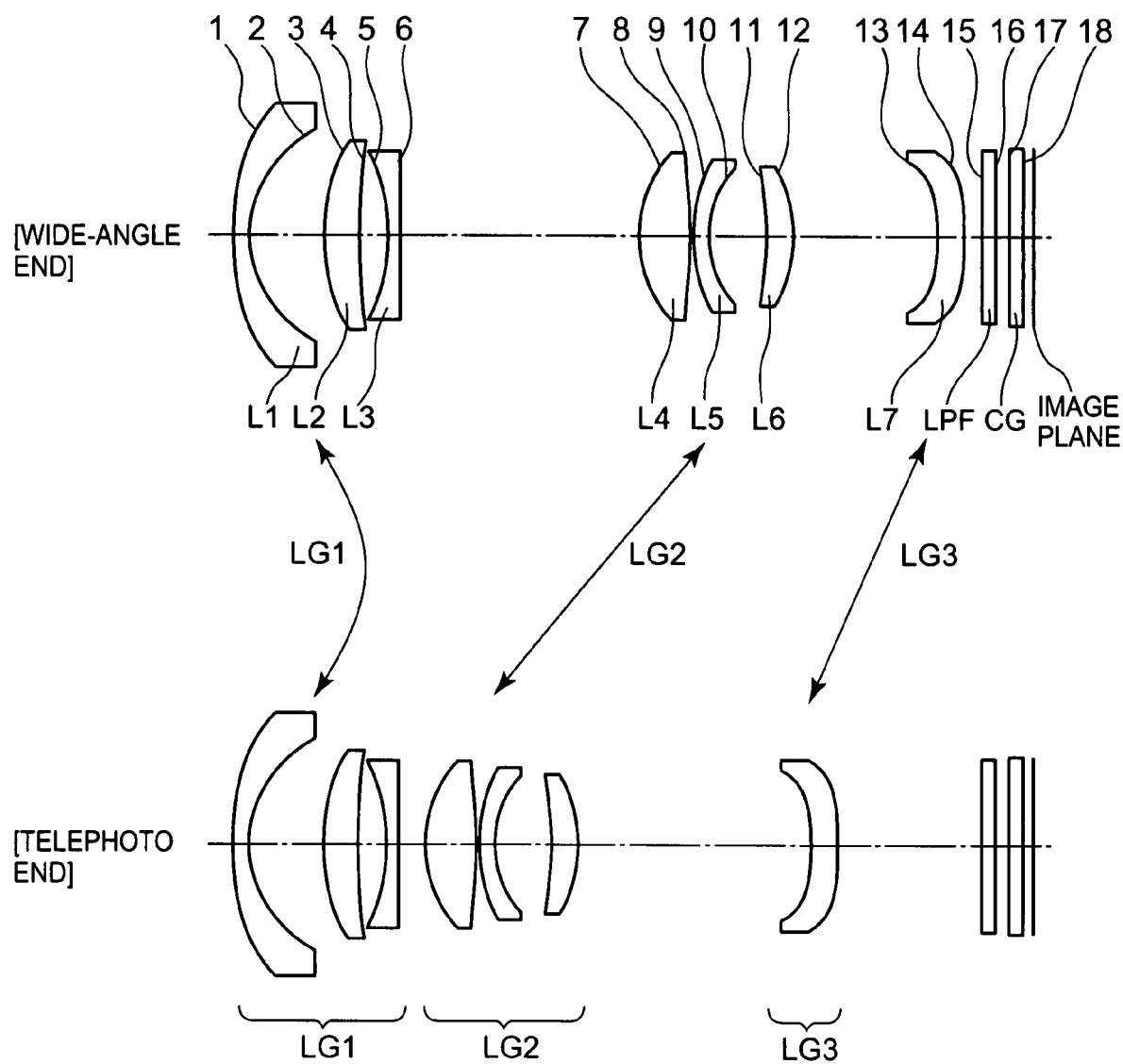
FIG. 39 is a diagram showing the configuration of lens elements of a 20th embodiment of a zoom lens of the invention.

A numerical example for a $20^{th}$ embodiment of a zoom lens of the invention will be shown in Table 21. In addition, FIG. 39 is a diagram showing the configuration of lens elements of the zoom lens, and FIG. 40 is a diagram showing aberrations thereof.

TABLE 21 f = 6.24~10.53~17.77
F = 1.96~2.65~3.80
2ω = 73.81~47.09~28.97

| Surface number | R | D | $N_d$ | $v_d$ |
|---|---|---|---|---|
| 1 | 15.937 | 0.72 | 1.82080 | 42.71 |
| 2 | 5.803 | 3.40 | — | — |
| 3 | 11.046 | 1.60 | 1.84666 | 23.78 |
| 4 | 50.714 | 1.19 | — | — |
| 5 | −10.906 | 0.60 | 1.72916 | 54.66 |
| 6 | 217.040 | 10.82~4.83~1.15 | — | — |
| 7 | 6.498 | 2.29 | 1.69400 | 56.30 |
| 8 | −19.146 | 0.10 | — | — |
| 9 | 9.474 | 0.70 | 1.94595 | 17.98 |
| 10 | 5.530 | 2.59 | — | — |
| 11 | −17.031 | 1.15 | 1.48749 | 70.45 |
| 12 | −7.278 | 6.48~7.63~10.44 | — | — |
| 13 | −33.208 | 1.20 | 1.52470 | 56.24 |
| 14 | 96.110 | 0.76~3.33~6.50 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| $1^{st}$ surface | $2^{nd}$ surface | $7^{th}$ surface |
|---|---|---|
| K = 0.00000E+00 | K = 0.00000E+00 | K = 0.00000E+00 |
| A = 6.04773E−04 | A = 2.82447E−04 | A = −4.84216E−04 |
| B = −3.93535E−05 | B = −3.82997E−05 | B = −3.64447E−06 |
| C = 1.50574E−06 | C = −1.81821E−07 | C = 1.18953E−07 |
| D = −2.68733E−08 | D = 6.33095E−08 | D = −7.50550E−10 |
| E = 1.91711E−10 | E = −1.66775E−09 | |

TABLE 21-continued

| $8^{th}$ surface | $13^{th}$ surface | $14^{th}$ surface |
|---|---|---|
| K = 0.00000E+00 | K = 0.00000E+00 | K = 0.00000E+00 |
| A = 5.48392E−04 | A = −3.60325E−03 | A = −3.61113E−03 |
| B = −7.15368E−06 | B = −1.50520E−04 | B = −5.28512E−05 |
| C = 4.10325E−07 | C = 1.46674E−05 | C = 9.98329E−06 |
| D = −4.58990E−09 | D = −1.54888E−07 | D = −4.42543E−07 |
| | E = −4.61722E−08 | |

Embodiment 21

Figure 41:
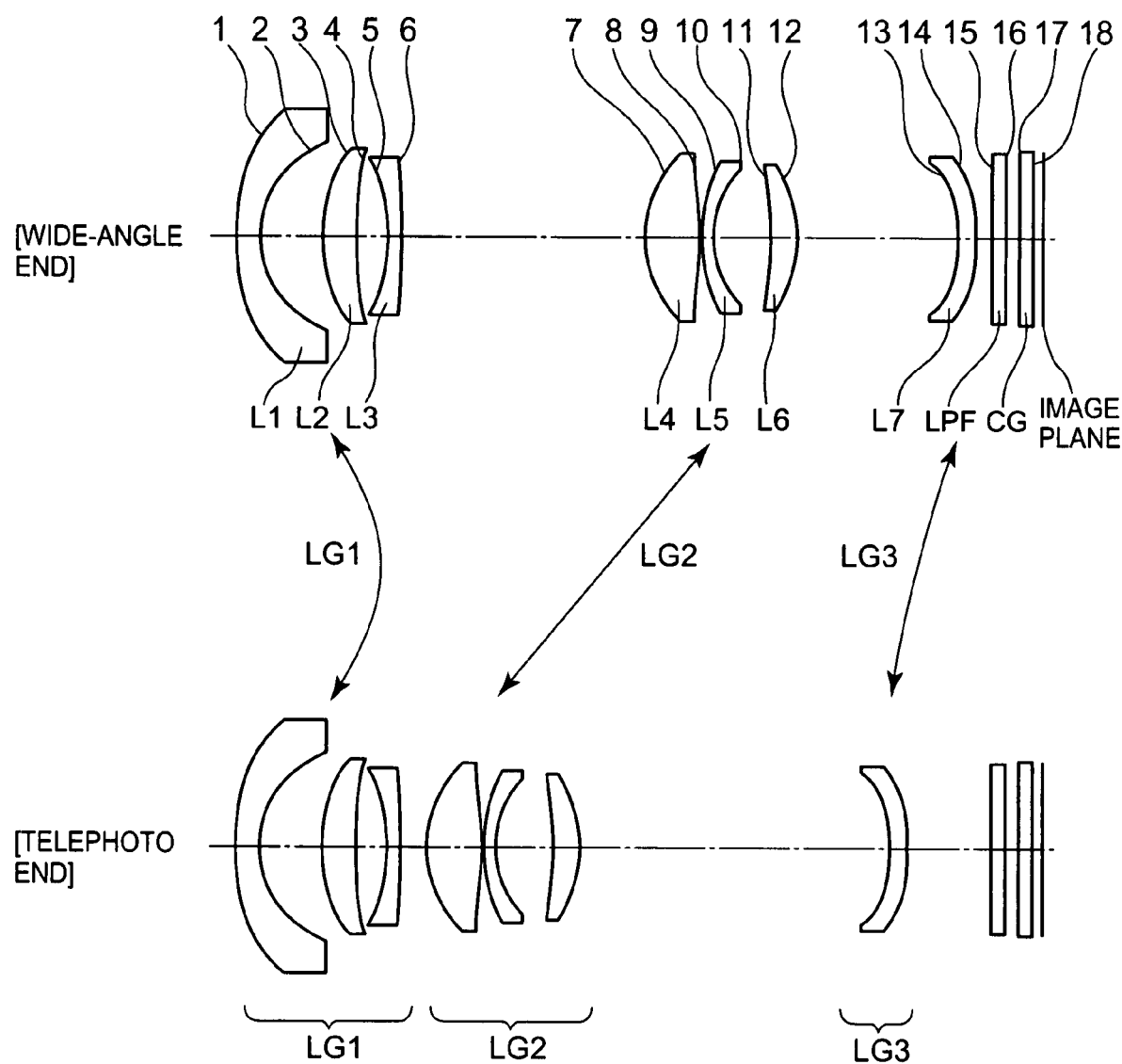
FIG. 41 is a diagram showing the configuration of lens elements of a 21st embodiment of a zoom lens of the invention.

A numerical example for a $21^{st}$ embodiment of a zoom lens of the invention will be shown in Table 22. In addition, FIG. 41 is a diagram showing the configuration of lens elements of the zoom lens, and FIG. 42 is a diagram showing aberrations thereof.

TABLE 22 f = 6.78~11.45~19.33
F = 1.96~2.59~3.71
2ω = 69.24~43.59~26.79

| Surface number | R | D | $N_d$ | $v_d$ |
|---|---|---|---|---|
| 1 | 21.346 | 1.20 | 1.80139 | 45.45 |
| 2 | 6.706 | 2.92 | — | — |
| 3 | 9.220 | 1.65 | 1.80518 | 25.46 |
| 4 | 22.664 | 1.53 | — | — |
| 5 | −10.558 | 0.60 | 1.71300 | 53.93 |
| 6 | −239.406 | 11.77~5.18~1.15 | — | — |
| 7 | 6.127 | 2.64 | 1.59240 | 68.30 |
| 8 | −17.843 | 0.10 | — | — |
| 9 | 9.432 | 0.60 | 1.84666 | 23.78 |
| 10 | 5.430 | 2.72 | — | — |
| 11 | −21.877 | 1.30 | 1.49700 | 81.61 |
| 12 | −7.458 | 7.74~10.13~14.95 | — | — |
| 13 | −18.253 | 0.80 | 1.60717 | 29.00 |
| 14 | −46.532 | 0.80~2.44~4.14 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| $1^{st}$ surface | $2^{nd}$ surface | $7^{th}$ surface |
|---|---|---|
| K = 0.00000E+00 | K = 0.00000E+00 | K = 0.00000E+00 |
| A = 1.20467E−03 | A = 1.34100E−03 | A = −5.13225E−04 |
| B = −3.77105E−05 | B = −3.05456E−05 | B = −2.99283E−06 |
| C = 8.31782E−07 | C = −1.62280E−07 | C = 7.30923E−08 |
| D = −9.81491E−09 | D = 2.33953E−08 | D = −4.31509E−09 |
| E = 5.46771E−11 | E = −2.23641E−10 | |

| $8^{th}$ surface | $13^{th}$ surface | $14^{th}$ surface |
|---|---|---|
| K = 0.00000E+00 | K = 0.00000E+00 | K = 0.00000E+00 |
| A = 6.53620E−04 | A = −2.03194E−03 | A = −2.55278E−03 |
| B = −3.25133E−06 | B = −2.81251E−04 | B = −1.49009E−04 |
| C = 1.51177E−07 | C = 2.90448E−05 | C = 1.67952E−05 |
| | D = −8.59119E−07 | D = −4.93972E−07 |
| | E = −3.68943E−09 | |

Embodiment 22

Figure 43:
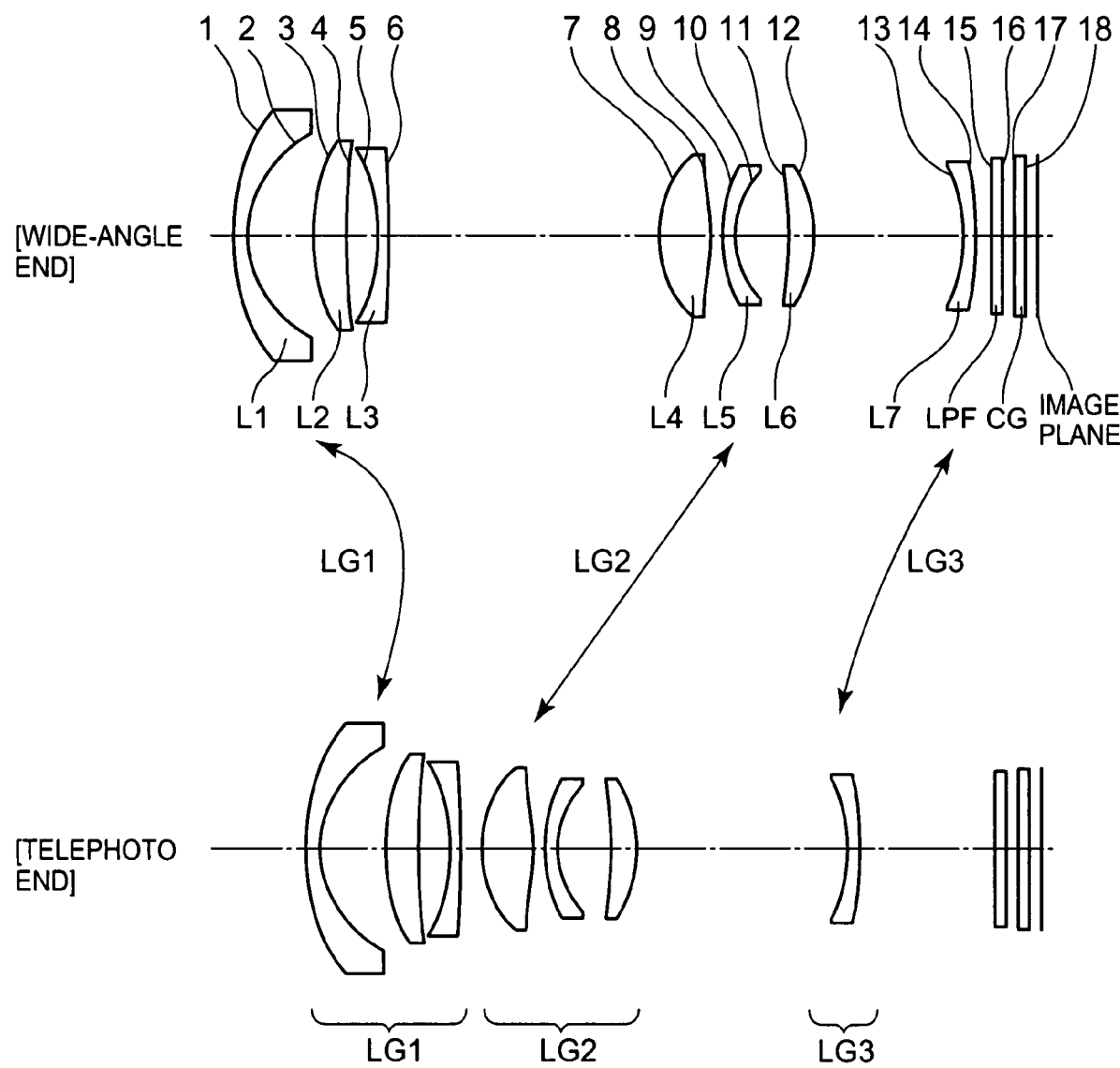
FIG. 43 is a diagram showing the configuration of lens elements of a 22nd embodiment of a zoom lens of the invention.

A numerical example for a $22^{nd}$ embodiment of a zoom lens of the invention will be shown in Table 23. In addition, FIG. 43 is a diagram showing the configuration of lens elements of the zoom lens, and FIG. 44 is a diagram showing aberrations thereof.

TABLE 23 f = 7.39~12.48~21.06
F = 1.96~2.62~3.73
2ω = 65.13~39.63~23.90

| Surface number | R | D | $N_d$ | $v_d$ |
|---|---|---|---|---|
| 1 | 15.869 | 0.72 | 1.81474 | 37.03 |
| 2 | 6.667 | 3.18 | — | — |
| 3 | 10.994 | 1.78 | 1.84666 | 23.78 |
| 4 | 35.151 | 1.59 | — | — |
| 5 | −11.860 | 0.60 | 1.72916 | 54.66 |
| 6 | −263.629 | 13.87~5.97~1.15 | — | — |
| 7 | 6.954 | 2.52 | 1.56907 | 71.30 |
| 8 | −18.119 | 0.71 | — | — |
| 9 | 11.113 | 0.66 | 1.92286 | 20.88 |
| 10 | 6.443 | 2.65 | — | — |
| 11 | −44.977 | 1.30 | 1.51823 | 58.96 |
| 12 | −8.568 | 7.70~8.76~10.79 | — | — |
| 13 | −9.935 | 0.60 | 1.48749 | 70.45 |
| 14 | −30.569 | 0.74~3.31~7.00 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| $1^{st}$ surface | $2^{nd}$ surface | $7^{th}$ surface | $8^{th}$ surface |
|---|---|---|---|
| K = 0.00000E+00 | K = 0.00000E+00 | K = 0.00000E+00 | K = 0.00000E+00 |
| A = 3.78966E−04 | A = 2.07611E−04 | A = −3.72392E−04 | A = 4.88425E−04 |
| B = −1.93884E−05 | B = −2.21333E−05 | B = −1.78195E−06 | B = −3.79645E−06 |
| C = 5.84045E−07 | C = 2.23132E−07 | C = −1.22161E−08 | C = 9.63737E−08 |
| D = −7.82448E−09 | D = 7.02082E−09 | D = −1.43045E−11 | |
| E = 4.56451E−11 | E = −1.59634E−10 | | |

Embodiment 23

Figure 45:
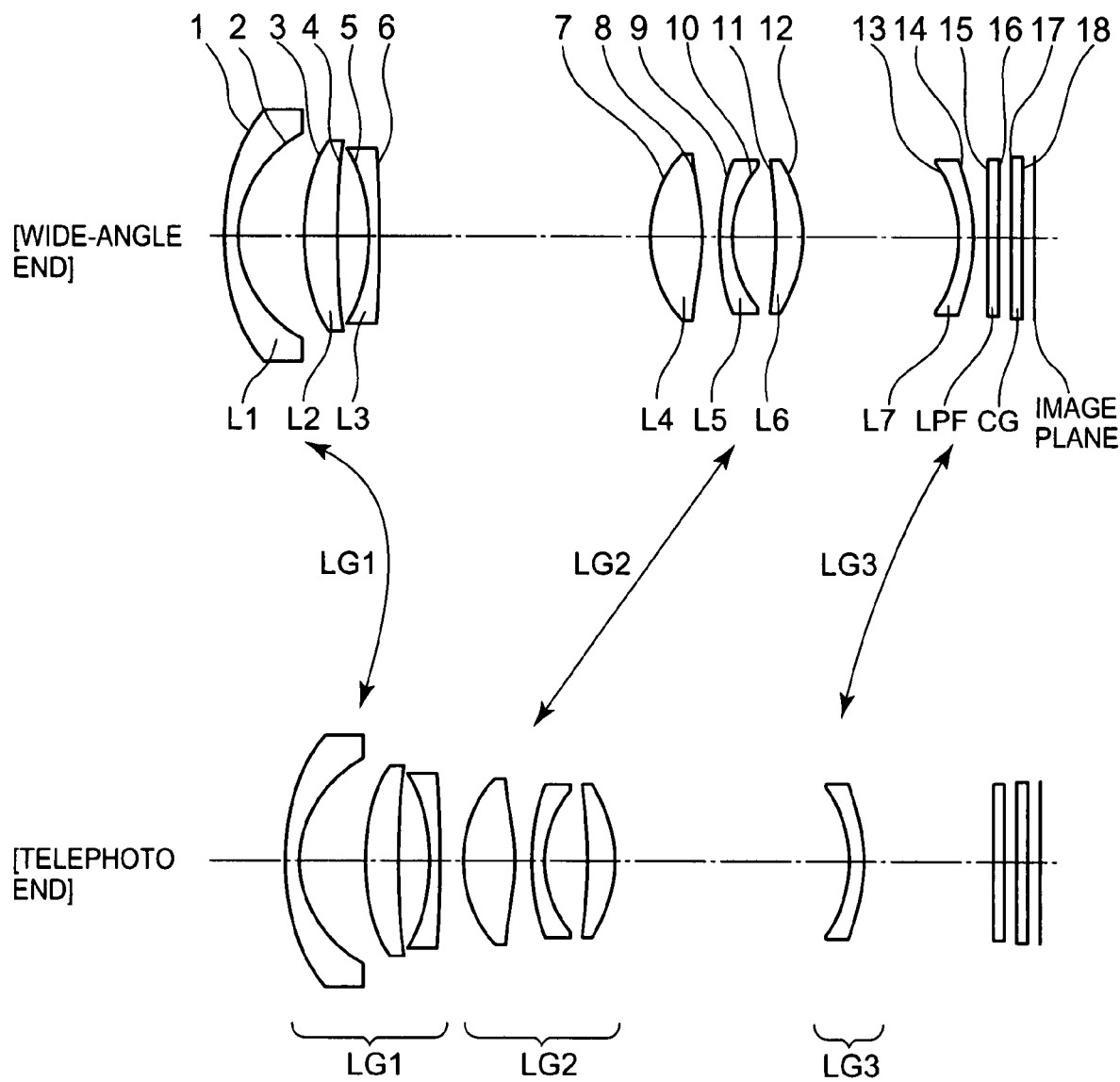
FIG. 45 is a diagram showing the configuration of lens elements of a 23rd embodiment of a zoom lens of the invention.

A numerical example for a $23^{rd}$ embodiment of a zoom lens of the invention will be shown in Table 24. In addition, FIG. 45 is a diagram showing the configuration of lens elements of the zoom lens, and FIG. 46 is a diagram showing aberrations thereof.

TABLE 24 f = 6.80~11.48~19.37
F = 1.96~2.57~3.55
2ω = 69.20~42.83~26.03

| Surface number | R | D | $N_d$ | $v_d$ |
|---|---|---|---|---|
| 1 | 16.220 | 0.72 | 1.81474 | 37.03 |
| 2 | 6.214 | 3.26 | — | — |
| 3 | 10.545 | 1.62 | 1.84666 | 23.78 |
| 4 | 26.619 | 1.70 | — | — |
| 5 | −10.396 | 0.60 | 1.59240 | 68.30 |
| 6 | −114.194 | 13.86~6.06~1.15 | — | — |
| 7 | 6.997 | 2.58 | 1.56907 | 71.30 |
| 8 | −15.232 | 1.00 | — | — |
| 9 | 15.438 | 0.60 | 1.84666 | 23.78 |
| 10 | 6.905 | 2.10 | — | — |
| 11 | −44.097 | 1.55 | 1.48749 | 70.45 |
| 12 | −7.771 | 7.86~8.79~11.95 | — | — |
| 13 | −7.917 | 0.80 | 1.52470 | 56.24 |
| 14 | −12.408 | 0.68~3.62~6.50 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — |

TABLE 24-continued aspherical coefficients

| $1^{st}$ surface | $2^{nd}$ surface | $7^{th}$ surface |
|---|---|---|
| K = 0.00000E+00 | K = 0.00000E+00 | K = 0.00000E+00 |
| A = 7.42964E−04 | A = 5.52326E−04 | A = −4.08870E−04 |
| B = −4.04783E−05 | B = −3.65061E−05 | B = 3.39731E−08 |
| C = 1.26829E−06 | C = −2.28480E−07 | C = −1.70352E−08 |
| D = −1.90846E−08 | D = 4.86906E−08 | D = 2.20197E−10 |
| E = 1.16409E−10 | E = −1.01645E−09 | |

| $8^{th}$ surface | $14^{th}$ surface |
|---|---|
| K = 0.00000E+00 | K = 0.00000E+00 |
| A = 5.61347E−04 | A = −1.90958E−04 |
| B = −2.78540E−06 | B = 3.43699E−05 |
| C = 9.62261E−08 | C = −5.10868E−06 |
| | D = 3.20611E−07 |
| | E = −7.42682E−09 |

Embodiment 24

Figure 47:
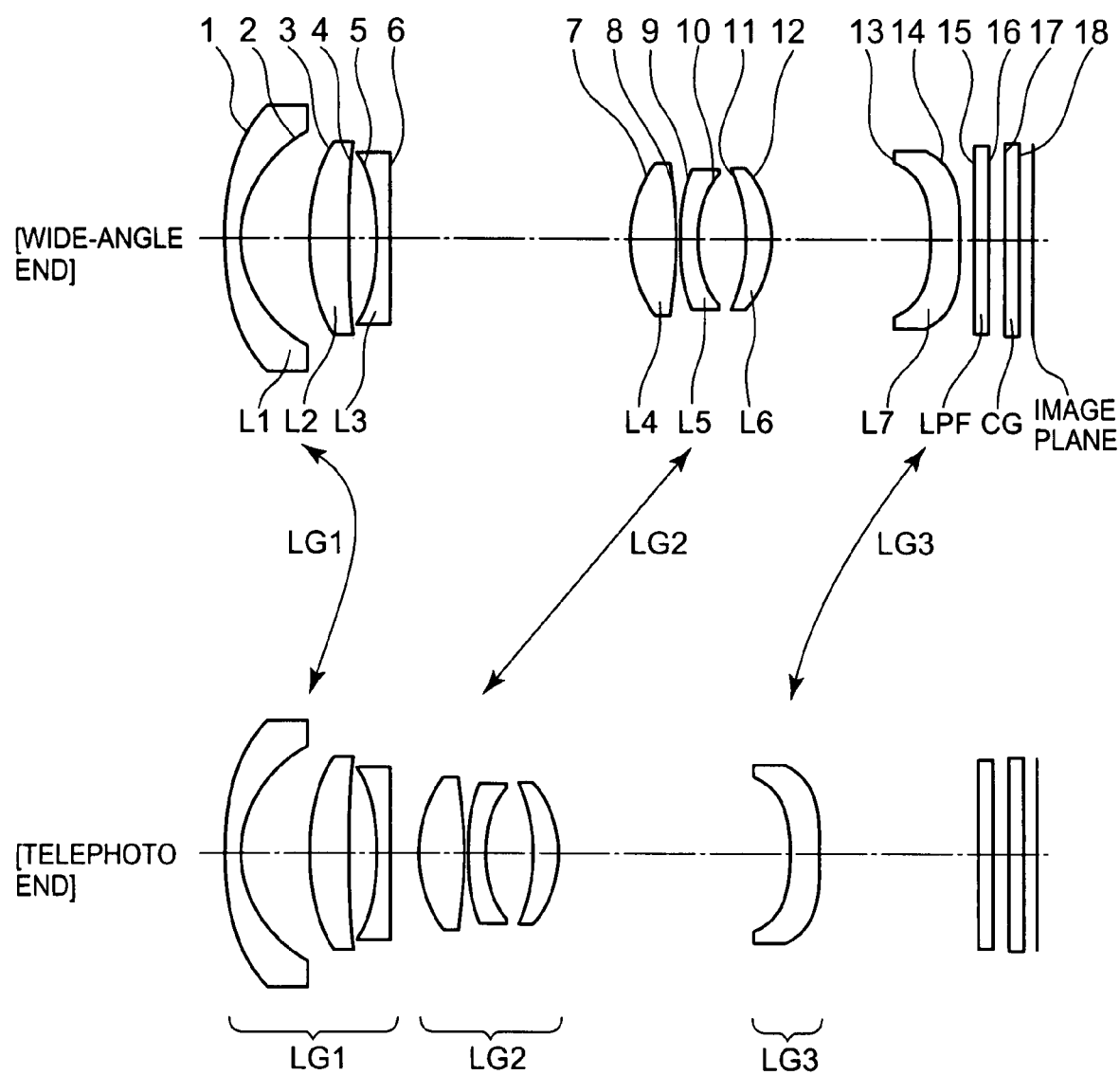
FIG. 47 is a diagram showing the configuration of lens elements of a 24th embodiment of a zoom lens of the invention.

A numerical example for a $24^{th}$ embodiment of a zoom lens of the invention will be shown in Table 25. In addition, FIG. 47 is a diagram showing the configuration of lens elements of the zoom lens, and FIG. 48 is a diagram showing aberrations thereof.

TABLE 25 f = 6.34~10.70~18.07
F = 2.20~2.96~4.23
2ω = 72.98~46.35~28.44

| Surface number | R | D | $N_d$ | $v_d$ |
|---|---|---|---|---|
| 1 | 14.634 | 0.72 | 1.82080 | 42.71 |
| 2 | 5.433 | 2.80 | — | — |
| 3 | 9.861 | 1.73 | 1.75211 | 25.05 |
| 4 | 93.805 | 1.01 | — | — |
| 5 | −10.690 | 0.60 | 1.72916 | 54.66 |
| 6 | 111.312 | 10.02~4.53~1.15 | — | — |
| 7 | 6.352 | 1.92 | 1.69400 | 56.30 |
| 8 | −15.491 | 0.10 | — | — |
| 9 | 11.532 | 0.75 | 1.94595 | 17.98 |
| 10 | 6.104 | 1.94 | — | — |
| 11 | −10.969 | 1.05 | 1.51823 | 58.96 |
| 12 | −6.223 | 6.58~7.54~9.54 | — | — |
| 13 | −15.663 | 1.20 | 1.52470 | 56.24 |
| 14 | −368.432 | 0.56~3.05~6.50 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| $1^{st}$ surface | $2^{nd}$ surface | $7^{th}$ surface |
|---|---|---|
| K = 0.00000E+00 | K = 0.00000E+00 | K = 0.00000E+00 |
| A = 4.83418E−04 | A = 9.08249E−05 | A = −5.88057E−04 |
| B = −3.76316E−05 | B = −4.08304E−05 | B = 2.34603E−07 |
| C = 1.80650E−06 | C = −1.54844E−07 | C = −2.12783E−07 |
| D = −3.87164E−08 | D = 9.31813E−08 | D = 1.84163E−08 |
| E = 3.27232E−10 | E = −3.03998E−09 | |

| $8^{th}$ surface | $13^{th}$ surface | $14^{th}$ surface |
|---|---|---|
| K = 0.00000E+00 | K = 0.00000E+00 | K = 0.00000E+00 |
| A = 7.26207E−04 | A = −4.43529E−03 | A = −4.41608E−03 |
| B = −5.68176E−06 | B = −2.56504E−04 | B = 1.47767E−05 |
| C = 2.14998E−07 | C = 3.59018E−05 | C = 3.81834E−06 |
| D = 1.28436E−08 | D = −2.61866E−06 | D = −2.85526E−07 |
| | E = 2.56084E−08 | |

Next, with respect to Embodiments 17 to 24, values corresponding to the conditional expressions (16) to (30) will altogether be shown in Table 26.

TABLE 26

| | Embodiment 17 | Embodiment 18 | Embodiment 19 | Embodiment 20 |
|---|---|---|---|---|
| Conditional expression (16) | −0.56 | −0.58 | −0.63 | −0.63 |
| Conditional expression (17) | 5.77 | 6.10 | 5.32 | 5.69 |
| Conditional expression (18) | −0.14 | −0.13 | −0.14 | −0.13 |
| Conditional expression (19) | 0.40 | 0.40 | 0.36 | 0.38 |
| Conditional expression (20) | 21.70 | 23.55 | 24.65 | 24.90 |
| Conditional expression (21) | 1.85 | 1.85 | 1.91 | 1.85 |
| Conditional expression (22) | 1.09 | 1.09 | 1.00 | 1.08 |
| Conditional expression (23) | 0.58 | 0.59 | 0.67 | 0.53 |
| Conditional expression (24) | 0.78 | 0.74 | 0.90 | 0.86 |
| Conditional expression (25) | −0.42 | −0.38 | −0.44 | −0.41 |
| Conditional expression (26) | 46.87 | 39.99 | 46.24 | 45.39 |
| Conditional expression (27) | −0.38 | −0.37 | −0.36 | −0.36 |
| Conditional expression (28) | 1.03 | 0.93 | 1.11 | 0.96 |
| Conditional expression (29) | −0.81 | −0.76 | −0.84 | −0.89 |
| Conditional expression (30) | −0.57 | 0.30 | −0.64 | −0.19 |

| | Embodiment 21 | Embodiment 22 | Embodiment 23 | Embodiment 24 |
|---|---|---|---|---|
| Conditional expression (16) | −0.63 | −0.54 | −0.56 | −0.64 |
| Conditional expression (17) | 5.66 | 5.52 | 6.02 | 5.20 |
| Conditional expression (18) | −0.14 | −0.43 | −0.15 | −0.20 |
| Conditional expression (19) | 0.37 | 0.40 | 0.34 | 0.44 |
| Conditional expression (20) | 24.24 | 22.06 | 28.88 | 23.64 |
| Conditional expression (21) | 1.81 | 1.85 | 1.85 | 1.75 |
| Conditional expression (22) | 1.01 | 1.11 | 1.09 | 1.17 |
| Conditional expression (23) | 0.73 | 0.61 | 0.59 | 0.55 |
| Conditional expression (24) | 0.81 | 0.81 | 0.77 | 0.94 |
| Conditional expression (25) | −0.42 | −0.41 | −0.45 | −0.43 |
| Conditional expression (26) | 51.17 | 44.24 | 47.09 | 39.64 |
| Conditional expression (27) | −0.30 | −0.38 | −0.32 | −0.34 |
| Conditional expression (28) | 1.11 | 1.06 | 0.97 | 1.00 |
| Conditional expression (29) | −0.82 | −0.81 | −0.90 | −1.02 |
| Conditional expression (30) | −0.37 | −0.74 | −0.86 | −0.40 |

As is obvious from Table 26, the values for each embodiment from Embodiments 17 to 24 satisfy the conditional expressions (16) to (30), and as is obvious from the aberration diagrams of each embodiment, the individual aberrations are corrected properly.

According to these embodiments, by configuring the zoom lens optical system having a zoom ratio of the order of 3× as three groups of lens elements by the use of seven or eight lens elements and giving sequentially from the object side negative, positive and negative powers to each lens elements group, the overall length of the zoom lens in the direction of the optical axis thereof can be reduced when used, and by disposing symmetrically not only the configuration of lens elements groups but also positive and negative power arrangement in the direction from an object side to an image side and schematic configuration of each of the individual lens elements which make up the whole system, the occurrence of off-axis aberrations such as distortion and astigmatism is basically reduced, whereby the degree of freedom of correction environment of the individual aberrations can be improved overall, and with an f number of the order of 2, a zoom lens which is fast but compact and which maintains high performance can be realized, thereby making it possible to provide a compact zoom lens which makes it difficult for blurs due to the movement of a camera and a subject to be produced and a camera with the zoom lens.

What is claimed is:

1. A zoom lens comprising, sequentially from an object side thereof, a first lens elements group having a negative refraction power as a whole, a second lens elements group having a positive refraction power as a whole, and a third lens element group having a negative refraction power as a whole, wherein a variable power is realized by shifting positions of the first lens elements group and the second lens elements group in a direction of an optical axis thereof, or by shifting, in addition to the positions of the first lens elements group and the second lens elements group, a position of the third lens element group in a direction of an optical axis thereof, wherein the first lens elements group is made up by disposing, sequentially from an object side thereof, a first lens element which is a negative lens, which has a negative refraction power, a second lens element which is a positive lens, which has a positive refraction power, and a third lens element which is a negative lens, and wherein the zoom lens satisfies the following conditional expression (1) with respect to a power of the first lens elements group, the following conditional expression (2) with respect to a size of the whole lens system, and the following conditional expression (3) with respect to a power of the third lens element group, the following conditional expression (4) with respect to a power of the second lens element, the following conditional expression (5) with respect to dispersion properties that are distributed to each lens element of the first lens elements group, and the following conditional expression (6) with respect to a refractive index of the second lens element:

$$-0.8 \leq f_w/f_I \leq -0.45 \quad (1)$$

$$4.5 \leq TL_w/f_w \leq 7.5 \quad (2)$$

$$-0.55 \leq f_w/f_{III} \leq 0 \quad (3)$$

$$0.22 \leq f_w/f_2 \leq 0.55 \quad (4)$$

$$15 \leq (v_1+v_3)/2 - v_2 \quad (5)$$

$$1.65 \leq n_2 \quad (6)$$

where:
- $f_w$: composite focal length of the whole lens system at a wide-angle end;
- $f_I$: composite focal length of the first lens elements group;
- $f_{III}$: composite focal length of the third lens element group;
- $TL_w$: distance from an object side surface of the first lens element, which is positioned closest to the object side among lens elements of the first lens elements group, to an image plane at the wide-angle end (where, a parallel plane glass portion is converted into an air space distance);
- $f_2$: focal length of the second lens element of the first lens elements group;
- $v_1$: Abbe number of the first lens element of the first lens elements group;
- $v_2$: Abbe number of the second lens element of the first lens elements group;
- $v_3$: Abbe number of the third lens element of the first lens elements group;
- $n_2$: refractive index relative to the d line of the second lens element of the first lens elements group.

2. The zoom lens according to claim 1, wherein the first lens element of the first lens elements group is an aspherical lens, and wherein the zoom lens satisfies the following conditional expression (7) with respect to a configuration of an image side surface thereof and also satisfies the following conditional expression (8) with respect to a relative characteristic on configuration between the object side surface of the first lens element and an object side surface of the second lens element of the first lens elements group:

$$0.4 \leq f_w/r_2 \leq 1.4 \quad (7)$$

$$0.1 \leq r_2/r_3 \leq 1.5 \quad (8)$$

where:
- $r_2$: radius of curvature of the image side surface of the first lens element of the first lens elements group; and
- $r_3$: radius of curvature of the object side surface of the second lens element of the first lens elements group.

3. The zoom lens according to claim 1, wherein the second lens elements group is made up by disposing, sequentially from an object side thereof, a fourth lens element which is a positive lens, a fifth lens element which is a positive lens, a sixth lens element which is a negative lens, and a seventh lens element which is a positive lens, and wherein the zoom lens satisfies the following conditional expression (9) with respect to a positive composite power of the fourth lens element and the fifth lens element, the following conditional expression (10) with respect to a negative power of the sixth lens element, the following conditional expression (11) with respect to dispersion properties that are distributed to the fourth lens element, the fifth lens element, and the sixth lens element, which are disposed closer to the object side in the second lens elements group, and the following conditional expression (12) with respect to a refractive index of each of the similar lens elements:

$$0.5 \leq f_w/f_{4,5} \leq 1.5 \quad (9)$$

$$-1.5 \leq f_w/f_6 \leq 0.25 \quad (10)$$

$$28 \leq (v_4+v_5)/2 - v_6 \quad (11)$$

$$(n_4+n_5)/2 - n_6 \leq -0.24 \quad (12)$$

where:
- $f_{4,5}$: composite focal length of the fourth lens element and the fifth lens element of the second lens elements group;
- $f_6$: focal length of the sixth lens element of the second lens elements group (where, in the event that the sixth lens element makes up a composite aspherical lens, a composite focal length of a base spherical lens and a resin portion);
- $v_4$: Abbe number of the fourth lens element of the second lens elements group;
- $v_5$: Abbe number of the fifth lens element of the second lens elements group;
- $v_6$: Abbe number of the sixth lens element of the second lens elements group (where, Abbe number of a glass material of a base spherical lens, in the event that the sixth lens element makes up a composite aspherical lens);
- $n_4$: refractive index relative to the d line of the fourth lens element of the second lens elements group;
- $n_5$: refractive index relative to the d line of the fifth lens element of the second lens elements group; and
- $n_6$: refractive index relative to the d line of the sixth lens element of the second lens elements group.

4. The zoom lens according to claim 3, wherein of refracting surfaces of each lens element of the second lens elements group, at least one of the refracting surfaces is formed into an aspherical shape, and wherein the zoom lens satisfies the following conditional expression (13) with respect to a configuration of an object side surface of the fourth lens element and the following conditional expression (14) with respect to an image side surface of the sixth lens element:

$$0.2 \leq f_w/r_7 \leq 1.0 \quad (13)$$

$$0.4 \leq f_w/r_{12} \leq 1.6 \quad (14)$$

where:
- $r_7$: radius of curvature of the object side surface of the fourth lens element of the second lens elements group; and
- $r_{12}$: radius of curvature of the image side surface of the sixth lens element of the second lens elements group (where, radius of curvature of a boundary plane between resin and air in the event that the image side surface of the sixth lens element is made up of a resin lens surface of a compound lens).

5. A camera which installs thereon the zoom lens according to claim 3.

6. The zoom lens according to claim 1, wherein the third lens element group is made up of only a lens element which is a negative lens, and wherein the zoom lens satisfies the following conditional expression (15) with respect to a configuration of the object side surface of the lens element of the third lens element group:

$$2.0 f_w/r_{15} \leq 0.2 \quad (15)$$

where,
- $r_{15}$: radius of curvature of the object side surface of the lens element of the third lens element group.

7. A camera which installs thereon the zoom lens according to claim 6.

8. A camera which installs thereon the zoom lens according to claim 1.

* * * * *